(12) United States Patent
Gatzsche et al.

(10) Patent No.: US 7,829,778 B2
(45) Date of Patent: Nov. 9, 2010

(54) DEVICE AND METHOD FOR GENERATING A NOTE SIGNAL AND DEVICE AND METHOD FOR OUTPUTTING AN OUTPUT SIGNAL INDICATING A PITCH CLASS

(75) Inventors: Gabriel Gatzsche, Martinroda (DE); David Gatzsche, Weimar (DE); Michael Beckinger, Erfurt (DE); Frank Melchior, Ilmenau (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 204 days.

(21) Appl. No.: 12/096,934

(22) PCT Filed: Feb. 21, 2007

(86) PCT No.: PCT/EP2007/001509

§ 371 (c)(1),
(2), (4) Date: Jul. 29, 2008

(87) PCT Pub. No.: WO2007/096152

PCT Pub. Date: Aug. 30, 2007

(65) Prior Publication Data

US 2008/0307945 A1 Dec. 18, 2008

(30) Foreign Application Priority Data

Feb. 22, 2006 (DE) .................. 10 2006 008 298

(51) Int. Cl.
*G10H 7/00* (2006.01)

(52) U.S. Cl. .................. 84/615; 84/600; 84/653

(58) Field of Classification Search ........... 84/600–602, 84/609, 615, 649, 653
See application file for complete search history.

(56) References Cited

U.S. PATENT DOCUMENTS

| 4,121,488 A | 10/1978 | Akiyama |
| 4,450,743 A | 5/1984 | Tanimoto |
| 4,452,119 A | 6/1984 | Tanimoto |
| 5,099,738 A | 3/1992 | Hotz |
| 5,393,926 A | 2/1995 | Johnson |
| 5,415,071 A | 5/1995 | Davies |

(Continued)

FOREIGN PATENT DOCUMENTS

DE 80 05 260 U1 8/1980

(Continued)

OTHER PUBLICATIONS

Official communication issued in counterpart International Application No. PCT/EP2007/000560, mailed on May 11, 2007.

(Continued)

*Primary Examiner*—David S. Warren
(74) *Attorney, Agent, or Firm*—Keating & Bennett, LLP

(57) ABSTRACT

A device for generating a note signal upon a manual input is described which comprises an operating means which is implemented to enable a user of the same, as an input, to define an input angle or an input angle range as the input signal, and a controller which is implemented to receive the input signal and to generate a note signal associated with a pitch class based on an assignment function and on the input signal.

24 Claims, 28 Drawing Sheets

U.S. PATENT DOCUMENTS

| | | | |
|---|---|---|---|
| 5,491,297 | A | 2/1996 | Johnson et al. |
| 5,502,274 | A | 3/1996 | Hotz |
| 5,619,003 | A | 4/1997 | Hotz |
| 5,661,253 | A * | 8/1997 | Aoki .......................... 84/658 |
| 5,665,927 | A | 9/1997 | Taki et al. |
| 5,670,729 | A | 9/1997 | Miller et al. |
| 5,709,552 | A * | 1/1998 | LeGrange ................. 434/404 |
| 5,723,802 | A | 3/1998 | Johnson et al. |
| 5,777,248 | A | 7/1998 | Campbell |
| 6,677,513 | B1 * | 1/2004 | Rutter ......................... 84/622 |
| 6,686,529 | B2 * | 2/2004 | Kim ......................... 84/464 R |
| 2001/0052283 | A1 | 12/2001 | Boyer |
| 2002/0178896 | A1 * | 12/2002 | George ..................... 84/477 R |
| 2003/0209130 | A1 | 11/2003 | Anderson et al. |
| 2004/0255759 | A1 | 12/2004 | Gayama |
| 2006/0027080 | A1 | 2/2006 | Schultz |
| 2006/0262876 | A1 * | 11/2006 | LaDue ....................... 375/295 |
| 2008/0168893 | A1 * | 7/2008 | Nakamura .................. 84/645 |
| 2008/0264239 | A1 * | 10/2008 | Lemons et al. ............ 84/477 R |
| 2008/0271590 | A1 * | 11/2008 | Lemons ..................... 84/483.2 |
| 2008/0276791 | A1 * | 11/2008 | Lemons ..................... 84/483.2 |
| 2008/0307945 | A1 * | 12/2008 | Gatzsche et al. ......... 84/477 R |
| 2009/0173216 | A1 * | 7/2009 | Gatzsche et al. ............. 84/613 |
| 2009/0223348 | A1 * | 9/2009 | Lemons ..................... 84/483.2 |
| 2009/0223349 | A1 * | 9/2009 | Lemons ..................... 84/483.2 |

FOREIGN PATENT DOCUMENTS

| | | |
|---|---|---|
| DE | 37 44 255 A1 | 7/1989 |
| DE | 89 02 959 U1 | 8/1989 |
| DE | 40 02 361 A1 | 8/1991 |
| DE | 42 16 349 C2 | 6/1994 |
| DE | 29512911 U1 | 11/1995 |
| DE | 298 01 154 U1 | 6/1998 |
| DE | 198 59 303 A1 | 7/1999 |
| DE | 198 31 409 A1 | 1/2000 |
| DE | 100 42 300 A1 | 3/2002 |
| DE | 203 01 012 U1 | 4/2003 |
| DE | 103 51 817 A1 | 5/2005 |
| DE | 20 2005 009 551 U1 | 2/2006 |
| EP | 1 533 786 A1 | 5/2005 |
| GB | 2 312 085 A | 10/1997 |
| GB | 2 324 642 A | 10/1998 |
| JP | 11-126063 A | 5/1999 |
| JP | 2004-286917 A | 10/2004 |
| WO | 86/06193 A1 | 10/1986 |
| WO | 90/07771 A1 | 7/1990 |
| WO | 90/09650 A1 | 8/1990 |
| WO | 96/36034 A1 | 11/1996 |
| WO | 2005/122133 A1 | 12/2005 |
| WO | 2006/005567 A1 | 1/2006 |

OTHER PUBLICATIONS

Izmirli: "An Algorithm for Audio Key Finding," Mirex 2005 Contest Results; XP-002426658; http://www.music-ir.org/evaluation/mirex-results/articles/key_audio/izmirli.pdf; 2005, 3 pages.

Gomez et al.: "Tonality Visualization of Polyphonic Audio," ICMC 2005 Proceedings; XP-00246659; http://www.iua.upf.es/~gomez/TonalDescription/GomezBonada-ICMC2005.pdf; Sep. 5, 2005, 4 pages.

Bello et al.: "A Robust Mid-Level Representation for Harmonic Content in Music Signals," ISMIR 2005; XP-002426660; Sep. 2005, pp. 304-311.

Purwins et al.: "Correspondence Analysis for Visualizing Interplay of Pitch Class, Key, and Composer," Perspectives in Mathematical Music Theory; XP-002426661; 2003, pp. 1-23.

Shepard: "Geometrical Approximations to the Structure of Musical Pitch," Psychological Review; vol. 89, No. 4; Jul. 1982; pp. 305-333.

Gatzsche et al.: "Device and Method for analyzing an Audio Datum," U.S. Appl. No. 12/278,177, filed Aug. 4, 2008.

Official communication issued in counterpart International Application No. PCT/EP2007/001509, mailed on May 11, 2007.

Dorrell: "Vector Analysis of Musical Intervals," What is Music; Chapter 5; XP-002430508; 2004; http://web.archive.org/web/20051124063808/http://whatismusic.info/download.html>;pp. 87-106.

Chuan et al.: "Polyphonic Audio Key Finding Using the Sprial Array CEG Algorithm," International Conference on Multimedia and Expo, 2005; Jul. 8, 2005; pp. 21-24.

Gatzsche: "Visualization of Musical Parameters in Music Theory," Dissertation: Liszt School of Music Weimar; 2004; pp. 1-19.

Riemann: "Ideas For A Study 'On the Imagination of Tone,'" Journal of Music Theory; vol. 36, No. 1; Spring 1992; pp. 81-117.

* cited by examiner

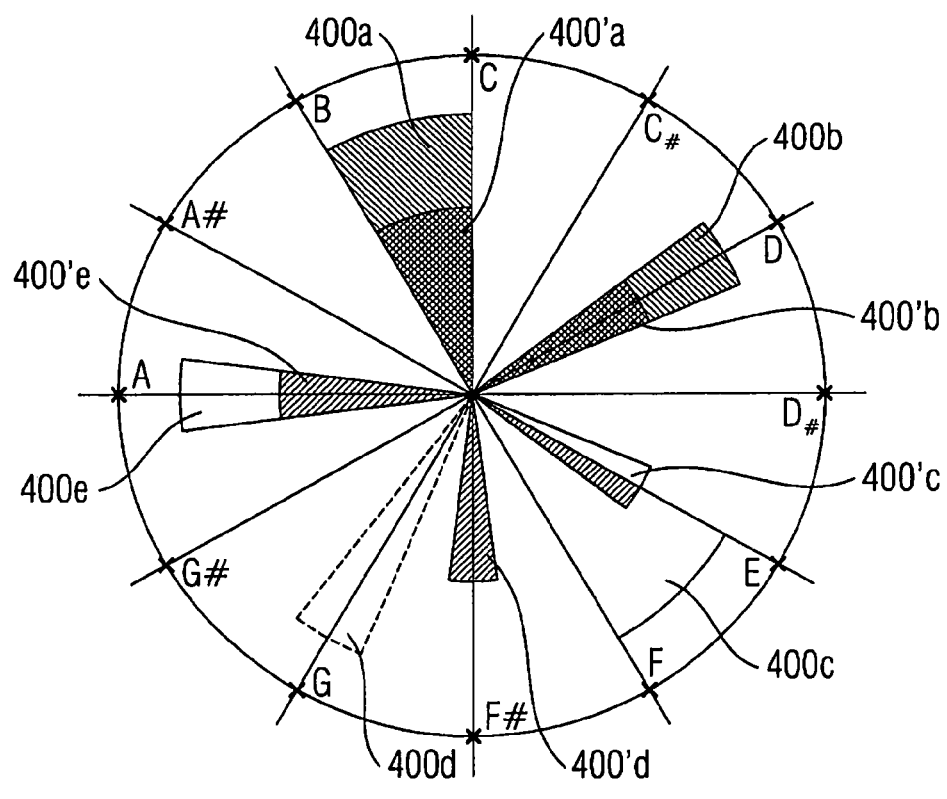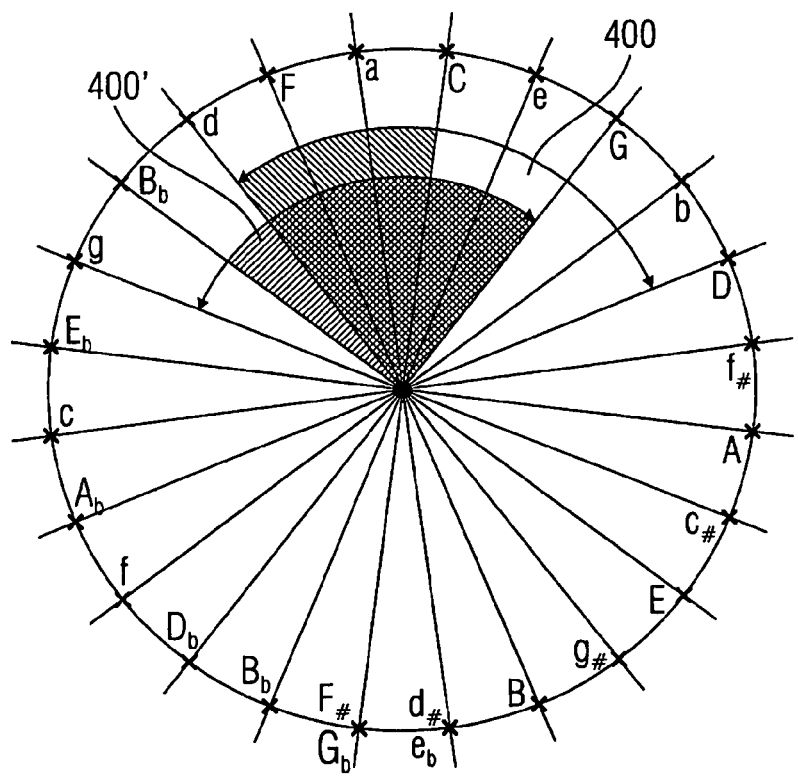
FIGURE 13

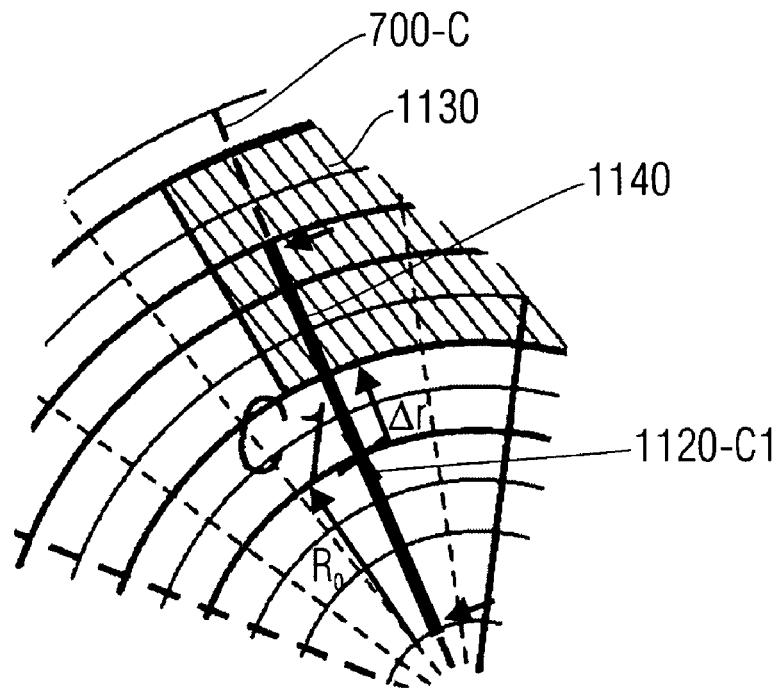
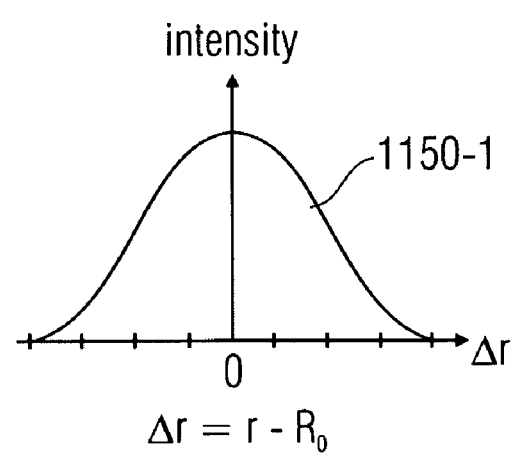
$\Delta r = r - R_0$
FIGURE 30A

DEVICE AND METHOD FOR GENERATING A NOTE SIGNAL AND DEVICE AND METHOD FOR OUTPUTTING AN OUTPUT SIGNAL INDICATING A PITCH CLASS

TECHNICAL FIELD

The present invention relates to a device and a method for generating a note signal upon a manual input and to a device and a method for outputting an output signal indicating a pitch class, in particular to a control panel and a display device which enables a simple, fast and pedagogical input of individual pitches and harmonically sounding pitch combinations, as well as a simple, easily understandable and pedagogically sensible output of individual or several output signals indicating pitch classes.

BACKGROUND

When playing music and in particular when improvising on an existing piece of music or an existing sequence of chords, i.e. when creatively generating harmonically and consonantly sounding melodies, while the melody or the sequence of chords is played in real time, a fast and efficient input of pitches is indispensable. Such a fast and efficient input of pitches, however, generally needs a learning phase of several years on a certain instrument, for example a piano, a guitar or another musical instrument, in order to generate harmonically and/or consonantly sounding pitches (tones) at a sufficient speed. As, apart from knowing how to play a musical instrument in general, a sufficient basic musical education is also required, many people are excluded who lack the theoretical musical background knowledge or have no sufficient experience in playing a musical instrument.

Especially at the beginning of such a learning phase of several years it is very difficult for the learner to understand the theoretical musical backgrounds which are indispensable, in addition to merely knowing how to play the musical instrument, for playing music at a later time. In particular, the "classical musical instruments", i.e., for example, the piano, the guitar, the violin, the trumpet and the saxophone, are hardly aimed at conveying theoretical musical backgrounds but are rather oriented towards an experienced musician.

It is in particular this complexity of playing the instrument and the lack of theoretic musical knowledge which leads to the fact that only a few people have an understanding of making music, improvising and composing, as in particular the "first steps" are especially difficult. This in particular holds true for children, for whom a playful approach to music would be suitable for introducing them to music. Apart from that, it is in particular difficult for disabled people to make music or improvise, as they are frequently not able to play certain musical instruments due to their handicap.

In literature, may teaching aids and means for learning and/or finding chords, harmonies and keys are known. These are often templates, discs or other objects, in particular mechanically connected, shiftable or rotatable templates on which connections regarding music theory are illustrated. Such learning aids and means are, for example, described in the following documents DE 8005260 U1, DE 8902959 U1, DE 3744255 A1, U.S. Pat. No. 5,709,552, DE 3690188 T1, US 2002/0178896 A1, DE 4002361 A1, DE 19831409 A1, DE 19859303 A1, DE 29801154 U1 and DE 20301012 U1. In general, on one of the discs or the corresponding objects a sequence of pitches is applied which in general either corresponds to the chromatic scale consisting of a sequence of twelve semitones and thus all available pitches of an equal temperament, or to the circle of fifths, wherein a pitch interval of two adjacent pitches is a fifth (for example C-G or F-C). DE 8005260 shows a device for finding chords, harmonies and keys with an arrangement in an interval of a third.

The utility model DE 29512911 U1 describes a teaching and learning aid for a synthesis and analysis of connections regarding music theory with several different templates and at least twelve gaming pieces provided with designations of pitches.

The European patent EP 0452347 B1 refers to a universal operating unit for an electronic musical instrument comprising a number of note selectors, each of which provides a note selection signal when a note is selected and a note deselection signal with a deminishment of a note, note turn-on devices coupled to the number of note selectors for providing note-designating information associated with each note selector and for providing a note turn-on signal triggered by the note selection signal which includes the corresponding note-designating information, a memory means for storing the note-designating information provided as triggered by the note selection signal, means coupled to the note turn-on device for changing the note-designating information and note turn-off devices coupled to the number of note selectors and to the memory means for providing a note turn-off signal triggered by the note deselection signal which includes the note-designating information stored when providing the note selection signal. In particular, these documents describe an operating unit for an electronic musical instrument which comprises an operating unit reproduced according to a fingerboard of a piano.

The patent DE 4216349 C2 describes an electronic musical instrument having a melody and an accompaniment keyboard. The musical instrument described has a melody keyboard whose melody keys include switches including two switching stages, wherein those pitches corresponding to the white keys are associated with the first switching stages and those pitches corresponding to the black keys of a keyboard are associated with the second switching stages, and an accompaniment keyboard comprising accompaniment keys which, when operated, may call an automatic chord accompaniment, wherein the accompaniment keys are respectively implemented as switches having at least two switching stages which have different associated accompaniment chords. An operation of the described electronic musical instrument does not need to have available the knowledge of musical notation, but requires, due to the described modeling according to a fingerboard, an operator who is educated in music theory, as in particular certain combinations of individual pitches and chords, which are necessitated in particular for pedagogical purposes, are obvious.

The patent DE 2857808 C3 describes an electronic musical instrument combined with an electronic clock. The invention relates to an electronic musical instrument, wherein via input and storage means any pitch sequences and pieces of music may be input and retrieved again. The described electronic musical instrument thus enables only an input with a subsequent storage of a pitch sequence and a reproduction of the stored pitch sequence via a pitch generator circuit to reproduce the stored sequence of pitches in the form of a sequential acoustic presentation. It is in particular disadvantageous with regard to the musical instrument described, that the input and/or the "programming" of the pitch sequence takes place via a 10-key pad, extended by several additional keys. In particular, the electronic musical instrument described also requires a certain minimum of theoretical musical knowledge, as otherwise a programming of the musical instrument will hardly be realizable.

The European patent EP 0834167 B1 refers to a virtual musical instrument with a new input device. In particular, the above-mentioned patent application refers to a virtual musical instrument having a portable accessory of a type which is to be brought in contact with a musical instrument in order to play this instrument, wherein the mentioned portable accessory comprises a switch which generates an activation signal as a reaction to a person holding the mentioned portable accessory causing the mentioned portable accessory to hit another object. The mentioned activation signal is received by a digital processor, which in turn generates a control signal which causes a synthesizer to generate a note which is represented by a selected note data structure. In particular, the patent application describes a virtual musical instrument, wherein the mentioned portable accessory is a guitar plectrum and wherein a user may only make pitches from within a predetermined amount of pitches sound via the synthesizer.

The European patent EP 0632427 B1 and the translation of this European patent DE 69418776 T2 relates to a method and a device for inputting musical data. More specifically, the mentioned patent relates to a musical data input device including an input recording means for recording a hand-written input on it, a position detection means for detecting a position on the input recording means where the hand-written input is performed to obtain pitch data representative of a pitch of a musical note, an input detection means for detecting the hand-written input performed on the input recording means, wherein the input detection means comprises a means for detecting the number of pushing events performed on the input recording means or for detecting a time period in which the input recording means is pushed, or for detecting the intensity of pressure which is exerted on the input recording means during the hand-written input, or comprises a number detection means to detect a number written onto the input recording means, or a line detection means to detect the length of a line which is drawn onto the input recording means, a time designation means for designating time data representative of the length of a musical pitch, on the basis of the detected number of pushing events or the detected time period or the detected intensity of pushing events or the detected number or the detected length of a line detected by the input detection device, and a musical pitch generation means for detecting musical pitch data on the basis of pitch level data obtained from the position detection means and the time data obtained from the time designation means. In particular, the mentioned patent application describes a musical data input device having an LCD unit (LCD=liquid crystal display) and a touch pad arranged on the same, via which, with the help of a pen, pitches may be inserted into a pitch system. The described musical data input device thus relates to people having a sufficiently high knowledge of connections regarding music theory.

The patent application U.S. Pat. No. 5,415,071 relates to a method an a device for generating relationships between musical pitches. Here, an arrangement of offset lines or rows of symbols is described, wherein each symbol represents a musical note. Each line includes a repeating series of twelve symbols which forms a musical series of semitones which is also known as the chromatic scale. Here, each line is offset with regard to the adjacent lines so that groups of symbols which represent the same musical relationship, i.e., for example, intervals, scales, chords, etc., form the same visually recognizable configurations, like, for example, diagonal configurations or vertical configurations at certain locations in the arrangement. In one embodiment, such a device which includes such an arrangement may be used as a learning aid, wherein the learning aid comprises two overlapping components which may be shifted against one another. Apart from that, the patent application describes an arrangement of the contact area of a keyboard and/or a claviature of a musical instrument with a claviature or a fingerboard of a musical string instrument which are arranged in accordance with the arrangement. The patent application thus describes a claviature having keys arranged in the form of concentric circles.

SUMMARY

According to an embodiment, a device for generating a note signal upon a manual input may have an operator which is implemented to enable a user of the same, as an input, to define an input angle or an input angle range as the input signal; and a controller which is implemented to receive the input signal and to generate a note signal associated with a pitch class based on an assignment function and the input signal, wherein the assignment function maps the complete angle range of a circle to a set of pitch classes such that one pitch class or no pitch class is assigned to each angle of the complete angle range and that for all predetermined angles it applies that when no pitch class is associated with the predetermined angle, to a first next neighbor angle, nearest to the predetermined angle in a first direction, of the complete angle range, to which a pitch class is assigned, a first next neighbor pitch class is assigned, which has a smallest pitch interval, which corresponds to a minor third interval or a major third interval, with respect to a second next neighbor pitch class which is associated with a second next neighbor angle, which is nearest to the predetermined angle in a second direction which is opposite to the first direction, of the complete angle range, which has an associated pitch class, and when one predetermined pitch class is associated with the predetermined angle, the predetermined pitch class and the first next-neighbor pitch class have a smallest pitch interval which corresponds to a prime interval, a minor third interval or a major third interval, and the predetermined pitch class and the second next-neighbor pitch class have a smallest pitch interval which corresponds to a prime interval, a minor third interval or a major third interval.

According to another embodiment, a device for outputting an output signal indicating a pitch class may have an output field having an output field center and a plurality of predetermined output field radial directions, wherein the output field is controllable to accentuate each of the plurality of predetermined output field radial directions; wherein to each output field radial direction of the plurality of predetermined output field radial directions a pitch class is associated; and wherein a smallest pitch interval between two pitch classes associated with directly adjacent output field radial directions corresponds to an interval of a major third or an interval of a minor third; and a display controller which is implemented to receive an input signal indicating a pitch class and to control the output field such that, depending on the input signal, as the output signal an output field radial direction of the plurality of output field radial directions is accentuated.

According to another embodiment, a method for generating a note signal upon a manual input may have the steps of receiving an input signal defining an input angle or an input angle range; and generating a note signal associated with a pitch class on the basis of an assignment function and the input signal, wherein the assignment function maps the complete angle range of a circle to a set of pitch classes such that one pitch class or no pitch class is assigned to each angle of the complete angle range and that for all predetermined angles it applies that when no pitch class is associated with the predetermined angle, to a first next neighbor angle, nearest to the predetermined angle in a first direction, of the complete angle range, to which a pitch class is assigned, a first next neighbor pitch class is assigned, which has a smallest pitch interval, which corresponds to a minor third interval or a major third interval, with respect to a second next neighbor pitch class which is which is associated with a second next neighbor angle, nearest to the predetermined angle in a second direction which is opposite to the first direction, of the complete angle range, which has an associated pitch class, and when one predetermined pitch class is associated with the predetermined angle, the predetermined pitch class and the first next-neighbor pitch class have a smallest pitch interval which corresponds to a prime interval, a minor third interval or a major third interval, and the predetermined pitch class and the second next-neighbor pitch class has a smallest pitch interval which corresponds to a prime interval, a minor third interval or a major third interval.

According to another embodiment, a method for outputting an output signal indicating a pitch class may have the steps of providing an output field having an output field center and a plurality of predetermined output field radial directions, wherein the output field is controllable to accentuate each of the plurality of predetermined output field radial directions; wherein a pitch class is associated with each output field radial direction of the plurality of predetermined output field radial directions; and wherein a smallest pitch interval between two pitch classes associated with directly adjacent output field radial directions corresponds to an interval of a major third or an interval of a minor third; and receiving an input signal indicating a pitch class; and accentuating the plurality of predetermined output field radial directions as the output signal of an output field radial direction depending on the input signal.

Another embodiment may have a computer program having a program code for performing the method for generating a note signal upon a manual input, when the computer program runs on a computer, wherein the method may have the steps of receiving an input signal defining an input angle or an input angle range; and generating a note signal associated with a pitch class on the basis of an assignment function and the input signal, wherein the assignment function maps the complete angle range of a circle to a set of pitch classes such that one pitch class or no pitch class is assigned to each angle of the complete angle range and that for all predetermined angles it applies that when no pitch class is associated with the predetermined angle, to a first next neighbor angle, nearest to the predetermined angle in a first direction, of the complete angle range, to which a pitch class is assigned, a first next neighbor pitch class is assigned, which has a smallest pitch interval, which corresponds to a minor third interval or a major third interval, with respect to a second next neighbor pitch class which is which is associated with a second next neighbor angle, nearest to the predetermined angle in a second direction which is opposite to the first direction, of the complete angle range, which has an associated pitch class, and when one predetermined pitch class is associated with the predetermined angle, the predetermined pitch class and the first next-neighbor pitch class have a smallest pitch interval which corresponds to a prime interval, a minor third interval or a major third interval, and the predetermined pitch class and the second next-neighbor pitch class has a smallest pitch interval which corresponds to a prime interval, a minor third interval or a major third interval.

Another embodiment may have a computer program having a program code for performing the method for outputting an output signal indicating a pitch class, when the computer program runs on a computer, wherein the method may have the steps of providing an output field having an output field center and a plurality of predetermined output field radial directions, wherein the output field is controllable to accentuate each of the plurality of predetermined output field radial directions; wherein a pitch class is associated with each output field radial direction of the plurality of predetermined output field radial directions; and wherein a smallest pitch interval between two pitch classes associated with directly adjacent output field radial directions corresponds to an interval of a major third or an interval of a minor third; and receiving an input signal indicating a pitch class; and accentuating the plurality of predetermined output field radial directions as the output signal of an output field radial direction depending on the input signal.

The inventive device for generating a note signal upon a manual input includes an operating means which is implemented to enable a user of the same, as an input, to define an input angle or an input angle range as the input signal, and a control means which is implemented to receive the input signal and to generate a note signal associated with a pitch class based on an assignment function and the input signal, wherein the assignment function maps the complete angle range of a circle to a set of pitch classes such that one pitch class or no pitch class is assigned to each angle of the complete angle range and that for all predetermined angles it applies that when no pitch class is associated with the predetermined angle, to a first next neighbor angle, nearest to the predetermined angle in a first direction, of the complete angle range, to which a pitch class is assigned, a first next neighbor pitch class is assigned, which comprises a smallest pitch interval, which corresponds to a minor third interval or a major third interval, with respect to a second next neighbor pitch class which is associated with a second next neighbor angle, which is nearest to the predetermined angle in a second direction which is opposite to the first direction, of the complete angle range, which has an associated pitch class, and when one predetermined pitch class is associated with the predetermined angle, the predetermined pitch class and the first next-neighbor pitch class comprise a smallest pitch interval which corresponds to a prime interval, a minor third interval or a major third interval, and the predetermined pitch class and the second next-neighbor pitch class comprise a smallest pitch interval which corresponds to a prime interval, a minor third interval or a major third interval.

According to a first object, the inventive device for outputting an output signal indicating a pitch class includes an output field comprising an output field center and a plurality of predetermined output field radial directions, wherein to each output field radial direction of the plurality of predetermined output field radial directions a pitch class is associated, and wherein a smallest pitch interval between two pitch classes associated with directly adjacent output field radial directions corresponds to an interval of a major third or an interval of a minor third, and a display control means which is implemented to receive an input signal indicating a pitch class and to control the output field such that, depending on the input signal, as the output signal an output field radial direction of the plurality of output field radial directions is accentuated.

According to a second aspect, the inventive device for outputting an output signal indicating a pitch class includes an output field having a plurality of output areas and an oval/circular output field periphery, wherein exactly seven output areas of the plurality of output areas are successively arranged along the output field periphery, wherein a pitch class is associated with each of the seven output areas, wherein the seven output areas are arranged symmetrically on the output field periphery with regard to a symmetry axis, so that the first output area lies on the symmetry axis in a clockwise direction, and wherein a smallest pitch interval between two pitch classes associated with directly adjacent output areas corresponds to an interval of a major third or an interval of a minor third, and a control means which is implemented to receive an input signal indicating a pitch class and control the output field such that, depending on the input signal an output area of the plurality of output areas is accentuated as the output signal.

The present invention is based on the finding that it is also possible for a user who is not musically trained to generate note signals in a faster and more efficient way, by the user inputting an input angle or an input angle range on an operating means. The input angle or the input angle range is provided as an input signal to the control means, which generates the note signal associated with a pitch class based on the assignment function and the output signal. Here, the input of the input angle or the input angle range is especially advantageous, as the assignment function assigns one pitch class each to two angularly adjacent pitch classes, wherein the one pitch class comprises a smallest pitch interval with regard to the next-neighbor pitch class, wherein the interval corresponds to an interval of a minor third or a major third. By this it is possible to generate harmonically or consonantly sounding pitch combinations by an input angle or an input angle range being predetermined by the user.

As the embodiments will show, it is possible by this to define different assignment functions which, for example, comprise the pitch classes of the chromatic scale with its sequence of twelve semitones or the pitch classes of the diatonic scale. Hereby, depending on the area of use, like, for example, making music, improvising or for a pedagogic purpose, the user may be offered an operating means and an assignment function adapted to his/her requirements. This represents a significant advantage, especially due to the fact that, by the selection of a suitable assignment function, the inventive device for generating a note signal may be adapted to the respective use and the musical training of the user.

It is a further advantage of the present invention that the control means may additionally be implemented to generate note signals with a volume information, wherein the volume information may depend on the input of the user. As the embodiments will show, this may, for example, be done by introducing a selection weighting function which comprises angle-dependent volume information. Within the scope of the present application, volume information is an amplitude, an intensity (basically proportional to the square of the amplitude), a volume (basically a logarithm of the amplitude or the intensity), a hearing-adapted volume or a corresponding variable.

It is further advantageous that the control means may be implemented to generate the note signal with an octaving which depends on an octaving input of the user. By this it is possible to generate pitches and chords via a connected sound generator with a variable octaving (octave transpose) and/or, in the case of chords, with a variable inversion. As the embodiments will show, the octaving input may, for example, be in the form of a radius input, so that, based on the fact that the assignment function assigns one pitch class or no pitch class to each angle, a note signal may be assigned to each point on an oval/circular operating means, which comprises additional information regarding the octaving. In embodiments of a device for generating a note signal, thus, for example, at least on the basis of a radius input or on the basis of a radius range input, a note signal associated with a pitch class associated with a corresponding angle may be generated, which comprises intensity information at least regarding one octaving. By this, for example, fadings between different inversions of chords or fadings between different octavings may be performed by shifting the input radius value or radius range along a radial direction.

As the embodiments will show, it is possible to determine an input angle range by inputting a starting angle and an opening angle. Because of this, the operating element may comprise a plurality of input means, among which there is, for example, a joystick, a tiltable foot plate, an rotary switch, a sliding control, a touch screen and, not least, a touch-sensitive area which represents a significant advantage due to the plurality of input possibilities. Apart from that, also input means may be used which, for example, evaluate an inclination direction and/or an inclination degree of the user's head, so that also highly handicapped people may generate note signals using the inventive device and thus make music, which represents a further substantial advantage.

Apart from that, the operating means may comprise a further input means, using which the user may select an assignment function from a plurality of assignment functions, so that the operating means allows the user a pre-selection of a diatonic major scale. Regarding this it is especially advantageous that the user may achieve a simple transposition of the piece of music he is playing without changing the input angle or the input angle range. In this respect it is further advantageous that the user may transpose pieces of music without having to fall back on an extensive theoretical musical background.

The devices for outputting an output signal indicating a pitch class enable, due to their implementation with the output field center and a plurality of predetermined output field radial directions, a spatial modeling of the assignment function of the control means of the inventive device for generating a note signal, which brings several advantages. On the one hand, the inventive devices for outputting an output signal indicating a pitch class enable a didactically valuable representation of connections regarding music theory with regard to a piece of music provided as an input signal to the inventive device for outputting.

Apart from that, the inventive devices for outputting, in connection with an inventive device for generating a note signal upon a manual input, enable an especially fast and efficient possibility of improvising on a piece of music made available in the form of an input signal via an inventive device for outputting (output device). The reason for this is that the output fields of the inventive device for outputting may model the assignment function of the inventive device for generating a note signal.

It is particularly advantageous here that the inventive devices for outputting may accentuate the corresponding output field radial directions and/or the output areas optically, mechanically, or in another way, so that, for example, the output signal indicating a pitch class may also, for example, be output to blind persons in the form of vibrations or other mechanical stimulations.

Another advantage is that connections regarding music theory may, for example, be indicated to children, or to other persons who (still) cannot read music, in the form of color-encoded luminous (illuminated) areas.

As the embodiments will show, it is particularly advantageous when the inventive devices for outputting an output signal indicating a pitch class provide their output on a touch screen or another input means which enables a simultaneous output, so that the inventive devices for outputting may be combined with the inventive device for generating a note signal upon a manual input. By this, it is directly possible for the user, without looking away from the output field, to adapt the manual input according to a progression of a piece of music, for example in the form of a change of chords, a change of key or another change, insofar that, again, a harmonically sounding pitch sequence may be played by a sound generator coupled to the inventive device for generating a note signal.

Apart from that, it is further advantageous to combine the inventive devices for outputting an output signal indicating a pitch class with an inventive device for generating a note signal upon a manual input to be able to illustrate contexts in the didactic area. Thus, it is, for example, possible to make a computer system generate an input signal for one of the inventive devices for outputting, pass on the same with a concrete question which requires background knowledge of music theory to the user and have it illustrated by the inventive device for outputting an output signal indicating a pitch class. The user may then use the inventive device for generating a note signal for the purpose of answering the question, for example regarding a certain triad or chord, whereupon the inventive device makes the generated note signal available for the computer system, which again evaluates the answer of the user. By this, an interactive learning of contexts with regard to music theory is possible, which represents an advantage compared to classical learning methods.

BRIEF DESCRIPTION OF THE DRAWINGS

In the following, embodiments of the present invention are explained in more detail with reference to the accompanying drawings, in which:

FIG. 13 shows an illustration of two adjacent keys in a chromatic arrangement of the pitch classes (left) and an arrangement of the pitch classes corresponding to the circle of thirds (right);

FIGS. 30A and 30B show enlarged sections of the operating means of FIG. 29 with two illustrations of two possible radial intensity distribution functions.

DETAILED DESCRIPTION

Figure 1:
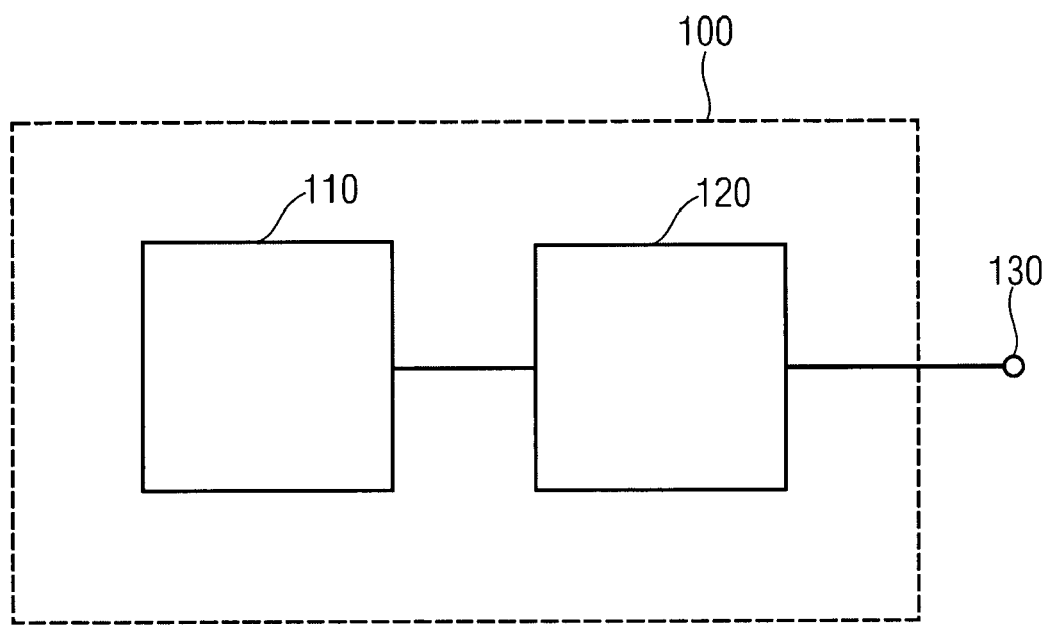
FIG. 1 shows a schematic block diagram of an inventive device for generating a note signal upon a manual input.

With reference to FIGS. 1 to 30 a first embodiment of an inventive device for generating a note signal upon a manual input will now be described. Here, in FIGS. 1 to 30 for elements having the same or similar functional characteristics the same reference numerals are used, wherein the corresponding implementations and explanations may thus respectively be applied and interchanged.

The present application is structured as follows: first, with reference to two embodiments, the basic setup and the basic functioning of an inventive device for generating a note signal upon a manual input and an inventive device for outputting an output signal indicating a pitch class will be explained. Subsequently, the synthesis and the analysis of pitch combinations will be explained in more detail before an introduction to two different positioning variants is given. Hereupon, a mathematical model description will follow which is useful for the further understanding of the present invention. Subsequently, a harmony analysis based on a symmetry model and on a circle of thirds will be explained before further embodiments are explained and discussed.

FIG. 1 shows a schematic block diagram of a first embodiment of an inventive device 100 for generating a note signal upon a manual input. The device 100 comprises an operating means 110 which is coupled to a control means 120 to receive an input signal from the operating means 120. The control means 120 is, apart from that, coupled to a note signal output 130 where the control means 120 provides a note signal generated by the same to a component not illustrated in FIG. 1. The control means 120 here generates the note signal on the basis of an assignment function and on the basis of the input signal which the control means 120 receives from the operating means 110. The assignment function may here be stored in the control means 120 or also, for example, in an external memory which the control means 120 may then access directly or indirectly.

A sound generator may optionally be coupled to the device 100 and in particular to the note signal output 130, so that the sound generator in this case generates pitches and/or sounds based on the note signals provided by the device 100. Alternatively or additionally, optionally a display device, an analysis device or also a processor means, like, for example, a computer or a PC, may be connected to the note signal output 130, which may receive and correspondingly further process the note signals of the device 100 as input signals or audio data. Thus, for example, a computer may be used for didactic purposes with the help of the inventive device 100.

Figure 2:
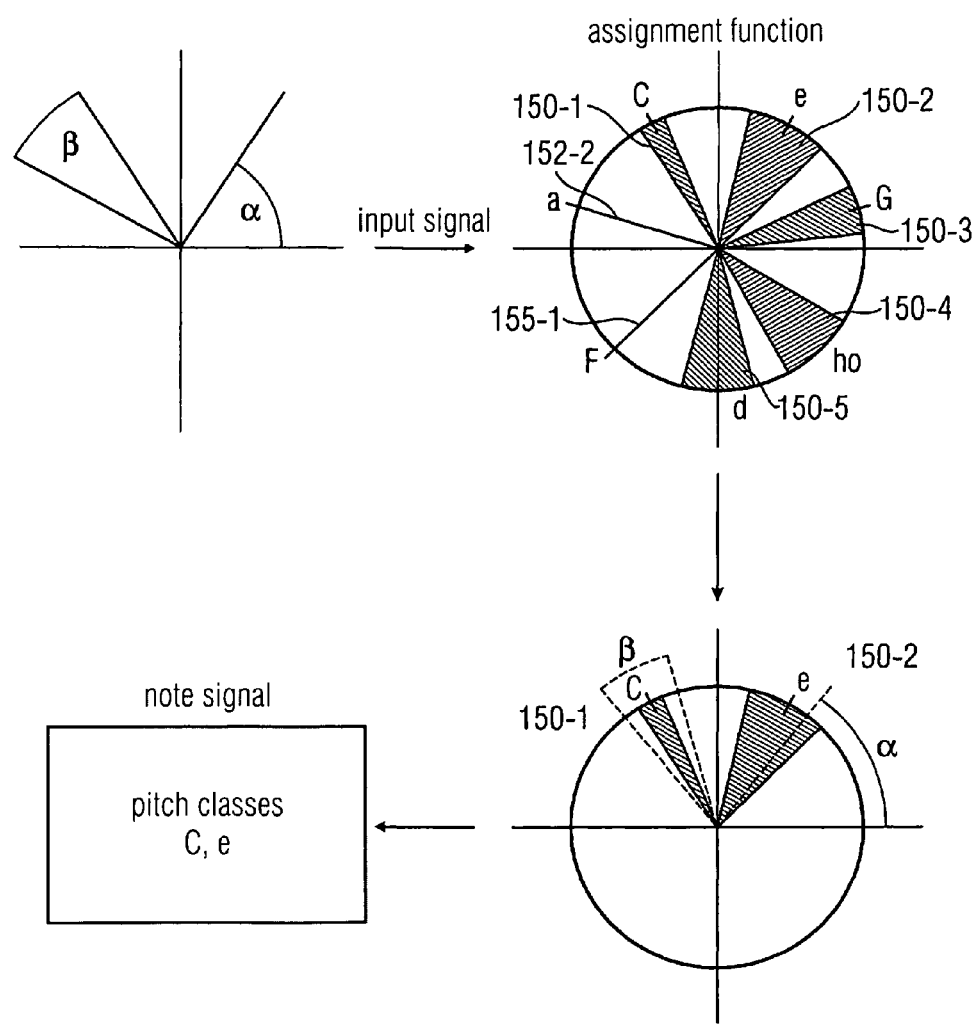
FIG. 2 shows a graphical illustration of the inventive method for generating a note signal upon a manual input.

In FIG. 2, the inventive method for generating a note signal upon a manual input and the process and/or the procedure for generating a note signal by the control means 120 is illustrated graphically. On an input of a user comprising an input angle α or an input angle range β, the operating means 110 generates an input signal which is provided to the control means 120. The control means 120 now generates a note signal based on an assignment function which maps the complete angle range of a circle, i.e. the angle range from 0° to 360° and/or the angle range from 0 to 2π to a set of pitch classes. Here, a pitch class of the set of pitch classes or no pitch class may be assigned to each angle of the complete angle range. Apart from that, it is possible to assign only one single angle to a pitch class, which would correspond to a mathematical function δ, or a (final) angle range. By this, an assignment function results, as it is schematically illustrated at the top right of FIG. 2. The assignment function thus divides the complete angle range of a circle into individual angles and angle ranges which have no, one or more associated pitch classes. The thus resulting angle ranges and/or angles which have associated pitch classes are thus directly adjacent with regard to the angle or separated by an angle range which has no associated pitch class. Such angles or angle ranges are called adjacent and/or neighboring angles and/or angle ranges. Here, within the scope of the present application, an adjacent angle or an adjacent angle range is also an angle or an angle range which is different from the underlying angle or angle range by 360° and/or 2π or a multiple of the same. The assignment function is thus periodically continued with a period of 360° and/or 2π on the complete axis of real numbers. Thus, for example, an angle range which has an assigned pitch class and which ends at an angle of 359° may be directly adjacent to another angle range which has an assigned pitch class and which starts at an angle of 1°.

In this connection it is important, however, that pitch classes which are assigned to directly adjacent angles or angle ranges have a smallest pitch interval which corresponds to an interval and/or distance of minor third, a major third or a prime.

On the top right, FIG. 2 shows a corresponding illustration of an exemplary assignment function which maps the complete angle range of a circle to a set of pitch classes, which include the pitch classes C, e, G, h0, d, F and a. Here, five angle ranges 150-1, 150-2, 150-3, 150-4 and 150-5 are assigned to the pitch classes C, e, G, h0 and d. Apart from that, the angles 155-1 and 155-2 are assigned to the two pitch classes F and a.

In the notation of the pitch classes, as already explained, usually a difference is made between upper-case and lower-case pitch classes within the scope of the present application. If a pitch class is designated by an upper-case letter, like, for example, C or F, when the corresponding pitch class and the two pitch classes which are adjacent to the corresponding pitch class in a clockwise direction are selected, the corresponding major triad sounds. In the case of C, this means that the pitch classes C-e-G for example represent a C major triad. Accordingly, the three pitch classes F, a and C together represent an F major triad. Pitch classes which are designated by small letters correspondingly represent minor triads. An example of this is the D minor triad which includes the pitch classes d, F and a. The triad designated by h0 has a special status, which is the diminished triad h0 when, based on the pitch class h0, the two clockwise adjacent pitch classes also sound. Here, this is the triad h/b-d-F which consists of a sequence of two minor thirds.

As now, in the illustrated example, the input of the user includes the input angle α and the input angle range β, and the pitch class e and C are associated with the same by the described assignment function, such as it is shown in FIG. 2 at the bottom right, the control means 120 generates a note signal which is assigned to the pitch class C and e.

Figure 3:
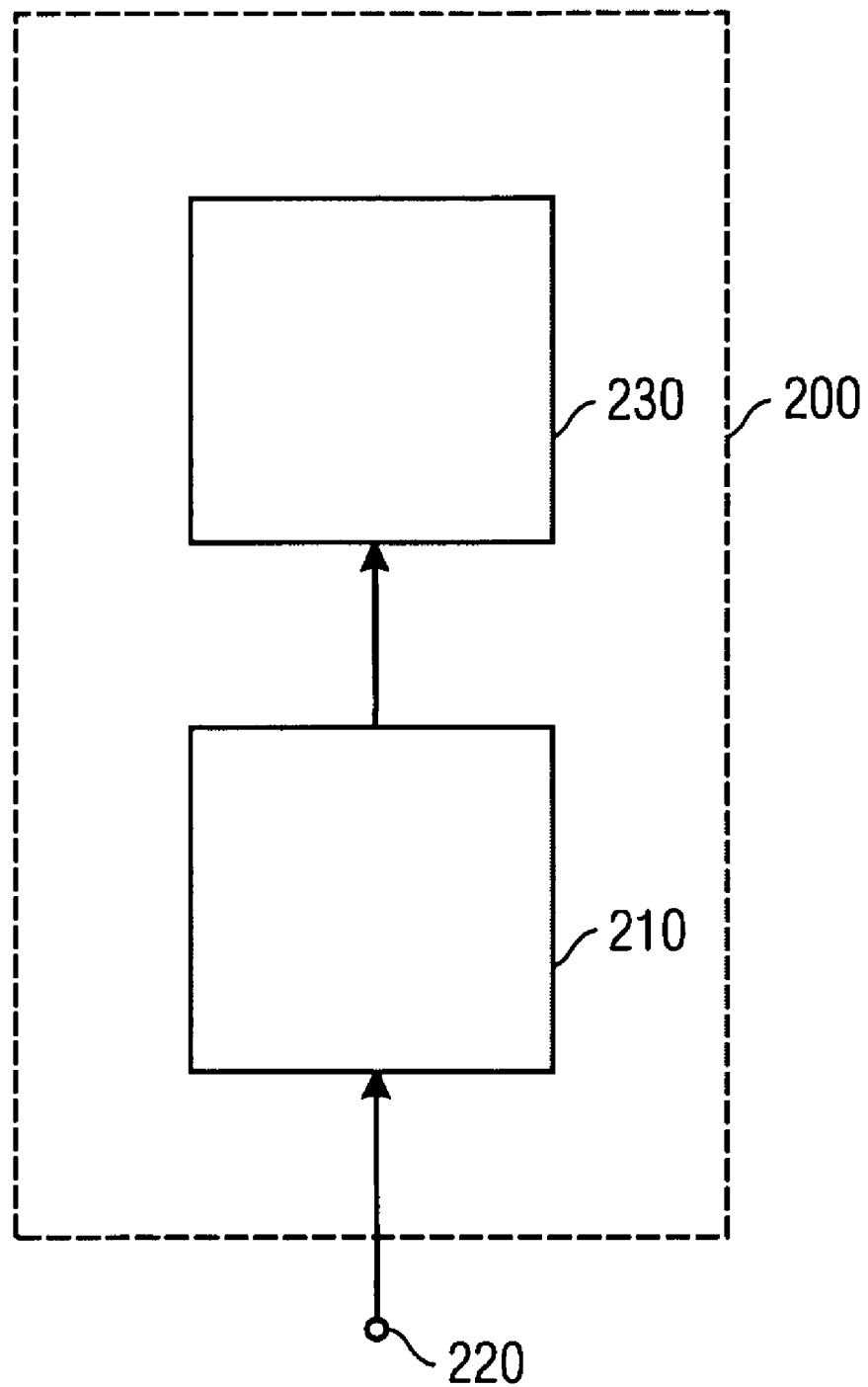
FIG. 3 shows a schematic block diagram of an inventive device for outputting an output signal indicating a pitch class.

FIG. 3 shows a first embodiment of an inventive device 200 for outputting an output signal indicating a pitch class. The device 200 comprises a display control means 210 coupled to an input signal terminal 220. Apart from that, the device 200 comprises a display field 230 which is coupled to the display control means 210.

If the display control means 210 now receives an input signal indicating a pitch class via the input signal terminal 220, the display control means controls the output field 230 such that, depending on the input signal, the output field 230 outputs a corresponding output signal. Depending on the concrete implementation of the output field 230, this may here be, for example, a predetermined output field radial direction with regard to an output field center, to which the corresponding pitch class is assigned. A concrete technical realization here is that on an LCD display (liquid crystal display), a screen or another (pixel-based) display the associated output field direction is optically emphasized in the form of a line, a sector of a circle, a section of a small circle or an area in the corresponding output field radial direction or by another possibility.

In the case of a mechanical output field, for example below the respective output field radial direction, with regard to the output field center a corresponding element of the output field may vibrate, be raised or be otherwise mechanically accentuated. By this, it is, for example, also possible to make a corresponding accentuation discernable for a blind person.

It is further possible that the output field comprises a plurality of output areas on an oval/circular output field periphery and that, in with corresponding controlling process an associated output area is accentuated by the display control means 210. Also in this case the accentuation may be in an optical or mechanical way, i.e., for example, also by a corresponding output area being illuminated or by a mechanical vibration of the output area. By this, within the scope of the present application, an oval/circular arrangement is an arrangement, wherein, with regard to a central point, the elements of the arrangement, here the output areas, are arranged under a plurality of angles with regard to a zero direction with a radius depending on the angle. A difference between an occurring maximum radius and an occurring minimum radius is here typically different from a mean radius by less than 70% and advantageously by less than 25%.

Apart from an independent use of an inventive device 200, for example in the form of an illustration on a screen, a display or another output field, the inventive device 200 may also be combined with an inventive device 100 for generating a note signal. In case of a combination of an inventive device 100 for generating a note signal and an inventive device 200 for outputting an output signal indicating a pitch class into a system, the operating means 110 and/or the assignment function which may be implemented in the control means 120 and the output field 230 may be tuned to each other so that the operating means 110 and/or the output field 230 spatially models the assignment function. Here, within the scope of the present application, a "spatial modeling" is an arrangement, wherein elements of an arrangement, i.e., for example, input means, output field radial directions and output areas, are arranged with regard to a central point so that elements which are associated with a certain pitch class are arranged under such an angle that also an assignment function assigns the corresponding pitch class to the corresponding angle. A corresponding embodiment represents the so-called Harmony-Pad which is described further below.

The chromatic scale consists of a sequence of twelve semitones which respectively have a pitch interval of a minor second. In other words, the chromatic scale includes twelve semitones which belong to an octave. To each pitch and semitone thus a frequency of a sound wave or another mechanical vibration is assigned. Due to the conventional division of the audible spectrum into octaves with respectively exactly twelve semitones in western music, each pitch and semitone of a certain octave and within an octave may thus be associated with a certain pitch class. In other words, this means that a semitone is clearly determined by the octave and its pitch class.

In other words, this means that a pitch class is referred to when, with regard to a pitch, it is disregarded to which octave it belongs. In western music and its instruments, i.e., for example, the piano, twelve pitch classes D, D sharp, E, F, F sharp, G, G sharp, A, A sharp, B and/or H, C and C sharp are defined, wherein, for reasons of clarity, enharmonic mix-ups are not mentioned here.

In music, a prime or a prime interval designates an interval of a semitone, wherein the starting pitch and the ending pitch are counted. In other words, two pitches with a prime interval have the same frequency and/or basic frequency (frequency ratio of the pitches 1:1), so that it is the same pitch. A minor second or an interval of a minor second in music is a pitch interval of two semitones, wherein also here the two pitches forming the interval are counted. Accordingly, a minor third and/or an interval of a minor third is a pitch interval of four semitones, a major third or a major third interval is an interval with five semitone steps and a fifth and/or a fifth interval is an interval with eight semitones, wherein the two pitches forming the interval are respectively counted.

In the notation of pitch classes, within the scope of the present application there is often a difference between upper-case and lower-case pitch classes. If a pitch class is designated by an upper-case letter, like, for example, C or F, this indicates that the corresponding pitch class is the base pitch (keynote) of a corresponding major triad, i.e. in the above case a C major triad or an F major triad. Correspondingly, pitch classes within the scope of the present invention representing a base pitch of a minor triad are designated by lower-case letters. An example of this is the a minor triad.

To enable a better understanding of the embodiments discussed in the further course of the present invention, first of all the synthesis of sensibly sounding pitch combinations will now be examined before the analysis of pitch combinations, the positioning variants of base pitches in the pitch space, the mathematical model description and the harmony analysis based on the symmetry model and on the circle of thirds are described in further sections.

Synthesis of Sensibly Sounding Pitch Combinations

The basic principle behind all embodiments proposed in this document is the following: in a so-called pitch space, base pitches and/or pitch classes are placed so that adjacent pitches and/or pitch classes make sensibly sounding pitch combinations. Here, within the scope of the present application, in general an oval/circular arrangement of the base pitches is taken as a basis. Due to this placement, it is possible to create harmonically sounding music by the selection of a suitable level section or space section. Based on the arrangement of the base pitches in an oval/circular arrangement, the level section and/or range/space section includes at least one input angle or one input angle range, as far as an input angle or input angle range was selected by the user at all. The selected space section may be varied infinitely or in leaps regarding its extension and its center of mass, i.e. its position. Apart from that, it is possible to occupy the selected space section with a selection weighting function. The selection weighting function makes it possible to define the relative volume at which the base pitches and/or pitch classes detected by the space section are to be played. Base pitches are thus placed at discrete positions of the pitch space.

But what happens with the positions in between? Which pitches sound when a space section was selected which lies in between two discrete base pitches? In order to solve this problem, in addition to the selection weighting function, a spatial pitch distribution function is defined. Each base pitch and/or pitch class placed in the pitch space has a function, which is in this case called a spatial single pitch distribution function. By introducing the spatial pitch distribution function and/or the spatial single pitch distribution function, wherein a corresponding spatial single pitch distribution function is associated with each pitch class and/or each base pitch, the spatial pitch distribution function results as an overlay (e.g. by addition, considering the pitch classes) of the spatial single pitch distribution function. The spatial pitch distribution function thus ensures that a pitch not only occupies an infinitely small discrete point and/or in case of an oval/circular pitch space an individual angle, but a section of a range and/or a finite angle range. The space sections occupied by two base pitches may here overlap. Thus, an angle may have more than one associated pitch class, in particular two pitch classes. The spatial pitch distribution function, and thus also the spatial single pitch distribution function are partial aspects of the assignment function, which may, for example, be stored in the control means, but also outside, for example in a memory. The principles presented here thus offer completely new possibilities in the creation of polyphonic audio signals, as it will become clear with reference to the description of the embodiments in the further course of the present application. Opportunities offered by this arrangement of base pitches in the pitch space are explained in more detail in the further course with reference to FIGS. 4 and 5.

Figure 4A:
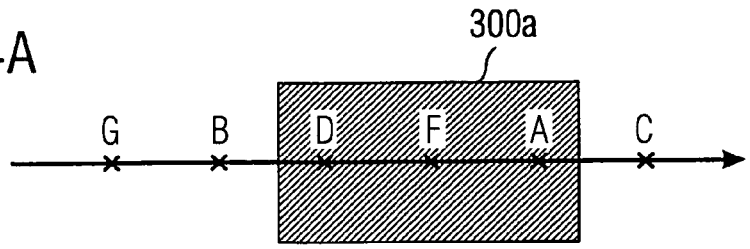
FIG. 4A shows a schematic illustration of an angle range mapped to a straight line with an assignment of pitch classes and an input angle or an input angle range.

FIG. 4A shows a schematic illustration of an angle range mapped to a straight line with an assignment of pitch classes, wherein here, for reasons of clarity, the pitch classes are not designated by upper-case and lower-case letters to specify the associated pitch color (minor triad or major triad) in more detail, as it was explained above. The direction of the arrow here indicates the direction of increasing angles and/or the clockwise direction. In FIG. 4A, the base pitches G, H, D, F, A and C are placed in the one-dimensional pitch space. Further, a range/space section 300A is selected which comprises the pitches of the D minor chord (D-F-A). If the pitch space illustrated in FIG. 4A graphically illustrated the assignment function of the inventive device 100 for generating a note signal and in addition to that the selected space section 300a represented the input angle range, then a sound generator connected to the inventive device 100 would play a d minor chord. By the selection of the space section 300a, thus a d minor chord would be generated.

Figure 4B:
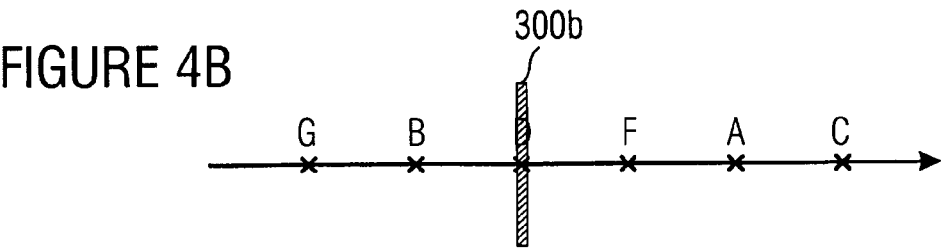
FIG. 4B shows a schematic illustration of an angle range mapped to a straight line with an assignment of pitch classes and an input angle or an input angle range.

In FIG. 4B, the pitch space which was already illustrated in FIG. 4A is again illustrated. In contrast to FIG. 4A, in FIG. 4B, however, a space section 300b is shown which is very small compared to the space section 300a. The space section 300b has an extension which almost disappears and/or is zero, which would correspond to a selection of an individual angle, i.e. an individual input angle. The space section 300b lies directly on a base pitch, i.e. the base pitch D. A connected sound generator would now play the individual pitch D.

Figure 4C:
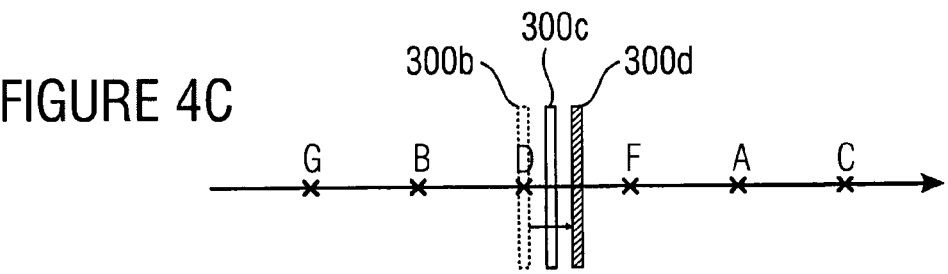
FIG. 4C shows a schematic illustration of an angle range mapped to a straight line with an assignment of pitch classes and three input angle ranges transferred into one another.

In FIG. 4C, again the already illustrated space section of FIG. 4A is illustrated. FIG. 4C shows how the space section 300b which was already illustrated in FIG. 4B is continuously moved from the position of the base pitch D via a position of a space section 300c in a center position between the base pitch D and the base pitch F, so that the space section 300b will have changed into a space section 300d at the end of its movement. A connected sound generator would fade out the sounding pitch D regarding its volume and fade in the pitch F regarding its volume according to the position of the space section 300b, 300c or 300d, when the volume information is included in the generated note signals. Details with regard to fading in and fading out of pitches are given by the selection weighting function and the spatial pitch distribution function, which are explained in more detail below. While FIG. 4B shows a generation of a single pitch, FIG. 4C shows a cross-fading between adjacent base pitches.

Figure 4D:
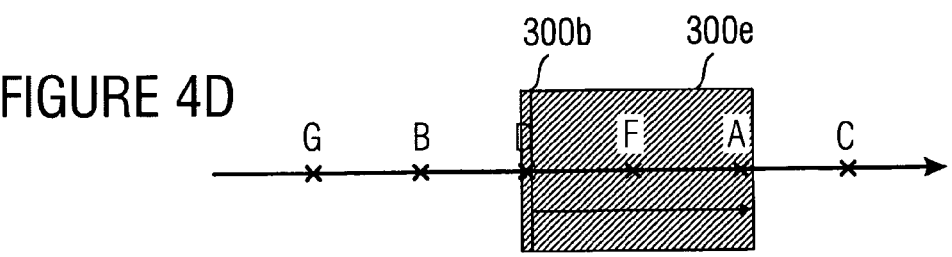
FIG. 4D shows a schematic illustration of an angle range mapped to a straight line with an assignment of pitch classes and an input angle range of an increasing magnitude.

In FIG. 4D, an example for a cross-fading between a single pitch and a chord is illustrated. Thus, in FIG. 4D, again the pitch space which was already illustrated in FIG. 4A is illustrated. In this case, the selected space section is continuously extended to a width of a triad, starting from the space section 300b of FIG. 4B, which corresponds to a space section 300e. A connected pitch generator would at the beginning again only play the pitch D. Subsequently, during the extension of the selected space section, the pitch F would slowly be faded in and subsequently the pitch A. Hereby, the pitch D is continuously "converted" into a D minor triad.

Figure 4E:
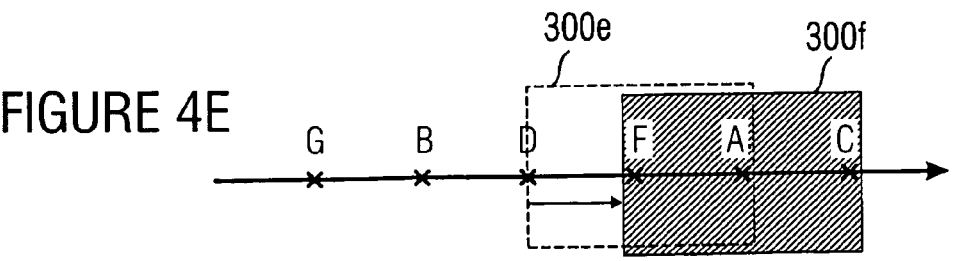
FIG. 4E shows a schematic illustration of an angle range mapped to a straight line with an assignment of pitch classes and two input angle ranges.

In FIG. 4E, a cross-fading between different chords is illustrated. FIG. 4E thus shows how the space section 300e of FIG. 4D is continuously shifted so that the same is changed into a new space section 300f. The space section 300f then does not start with the pitch D, but with the pitch F. A connected pitch generator would thus at the beginning play a D minor chord and then subsequently continuously cross-fade the same into an F major chord.

Figure 5A:
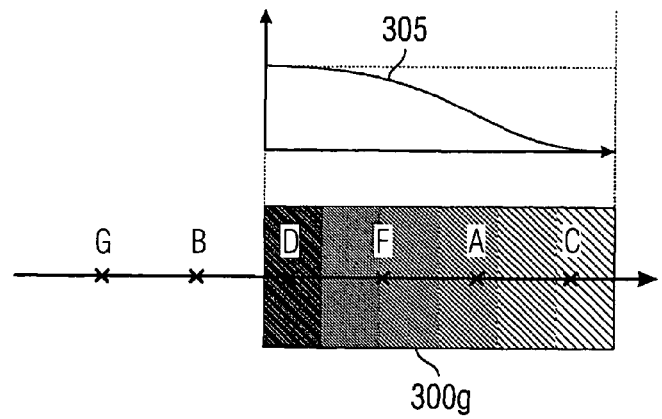
FIG. 5A shows a schematic illustration of an angle range mapped to a straight line with an assignment of pitch classes and an input angle range weighted with a selection weighting function.

In FIG. 5A, the effect of a selection weighting function is illustrated. Thus, FIG. 5A again shows the pitch space already known from FIG. 4A. In FIG. 5A, the selected space section includes the pitches D, F, A and C. Without introducing a selection weighting function, a connected sound generator would play a D minor 7 chord, wherein all pitches have the same volume. By introducing a selection weighting function 305, as it is also illustrated in FIG. 5A, the volume of each pitch may be adapted. In this example, the selection weighting function 305 is selected such that an emphasis is on the base pitch D and the third F of the chord and that the fifth A and the seventh C are played with a reduced volume.

Figure 5B:
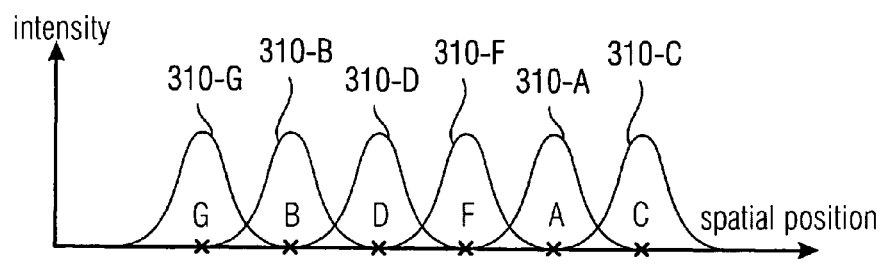
FIG. 5B shows a schematic illustration of an angle range mapped to a straight line with an assignment of pitch classes and a spatial pitch distribution function which is, for example, angle-dependent like in our example.

In FIG. 5B, the influence of a spatial pitch distribution function is illustrated. Thus, FIG. 5B again shows the pitch space already illustrated in FIG. 4A. Each base pitch and/or each pitch class has in this example an associated spatial pitch distribution function 310-C, 310-A, 310-F, 310-D, 310-B(H) and 310-G, however. By this, each base pitch is not only associated with a discrete location and/or an individual angle, but is also defined in a certain environment around the base pitch. Hereby, in the example illustrated in FIG. 5B, a bell-shaped spatial single pitch distribution function is associated to each base pitch.

Figure 5C:
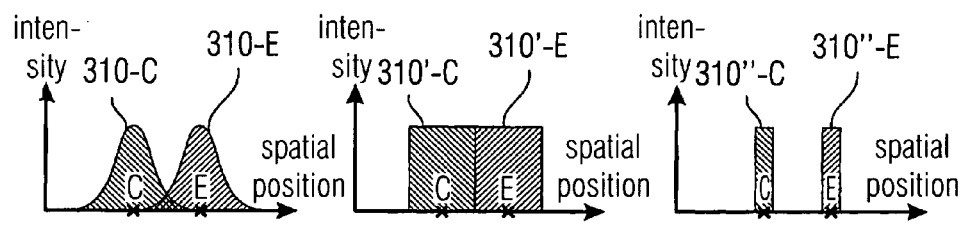
FIG. 5C shows a schematic illustration of three spatial pitch distribution functions.

In FIG. 5C, three examples of different space distribution functions and/or spatial pitch distribution functions are illustrated. In more detail, FIG. 5C shows three examples of spatial single pitch distribution functions which are plotted associated with their respective base pitches and/or pitch classes. In FIG. 5C on the left two bell-shaped single pitch distribution functions 310-C, 310-E are illustrated in a pitch space which only includes the two base pitches and/or pitch classes C and E. The two spatial single pitch distribution functions 310-C and 310-E comprise a maximum volume information in the form of an intensity in their respective base pitches and/or pitch classes C and E. Starting from the base pitches C and E, the volume information quickly drops off. In an area of the pitch space which lies between the two base pitches C and E, the two spatial single pitch distribution functions overlap, so that an inventive device for generating a note signal would generate note signals which correspond to both pitch classes, when, for example, the input angle is in this area of the pitch space.

The middle partial illustration of FIG. 5C shows a further possibility of a spatial single pitch distribution function. In this partial illustration, over the same pitch space as it is also illustrated in FIG. 5C on the left, two rectangular spatial single pitch distribution functions 310'-C and 310'-E are illustrated. The two spatial single pitch distribution functions 310'-C, 310'-E respectively extend starting from their associated base pitch C and E towards both sides across an angle range and/or a space area which corresponds to half a distance of two adjacent base pitches in the pitch space. Within these space areas, the volume information in the form of the intensity is in this example constant. Apart from that, in contrast to the example illustrated on the left in FIG. 5C, the two spatial single pitch distribution functions 310'-C and 310'-E do not overlap.

In FIG. 5C on the right a third example of two spatial single pitch distribution functions 310"-C and 310"-E are illustrated with respect to the pitch space already illustrated on the left in FIG. 5C. In contrast to the two spatial single pitch distribution functions 310'-C and 310'-E, the angle ranges and/or space areas in which the two spatial single pitch distribution functions 310"-C and 310"-E comprise a volume information which is unequal to zero are clearly reduced. But also here, these two spatial single pitch distribution functions are rectangular, so that, independent of the exact position within the spatial range in which the two spatial single pitch distribution functions have a volume information unequal to zero, the same is constant.

If, as already explained with reference to FIG. 4, a sound generator is connected to an inventive device for generating a note signal, and if a very narrow space section or also an individual input angle is shifted as an input angle range respectively starting from the base pitch C from left to right to the base pitch E, the following will happen regarding to sound: in the case illustrated on the left in FIG. 5C, a soft cross-fading between the pitches C and E would take place. While one pitch is faded out, the other is slowly faded in. In the case illustrated in the middle of FIG. 5C, the pitch C will sound for some time. Suddenly the pitch C will fall silent and the pitch E will sound. In the case illustrated on the right in FIG. 5C, the pitch C will sound for a short time, while the input angle and/or the very small input angle range is within the space area in which the spatial single pitch distribution function 310"-C comprises a volume infor-mation which is unequal to zero. Subsequently, when the input angle and/or the very small input angle range has left this range, the connected sound generator would generate no pitch, so that in this case there is silence. If subsequently the input angle or also the very small input angle range reaches the space area in which the spatial single pitch distribution function 310"-E comprises a volume information which is unequal to zero, the pitch E will sound.

Apart from that, FIG. 5C offers the possibility to examine the assignment function more closely regarding the pitch classes associated with an angle. In particular, three cases are of practical importance in this context: first of all, no pitch class, one pitch class or two pitch classes may be associated with a certain angle.

In the case that no pitch class is associated with an angle, for example the case plotted on the right in FIG. 5C may be present. In this case, the corresponding angle is in the space area between the two spatial single pitch distribution functions 310"-C and 310"-E. In more detail, the corresponding angle is in the space area between the base pitch C and E, in which both spatial single pitch distribution functions 310"-C and 310"-E comprise a negligible volume information. If, based on the corresponding angle, the pitch distribution function in a first direction is regarded, which is, for example, the direction indicated by the arrow of the abscissa in the clockwise direction with regard to the definition amount of the complete angle range of a circle underlying the assignment function, a first next-neighbor angle is an angle which has the associated pitch class E. In a second direction which is opposite the first direction, starting from the corresponding angle a second next-neighbor angle is reached which has, based on the assignment function, an assigned pitch class C. These two pitch classes assigned to the first next-neighbor angle and the second next-neighbor angle now comprise a smallest pitch interval which corresponds to a major third. In this connection it has to be noted that in principle the two pitch classes C and E may also comprise other larger pitch intervals than that of a major third. The reason for this is that base pitches and/or pitch classes comprise no indications regarding octaving and/or octave positions. For this reason, the two pitch classes C and E, for example, also comprise a pitch interval of a minor sixth, which is, however, larger than the smallest pitch interval which corresponds to a major third.

If the corresponding angle has one associated pitch class, however, this may also be illustrated using the assignment function illustrated on the right in FIG. 5C. In this context it is to be noted that this case is divided into several sub-cases. First of all, the corresponding angle may, for example, lie within the space area and/or angle range to which the assignment function, here in the form of the spatial single pitch distribution function 310"-C, assigns the pitch class C. If, thus, the corresponding angle lies within the area in which the spatial single pitch distribution function 310"-C comprises a volume information unequal to zero, then the first next-neighbor angle and the second next-neighbor angle are angles which are "directly adjacent" to the corresponding angle, as the spatial single pitch distribution function 310"-C assigns the pitch class C with corresponding constant volume information to a continuous angle range. In this context within the scope of the present application, the term "directly adjacent" is a mathematical description in the sense of an $\epsilon$ environment. In this case, the pitch class C is assigned both to the first next-neighbor angle and also to the second next-neighbor angle, which both, with regard to the pitch class assigned to the corresponding angle, comprise a prime interval as the smallest pitch interval, as the three assigned pitch classes are all identical. Also here it is to be noted that, due to the missing information regarding the octaving of the base pitches and/or pitch classes between the pitch class C and the pitch class C, for example, there may be a pitch interval of an octave which does not represent the smallest pitch interval, however.

In a second sub-case of the case in which one pitch class s assigned to the corresponding angle, the same is, for example, a "corner angle" of the space area in which the spatial single pitch distribution function 310"-C comprises a volume information unequal to zero. In this context, the term "corner angle" means that the pitch class C is still assigned to the corresponding angle, but that in the example illustrated in FIG. 5C on the right, no pitch class is assigned to each angle which comprises a distance (and/or interval) from the corresponding angle in the first direction (i.e. in a clockwise direction) which is smaller than half the distance of the two indicated base pitches. More simply, the angle directly adjacent to the corresponding angle has no assigned pitch class. In this case, the first next-neighbor angle in the first direction in FIG. 5C on the right corresponds to the left corner angle of the space area in which the spatial single pitch distribution function 310"-E comprises a volume information unequal to zero.

The second directly adjacent angle has also the associated pitch class C as in the above sub-case. In this case, the pitch class associated with the corresponding angle and the pitch class associated with the first next-neighbor angle again comprise a minor third as the smallest pitch interval, while the pitch class associated with the corresponding angle and the pitch class associated with the second next-neighbor angle comprise a prime as a smallest pitch interval. Accordingly, further sub-cases result in addition to this case when, for example, a pitch class is only associated with one single angle and the corresponding angle corresponds to this angle.

The case in which the corresponding angle has two associated pitch classes is only to be explained with reference to one single sub-case, which is illustrated on the left in FIG. 5C. On the left in FIG. 5C this, for example, applies to the angle and/or the spatial position exactly between the two pitch classes C and E. This sub-case shows analogies to the first sub-case described further above, in which one pitch class was associated with the corresponding angle. Also in this case, both the first next-neighbor angle and also the second next-neighbor angle are arranged "directly adjacent" to the corresponding angle, so that the two pitch classes C and E are also associated to these two angles. Also here, consequently, the smallest pitch intervals between the pitch classes associated with the corresponding angle and the pitch classes associated with the two next-neighbor angles are primes (C-C and E-E) or major thirds (C-E and E-C).

The opening angle of the symmetry circle and/or the selected space sections may also be interpreted as the "jazz factor". The greater the angle, the more jazz-typical pitches (tones) sound and/or are added. Among those are 7th chords, 7th-9th chords and 7th-9th-13th chords.

Analysis of Existing Pitch Combinations

In the following, the basic principle for the analysis of a pitch combination is explained in more detail. The principle for the synthesis of sensible sound combinations described in the above paragraphs may be reversed to analyze existing sound combinations. Just like in the synthesis, in a first step base pitches have to be positioned in the pitch space in such a way that adjacent base pitches result in sensible sound combinations. The thus generated pitch space is, however, not used to determine pitches to be generated but to represent and analyze already existing pitches. By this it is possible to examine whether an existing pitch combination is "sensible" or not with regard to the definition existing in the form of the pitch space. If a pitch combination is sensible, then the base pitches of this pitch combination are represented in spatially adjacent areas. If a pitch combination is less sensible, the base pitches are illustrated in remote areas. The advantage of this principle is that the term "sensible pitch combination" and the term "senseless pitch combination" are not rigid, but may be redefined by a reorganization of the base pitches in the pitch space.

FIG. 6 shows four examples of an output on the output field 230 of the inventive device 200 for outputting an output signal indicating a pitch class. Here, for a simplification of the illustration, the oval/circular arrangement of the output field radial directions and/or the output areas was "broken up" into a straight line. The oval/circular arrangement of the output field radial direction and/or the underlying angle range were thus mapped to a straight line. By this, a more compact illustration of the output field 230 with different illustrated pitches, pitch combinations and sound combinations is possible. The arrows indicated in FIGS. 6A-6D here again indicate the direction of increasing angles and/or the clockwise direction. In FIGS. 6A-6D thus a pitch space is illustrated which includes the pitch classes G, H, D, F and A.

Figure 6A:
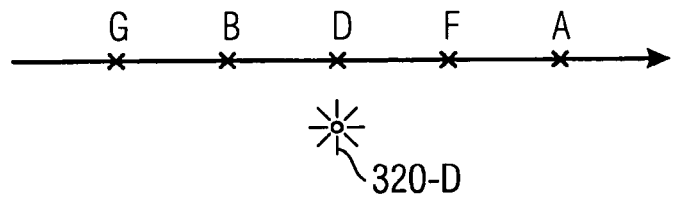
FIG. 6A shows a schematic illustration of an angle range mapped to a straight line with an accentuation of an angle allocated to a pitch class.

FIG. 6A shows the case where a sounding of a pitch with a pitch class D is indicated as an input signal to the display control means 210. In this case, the display control means 210 controls the output field 230 such that the base pitch (and/or pitch class) corresponding to the pitch is marked in the pitch space of the output field 230 when the corresponding pitch sounds. In the example illustrated in FIG. 6A, on the output field 230 a marking and/or an accentuation 320-D appears, which is, for example, an optical signal, i.e. a lighting up of a corresponding lamp, button or the like, or a mechanical accentuation, for example in the form of vibration. In the example illustrated in FIG. 6A, thus the pitch D sounds, which is then illustrated on the output field 230.

Figure 6B:
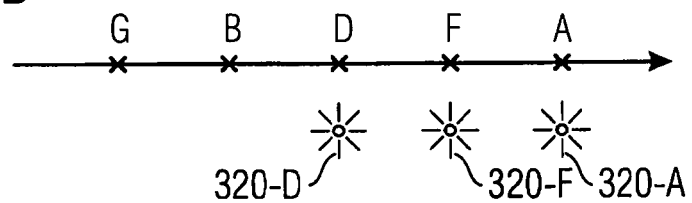
FIG. 6B shows a schematic illustration of an angle range mapped to a straight line with an assignment of pitch classes and an accentuation of three consonantly and/or harmonically sounding pitch classes.

FIG. 6B shows the case that several pitches sound simultaneously, which result in a sensible pitch combination. In this case, in the pitch space which is illustrated on the output field 230, adjacent base pitches are marked and/or accentuated. From this it may be deduced that the spatial concentration of active base pitches and/or pitch classes in the pitch space is a measure for meaningfulness, i.e. for the perceived consonance. In particular, FIG. 6B illustrates this using a d minor chord, which corresponds to a sensible pitch combination. In this case, when the corresponding chord sounds in the pitch space, i.e. on the output field 230, the base pitches D, F and A are accentuated by corresponding markings and/or accentuations 320-D, 32-F and 320-A.

Figure 6C:
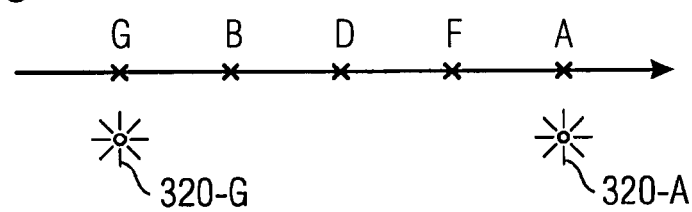
FIG. 6C shows a schematic illustration of an angle range mapped to a straight line with an assignment of pitch classes and an accentuation of two pitch classes not sounding very harmonic.

If pitches resulting in a less sensible pitch combination sound simultaneously, then the corresponding base pitches in the pitch space and thus on the output field which spatially models the pitch space are very far apart. From this it may be deduced that the spatial extension of active base pitches in the pitch space is a measure for senselessness, i.e. for the perceived dissonance. In the example illustrated in FIG. 6C, the pitches G and A sound, i.e. a corresponding input signal is provided to the display control means 210 via the input signal terminal 220, so that on the output field 230 the associated base pitches G and A are marked by markings and/or accentuations 320-G and 320-A. The interval generated by these pitches is one second, which is generally perceived to be relatively dissonantly sounding. FIG. 6C thus shows a marking of the pitch space on the output field 230 when a less sensible pitch combination sounds, i.e. a second.

Figure 6D:
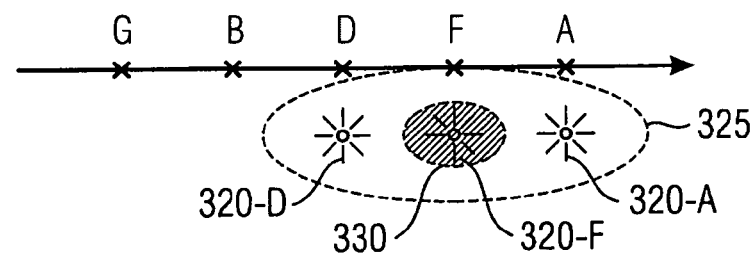
FIG. 6D shows a schematic illustration of an angle range mapped to a straight line with an assignment of pitch classes, three angles associated to harmonically sounding pitch classes and two accentuated angle ranges.

With several sounding pitches it is possible not only to mark the associated base pitches, but also to calculate a corresponding area on the output field 230 which includes the sounding pitches, and a center of mass (focus) of all sounding pitches in the pitch space and represent the same by a corresponding marking. Such a calculation is possible with the help of the sum vector explained further below. The center of mass again enables to assess the sound color of complicated pitch combinations. FIG. 6D shows an example for a display on a corresponding output field 230 for a D minor chord. Thus, in the example illustrated in FIG. 6D, not only the base pitches D, F and A are marked by the markings 320-D, 320-F and 320-A already illustrated in FIG. 6B, but rather also an area 325 is indicated which includes the sounding base pitches and/or their markings. In addition to that, also the position of the center of mass is illustrated by an additional marking 330.

Positioning Variants of Base Pitches in the Pitch Space

What is a "sensible pitch combination" and what is a "senseless pitch combination"? There is no general answer to this question. What we think to be sensible and what we think to be senseless or what we think to be consonant and/or to be dissonant strongly depends on subjective factors like taste, culture, education, etc. and may differ from person to person. Just as no global answer can be given to the above question, it is not possible to find an arrangement of base pitches in the pitch space which provides valid statements for all people and all musical styles. It is, however, possible to find positioning variants, with the help of which statements about tonal connections and perceived sound perceptions may be made which hold true for a great number of persons. The circle of thirds and the symmetry model, which are explained in the following paragraphs, are two systems which enable exactly this.

The Symmetry Model

The symmetry model enables defining and/or analyzing many tonal connections for pieces of music which follow the classical major cadence. The technical use of the symmetry model is new. The explanations in this sections are based on the example of the C major scale and may be applied to all other major scales. In summary, it may be said that the key differentiation features of the symmetry model are 1. the selection of the mapped pitches
2. the sequence and
3. the symmetrical arrangement of these pitches around the symmetry axis.

Figure 7:
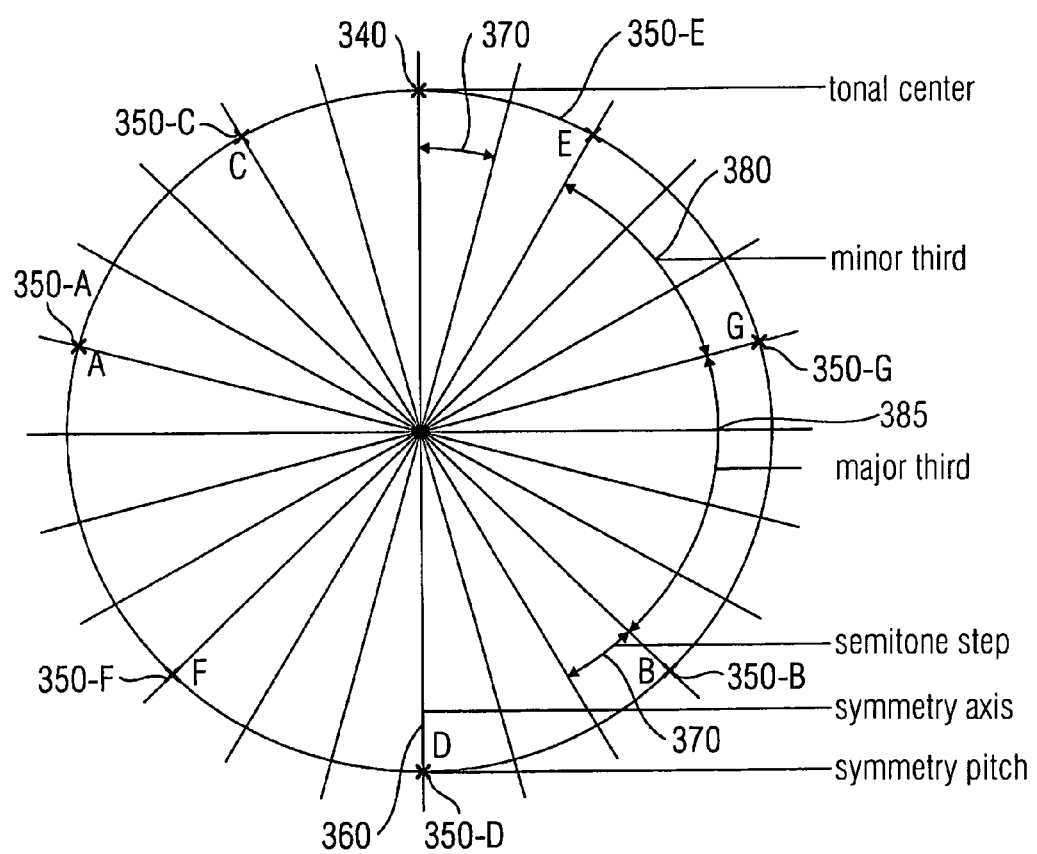
FIG. 7 shows an illustration of the symmetry model and/or the cadence circle based on the example of the diatonic scale C major and/or a minor.

FIG. 7 shows a graphical illustration of the symmetry model in the form of the so-called cadence circle or the C major scale and/or for the a minor scale. Within the scope of the present application, the terms "symmetry model" and "cadence circle" are partially used synonymously. The symmetry model positions the seven pitches of the diatonic scale and/or the seven pitch classes of the diatonic scale 350-D, 350-F, 350-A, 350-C, 350-E, 350-G and 350-B on a circle or an oval/circular arrangement. In particular the sequence of the pitches on the circle is new here. The pitches and/or pitch classes are not positioned in equal distances on the circle, but—starting from the second pitch 350-D, i.e. the pitch D—alternatingly in minor and major thirds under a defined angle.

A second, very critical feature is the symmetrical arrangement of the pitches around an imaginary symmetry axis 360. The symmetry axis 360 runs exactly through the location 350-D of the second pitch of the scale (D), which is why the same is referred to as symmetry pitch. The remaining and/or further pitches of the scale are positioned symmetrically left and right around the symmetry pitch 350-D.

If the order and the symmetry of the pitches is maintained, different possibilities remain to determine the exact position of the base pitches. One possibility which is used within the scope of the symmetry model is to position the pitches on the circle according to their pitch interval. For this purpose, the circle is divided into 24 segments 370. Each segment 370 corresponds to a semitone interval, as it is indicated in FIG. 7. As a minor third corresponds to three semitones and a major third corresponds to four semitones, two pitches forming a minor third are positioned at a distance of three segments 370 and two pitches forming a major third are positioned at a distance of four segments 370. Each segment 370 thus corresponds to an angular distance of 360°/24=15°. It follows from this that the distance which corresponds to a distance of a minor third comprises an opening angle of 3.15°=45°. Accordingly, two pitch classes which have a distance of a major third as the smallest pitch interval comprise an opening angle of 4.15°=60°.

In FIG. 7, an example for such a minor third 380 between the two pitches E and G and an example for a major third 385 between the two pitches G and B(H) is indicated. FIG. 7 thus all in all shows the arrangement of the base pitches in the pitch space according to the symmetry model. The pitches are—as already mentioned above—positioned symmetrically around the symmetry axis 360 passing through the symmetry pitch D 350-D. The symmetry results from the pitch intervals of the base pitches.

Here, a tonic area is an area of the symmetry model illustrated in FIG. 7 which includes the four pitch classes A (350-A), C (350-C), E (350-E) and G (350-G), i.e. is located in the area of the tonal center 390. In the illustration selected in FIG. 7, an area designated the dominant area extends as a symmetry model starting from the tonal center 390 in a clockwise direction approximately into the area of the symmetry pitch D (350-D). The dominant area includes the four pitch classes E (350-E), G (350-G), B and/or H (350-H) and D (350-D). Accordingly, an area referred to as the subdominant area extends, starting from the tonal center 390, in a counter-clockwise direction also up to the symmetry pitch D (350-D), wherein the same includes the pitch classes C (350-C), A (350-A), F (350-F) and D(350-D). More details regarding this and the importance of the tonic area, the subdominant area and the dominant area are contained in the dissertation by David Gatzsche with the title "Visualisierung musikalischer Parameter in der Musiktheorie" (dissertation of the Frank Liszt School of Music Weimar 2004). From the symmetry model, many sensible tonal connections result which may, on the one hand, be used for the synthesis and, on the other hand, for the analysis of audio and pitch information. In the following, some of these connections are listed:

1. Dissonantly sounding pitch combinations are represented by base pitches positioned far apart, consonantly sounding pitch combinations by geometrically adjacent base pitches. The further two base pitches are positioned apart from each other, the more dissonant the pitch combination generated by the same sounds.

2. Any third intervals, major and minor chords, seventh chords, 7th-9th chords and diminished chords which may be generated using the pitches of the diatonic major scale are illustrated by adjacently positioned base pitches. This especially results from the sequence of the pitches and their circular arrangement.

3. The model geometrically reflects connections regarding functional theory and/or music theory. On the one hand, the base pitches of major chords and parallel minor chords are geometrically directly adjacent. On the other hand, the pitches of tonic chords (a minor and C major) are positioned in the center with regard to the symmetry axis 360, those of subdominant chords (F major and d minor) are arranged on the one side, e.g. left of the symmetry axis 360 and those of dominant chords (G major and e minor) on the other side (e.g. on the right) of the symmetry axis 360.

4. Pitches which have a great strive for resolution, like, for example, the pitch B and/or H, also referred to as the leading note, or the fourth pitch of the scale (F), are positioned geometrically on the symmetry circle remote from a point 390 referred to as the tonal center, the tonic area. Pitches which have a small strive for resolution are positioned close to the tonal center 390.

5. From the symmetry model, the principle of Riemann of six-fold pitch representation may easily be deduced, which is described in the publication of Hugo Riemann "Ideen zu einer 'Lehre von den Tonvorstellungen' ", Jahrbuch der Musikbibliothek Peters, Jahrgang 21/22 (1914/15), p. 11. According to this principle, each pitch may be a base pitch, a third and a fifth, both of a major chord and also a minor chord. From the symmetry model for each pitch three of these six possibilities result. Thus, for example, the pitch C may be part of the triads F-A-C, A-C-F and C-E-G.

6. At the point where the circle is closed, i.e. at the symmetry pitch D 350-D, there is neither a minor chord nor a major chord, but a diminished triad which is made up of two minor thirds. This chord is the only chord which consists of two equal intervals in the cadence circle and/or the symmetry model in FIG. 7. This chord contains the symmetry pitch 350-D in the center and is thus formed symmetrically, which is why it is also referred to as symmetry chord within the scope of the symmetry model.

The symmetry model and/or the cadence circle are described, explained and discussed regarding music theory in more detail in the dissertation of David Gatzsche with the title "Visualisierung musikalischer Parameter in der Musiktheorie" of the Liszt School of Music Weimar (Weimar, 2004).

The Circle of Thirds

Figure 8:
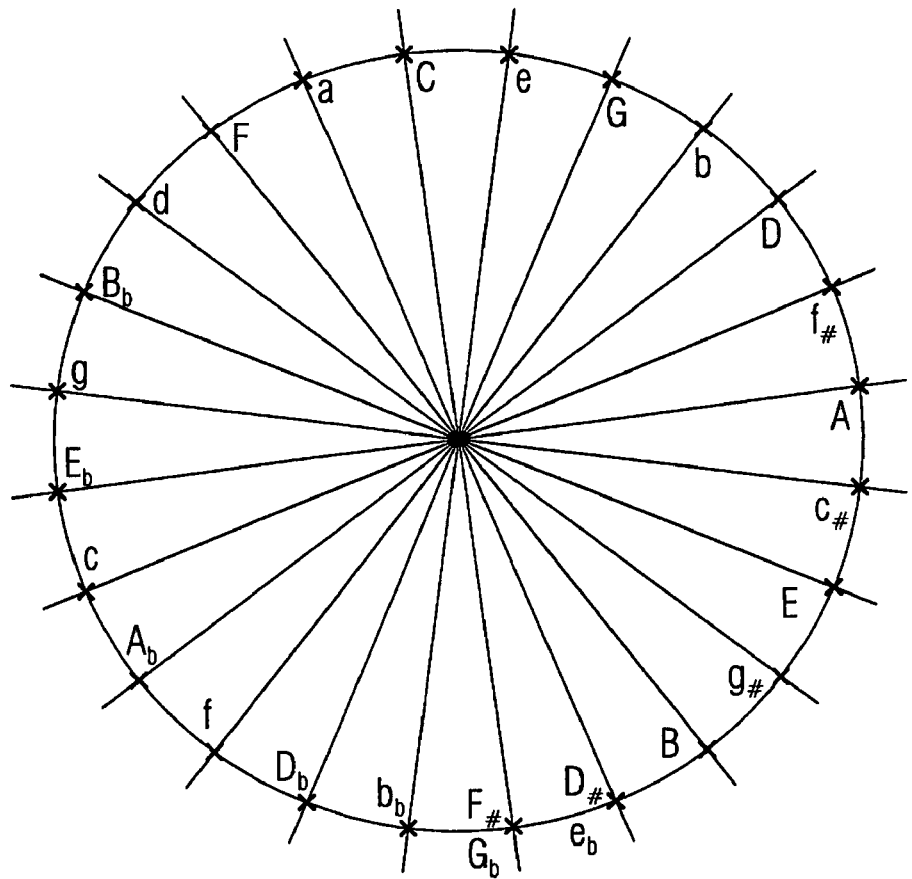
FIG. 8 shows an illustration of a circle of thirds.

In the same way as the symmetry model maps connections within a diatonic key, the circle of thirds illustrates connections across keys, as is illustrated in FIG. 8. The circle of thirds not only maps the seven pitches of a diatonic scale in the pitch space, but all twelve pitches of the chromatic scale, ovally/circularly and/or in a closing arrangement. Further, each base pitch not only occurs once, but twice in the circle of thirds. This is why the circle of thirds contains 24 pitches and/or pitch classes. The order of the pitches basically corresponds to the pitch order of the symmetry model. The pitches are arranged in intervals of thirds, i.e. alternatingly in minor and major thirds. While there is a location of discontinuity in the symmetry model at the location of the diminished chord, i.e. at the symmetry pitch 350-D, such a discontinuity may not be found in the circle of thirds. By this arrangement of the base pitches in the pitch space according to the circle of thirds, a number of connections regarding music theory open up which are explained in the following. In contrast to the symmetry model illustrated in FIG. 7, regarding the circle of thirds the pitch classes are equidistantly distributed on the periphery of the circle of thirds. The pitch classes thus have an angular distance of 360°/24=15° to each other. In this case a difference is not made with regard to the angular distance whether the smallest pitch interval of two directly adjacent pitch classes corresponds to a distance of a major third or a minor third.

Figure 9:
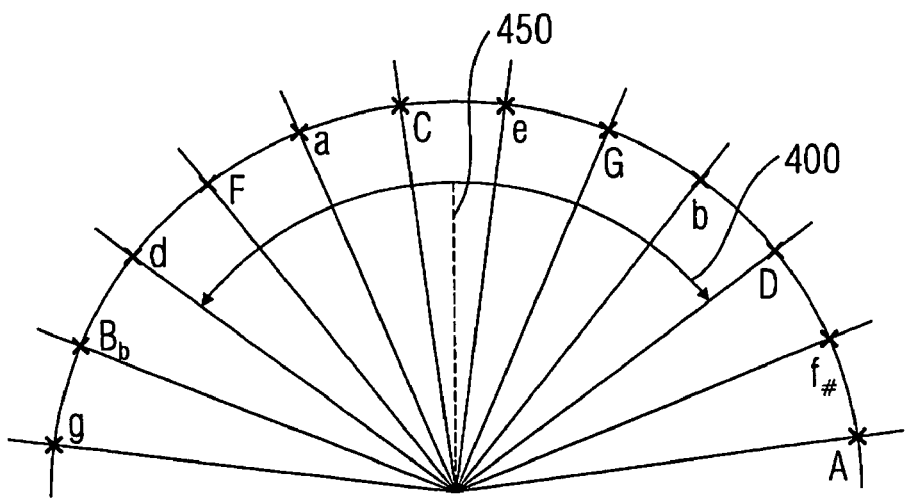
FIG. 9 shows an illustration of the diatonic key C major and/or a minor in the circle of thirds.

FIG. 9 shows a section of the circle of thirds illustrated in FIG. 8. Diatonic keys, like, for example, C major or a minor are illustrated and/or mapped in the circle of thirds by a single continuous segment of a circle. The segment of a circle 400 is limited at both sides by the symmetry pitch D of the key. A symmetry axis 405 passes through the center of the circle segment. If this circle segment 400 is removed out of the circle of thirds and opened like a fan so far that the two straight sides contact, then exactly the symmetry model described in the above paragraphs results. FIG. 9 thus shows an illustration of a diatonic key in the circle of thirds.

Figure 10:
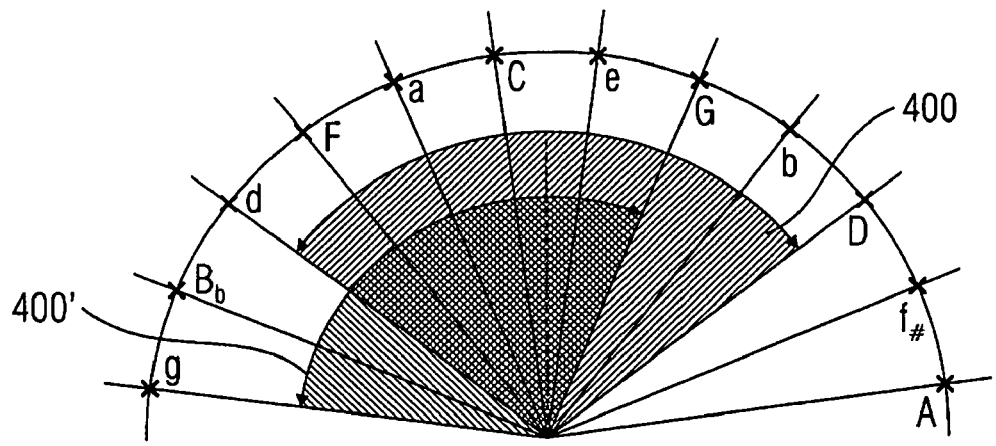
FIG. 10 shows an illustration of the common pitch classes of two adjacent keys at the circle of thirds.

In FIG. 10 the things two adjacent keys have in common are illustrated. For this purpose, in FIG. 10 the already indicated circle segment 400 which corresponds to the key C major and/or a minor is illustrated together with a further circle segment 400', which corresponds to the key F major. Neighboring keys like C major and F major are thus directly next to each other in the circle of thirds. In the illustration selected in FIG. 10, common pitches are thus in an area represented by overlapping circle segments.

Figure 11:
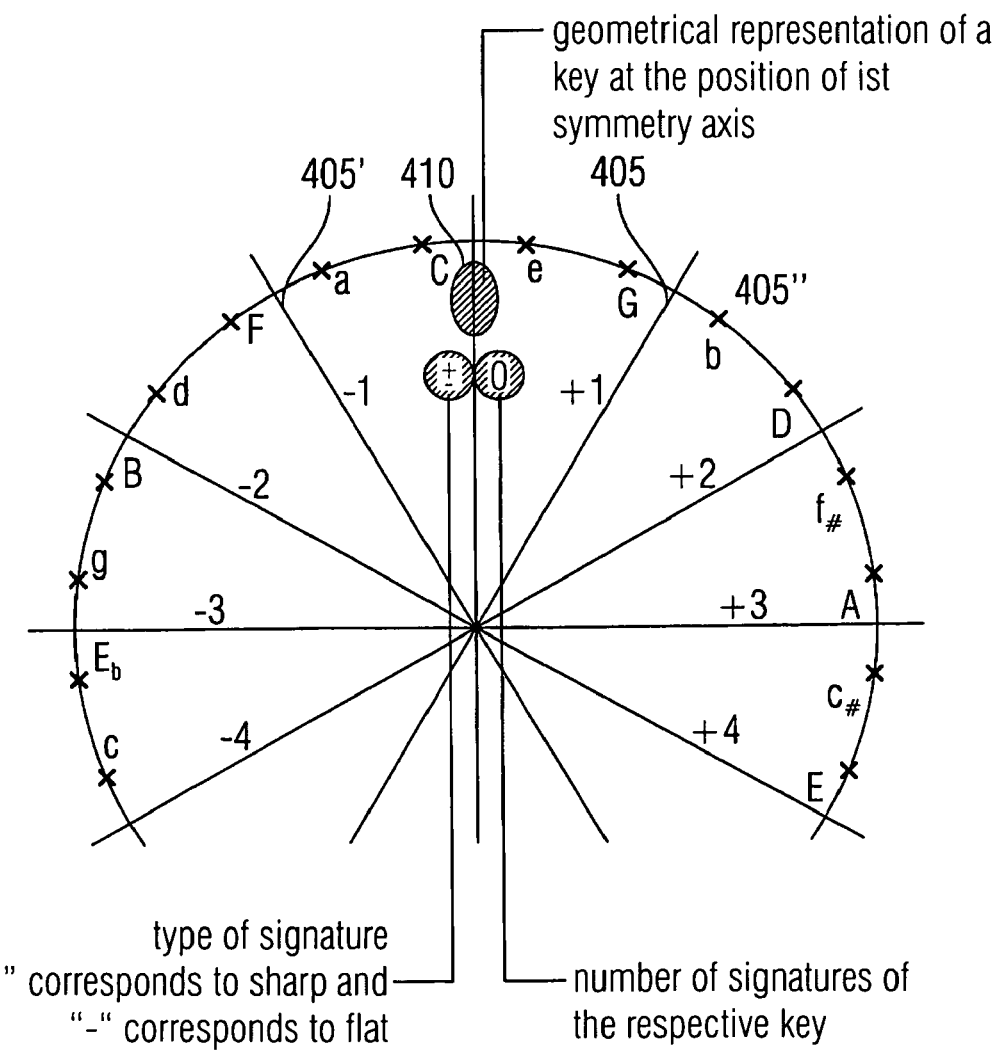
FIG. 11 shows an illustration of contexts regarding music theory at the circle of thirds.

With regard to a section of the circle of thirds, FIG. 11 illustrates that the symmetry axis of a diatonic key, for example the symmetry axis 405 of the key C major exactly passes through a center of mass 410 of the circle segment 400 representing the key. In other words, the center of mass 410 of the area 400 of a diatonic key (in FIG. 11 of the key C major) is located at the position of the symmetry axis 405. For this reason it is sensible to represent keys like C major or a minor not at the location of their keynote, i.e. the pitches C (major) and/or a (minor), but at the location of their symmetry axis 405.

The circle of thirds is further perfectly suitable for illustrating relationships between keys. Related keys, i.e. keys which have many common pitches, are illustrated adjacently in the circle of thirds. Keys which have little to do with each other are positioned remotely in the circle of thirds. Based on the symmetry axis 405 of the key C major and/or a minor, thus also the type and the number of key signatures belonging to a key may easily be determined. Thus, for example in FIG. 11 a symmetry axis 405' of the key F major is indicated which is rotated 30° counterclockwise in the circle of thirds with regard to the symmetry axis 405. The keys C major and F major are only slightly different with regard to the seven pitches of the underlying diatonic scale. Only the pitch b and/or H is replaced by the semitone which lies below the same by one minor second, so that the key F major compared to the key C major has an additional signature (b flat). A corresponding consideration also holds true for the key G major represented by a symmetry axis 405". In contrast to the key F major, the key G major has a # as a signature. Accordingly, the symmetry axis 405" for the key G major is rotated clockwise by 30° in the circle of thirds compared to the symmetry axis 405 for the key C major.

Figure 12:
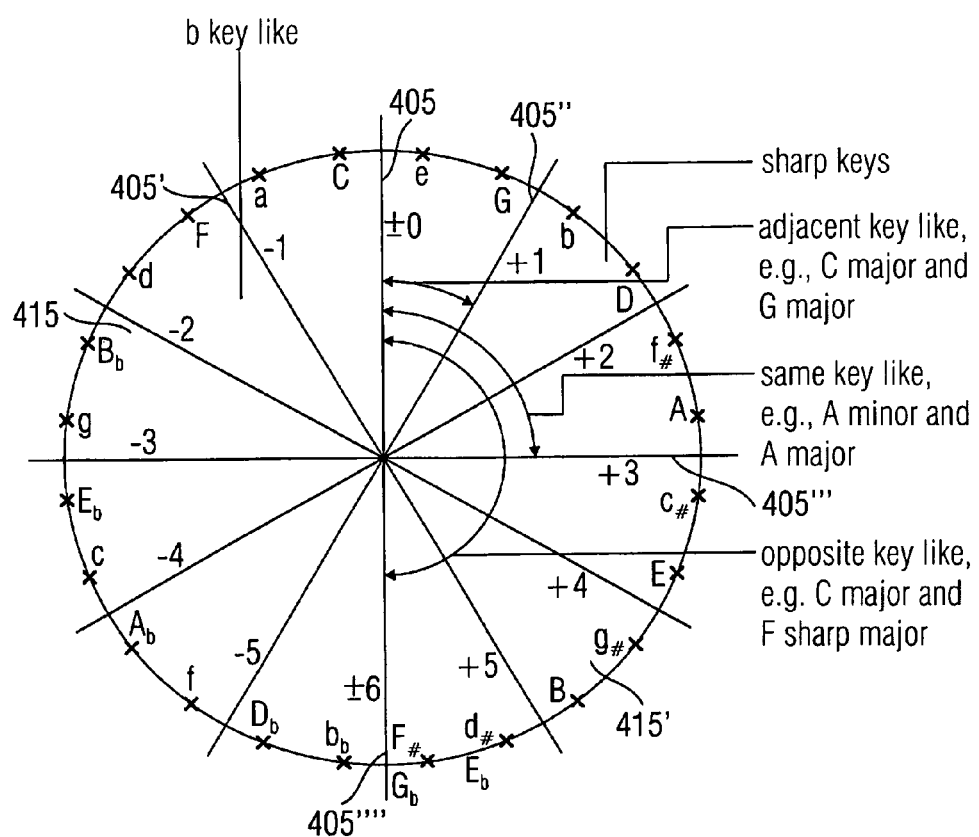
FIG. 12 shows an illustration of the relationships between keys in music theory at the circle of thirds.

This consideration may also be used for all further keys, as it is also illustrated in FIG. 12. Thus, all flat keys occupy the left half of the circle and/or the circle of thirds. These keys all have a negative signature/sign (−). The sharp keys which have a positive signature (+) occupy the right half 415' of the circle and/or the circle of thirds. Keys of the same letter, such as a minor and A major, are positioned at a distance of 90° in the circle of thirds, as a comparison of the symmetry axes 405 and 405''' shows. Further, the circle of thirds illustrates that keys which have very little to do with each other are positioned far apart from each other. Thus, e.g. opposite keys, such as C major with the symmetry axis 405 and F sharp major with a symmetry axis 405'''' are positioned exactly opposite from each other, i.e. in an angular distance of 180°. FIG. 12 thus shows that the circle of thirds may map/indicate relationships between keys very well.

FIG. 13 illustrates that, in contrast to other base pitch arrangements, like, e.g. a chromatic arrangement which is illustrated on the left in FIG. 13, common pitches of adjacent keys in the circle of thirds are next to each other without gaps in between, as the right side of FIG. 13 illustrates. Thus, on the right side in FIG. 13, the circle segment 400 belonging to the key C major and the circle segment 400' belonging to the key F major are illustrated. The illustration on the right side of FIG. 13 thus corresponds to an arrangement of thirds and/or arrangement of the circle of thirds. A chromatic base pitch arrangement is confronted with this arrangement in FIG. 13. The individual segments 400a-400e and the circle segments 400'a-400'e correspond to the circle segments 400 and/or 400', as they are illustrated on the right in FIG. 13. FIG. 13 thus shows that the circle of thirds, compared to a chromatic base pitch arrangement, illustrates relationships between adjacent keys in a significantly better way.

Figure 14:
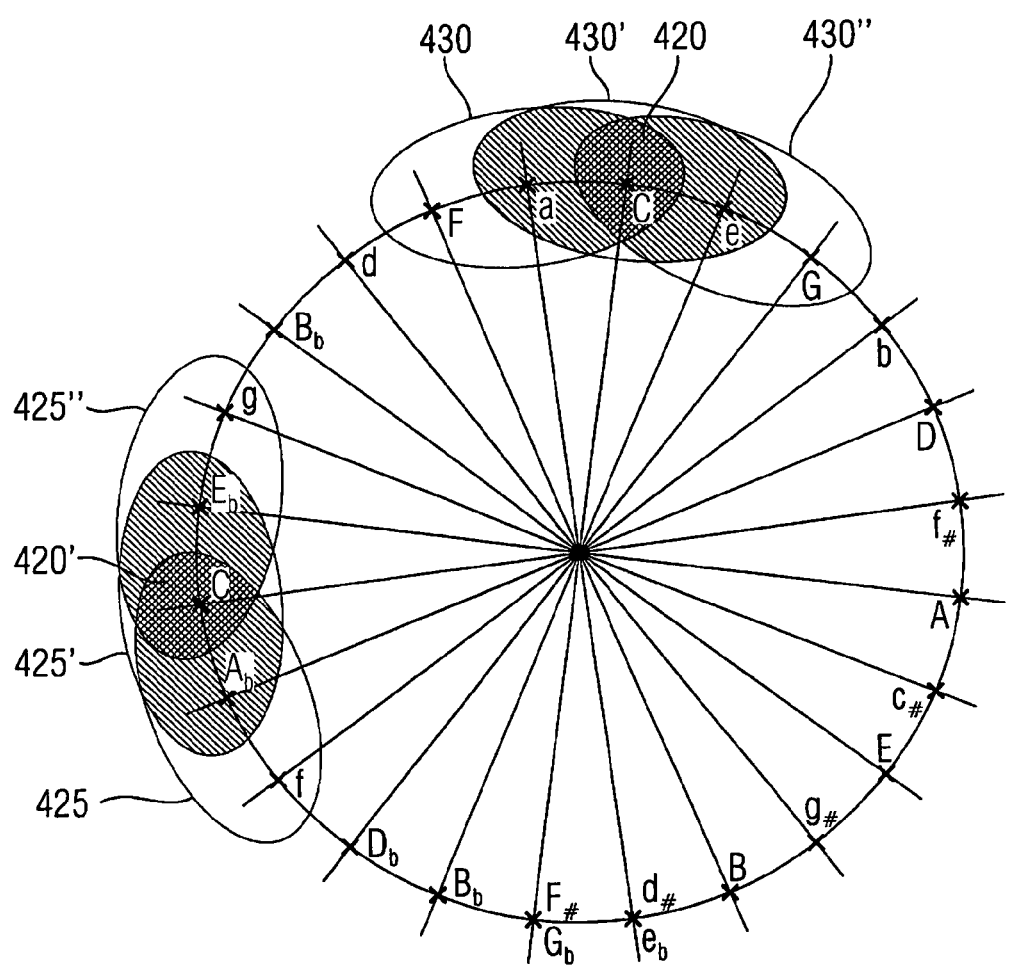
FIG. 14 shows an illustration of the principle of the sixfold pitch utilization based on the example of the pitch class C in the circle of thirds.

FIG. 14 shows that the principle of a six-fold use of pitches in the circle of thirds is perfectly mapped and/or illustrated. Based on the example of the pitch and/or pitch class C, FIG. 14 shows the Riemann principle of six-fold pitch utilization. According to this principle, a pitch may be a base pitch, a third and a fifth both of a minor chord and also of a major chord. The pitch and/or the pitch class C appears at two positions 420, 420' in the circle of thirds. In more detail, the pitch C occurs in a major context (C major), which corresponds to the position 420, and in a minor context (c minor), which corresponds to the position 420'. The pitch C is here part of the chords f minor (area 425), A flat major (area 425') and c minor (area 425''). Further, the pitch C is part of the chords F major (area 430), a minor (area 430') and C major (area 430''). Thus, the symmetry model reflects the principle of Riemann on the six-fold pitch utilization. As illustrated in FIG. 14, these connections may be deduced from the circle of thirds very easily. It remains to be mentioned that further the base pitches of major chords and parallel minor chords are directly adjacent.

It is a further positioning alternative for the circle of thirds and the symmetry model (symmetry circle) to mirror the circle of thirds and/or the symmetry model each around an axis which runs horizontally in the figures, so that in the case of the symmetry model the tonic area of a certain (major) key lies at the bottom, while the diminished area would go to the top. This would offer different didactic advantages. In particular, it is thus possible to perform a pendulum analogy between a (western) piece of music and a description, for example in the symmetry model. A (attenuated) pendulum is deflected into one direction, then swings for a while and comes to rest. The stronger the pendulum is deflected to one side, the stronger it will also swing in the other direction.

A pendulum which, for example, is hung up at a central point of the symmetry model, as it is, for example, illustrated in FIG. 7, which is, however, mirrored around the horizontal axis, is initially hung up deflected in the tonic range. When it is excited to swing, it starts to swing and after a while again ends up in the tonic area. The stronger the pendulum is deflected in this case, for example, into the subdominant area, the stronger it subsequently swings into the dominant area. Many harmonic courses of very popular chord sequences in western music here follow the principle that after chords positioned in the subdominant area often chords follow which lie in the opposing dominant area. Further, many songs and pieces of music end in the tonic area which impressively completes the analogy to a swinging pendulum, as described above.

Even if, within the scope of the present application, the circle of thirds, as it is, for example, illustrated in FIG. 8, and the symmetry model, as it is, for example, illustrated in FIG. 7, are described and illustrated uniformly, of course also a horizontally and/or vertically mirrored positioning variant of the base pitches in the pitch area may be used. In addition to that, any arrangement of the base pitches rotated around any angle and/or a positioning variant of the base pitches mirrored around any axis in the plane may be used. Even if the illustration of the embodiments within the scope of the present invention is generally based on an arrangement of the base pitches in the symmetry model (see FIG. 7) and the circle of thirds (see FIG. 8), this is not to be regarded in a limiting sense. Mirrored or rotated base pitch arrangements may thus, for example, be used within the scope of an operating means of an inventive device for generating a note signal or within the scope of an output field of an inventive device for outputting an output signal indicating a pitch class.

Mathematical Model Description

Pitch Class

As it has already been described in the introductory paragraphs of the present invention, reference is made to a pitch class when, regarding a pitch, it may be disregarded to which octave it belongs. On the piano the twelve pitch classes D, D sharp, E, F, F sharp, G, G sharp, A, A sharp, B, C and C sharp are defined, wherein in this enumeration the indication of enharmonic equivalencies has been omitted for clarity. Each pitch class t has an associated basic index $m_t$ and an extended index $n_t$. The basic index $m_t$ and the extended index $n_t$ are both integer numbers, wherein Z illustrates the amount of integer numbers. The following applies:

$$0 \leq m_t \leq 11, m_t \epsilon Z \quad (1)$$

$$-\infty < n_t < +\infty, n_t \epsilon Z \quad (2)$$

The basic index $m_t$ is a one-time or unique numbering of all 12 pitch classes. The extended index $n_t$ deals with the fact that the pitch classes logically form a circle and/or may be arranged periodically on the same, wherein after the last pitch class again the first pitch class follows. For this reason it is desirable that the extended index $n_t$ may be counted on infinitely. Each pitch class thus has many extended indices. Using the following calculation rules the basic index and the extended index may be converted into each other:

$$n_t = m_t + k \cdot 12, k \epsilon Z \quad (3)$$

$$m_t = [(n_t \bmod 12) + 12] \bmod 12 \quad (4)$$

It is an important question which pitch class t is provided with which basic index $m_t$. According to what is known in the field, the pitch and/or pitch class C is provided with the basic index $m_t = 0$ to indicate the fact that this pitch is the base pitch of the simplest key C major which has no signature. At this point within the scope of the present application a different definition is used, however, which leads to some simplifications for the following calculations: the basic index $m_t = 0$ is not associated to the pitch C, but to the pitch D, because the pitch D is the symmetry pitch of the key C major which has no signature and thus also forms the geometric center of mass of the key in the third and symmetry circle. Thereby, the following index assignment and/or assignment of basic indices $m_t$ to the pitch classes t results, which is illustrated in the following Table 1. The following applies:

| | Pitch class t | | | | | | | | | | | |
|---|---|---|---|---|---|---|---|---|---|---|---|---|
| | D | D sharp | E | F | F sharp | G | G sharp | A | A sharp | B | C | C sharp |
| Basic index $m_t$ | 0 | 1 | 2 | 3 | 4 | 5 | 6 | 7 | 8 | 9 | 10 | 11 |

Circle of Thirds

The circle of thirds consists of 24 pitches in a distance of major and minor thirds. These pitches are referred to as real pitches r because they represent actually sounding pitches. To be able to place the real pitches r geometrically on the circle of thirds, an addition of auxiliary pitches h is required. Two adjacent auxiliary pitches have a semitone interval (second) and, similar to the pitch classes, they have a basic index $m_h$ and an extended index $n_h$. Two adjacent auxiliary pitches thus have the extended indices $n_h$ and $(n_h+1)$. Similar to the above paragraph, the following applies:

$$-42 \leq m_h < +42 \quad (5)$$

$$-\infty < n_h < +\infty \quad (6)$$

The auxiliary pitches h are used to define the semitone raster consisting of 84 elements which lies behind the circle of thirds: the basic index $m_h$ of the auxiliary pitches h does not go from 0 to 11 like with the pitch classes, but from −42 to +41, as equation 5 shows. Auxiliary pitches which contribute to the definition of keys having a negative signature (flat keys) thus obtain a negative signature. Auxiliary pitches which contribute to the definition of keys with a positive signature (sharp keys and/or # keys) have a positive signature. The basic index $m_h$ and the extended index $n_h$ may be converted into each other according to the following rule:

$$n_h = f_1(m_h) = m_h + 84 \cdot k, \, k \in Z \quad (7)$$

$$m_h = f_2(n_h) = \left\{84 + \left[\left(n_h + \frac{84}{2}\right) \bmod 84\right]\right\} \bmod 84 - \frac{84}{2} \quad (8)$$

To each auxiliary pitch h having the extended index $n_h$, a pitch class t having the extended index of the pitch class $n_t$ is associated. By the definition of Table 1, no conversion of the indices $n_h$ and $n_t$ into each other is necessitated. Rather, for the pitch class t of an auxiliary pitch h having the extended index $n_h$ it applies that the extended index $n_t$ of the pitch class t corresponds to the extended index $n_h$ of the auxiliary pitch. Thus, the following equation applies:

$$n_t(n_h) = n_h \quad (8a)$$

The conversion of the extended index $n_t$ into the basic index $m_t$ of the pitch classes t is then performed according to equation 4. The following table 2 exemplarily shows the assignment of pitch classes t having the extended index $n_t$ to auxiliary pitches h having the extended index $n_h$ and/or vice versa:

| $n_h$ | −42 | −41 | ... | 0 | ... | 40 | 41 | 42 |
|---|---|---|---|---|---|---|---|---|
| $n_t = n_h$ | −42 | −41 | ... | 0 | ... | 40 | 41 | 42 |
| $m_t = f_3(n_t)$ | 6 | 7 | ... | 0 | ... | 4 | 5 | 6 |
| T | Gis | A | ... | D | ... | F-sharp | G | G-sharp |

Geometrically, each auxiliary pitch h having the extended index $n_h$ may also be represented and/or presented as the vector $\vec{h}_{n_h}$. This vector $\vec{h}_{n_h}$, as compared to a zero vector, has an angle α. The calculation of the angle α is here performed such that the auxiliary pitch h with the extended index $n_h=0$ has the angle 0°. A vector $\vec{h}_0$ is associated to the auxiliary pitch h having the extended index $n_h=0$. The vector $\vec{h}_0$ is thus designated as the zero vector. Thus, the pitch class and/or the pitch D is associated with the auxiliary pitch h having the extended index $n_h=0$.

Apart from the angle α, also a length and/or a magnitude is associated to each auxiliary pitch, which is in the following also referred to as energy s of the auxiliary pitch. In other words, the energy s of the auxiliary pitch h reappears in the form of the absolute value of the vector $\vec{h}_{n_h}$. The following applies:

$$\vec{h}_{n_h} = s \cdot e^{j\alpha} = s \cdot e^{j2\pi \frac{n_h}{84}} \quad (9)$$

wherein the formula symbol j is the imaginary variable. The following applies:

$$j = \sqrt{-1}, \, j^2 = -1 \quad (9a)$$

Apart from the auxiliary pitches h, there are also the real pitches r. The real pitches are the 24 pitches actually present on the circle of thirds and form a subset of the set of auxiliary pitches $M_h$. Each pitch r is either the base pitch of a major chord (+) or the keynote/base pitch of a minor chord (−). For this reason, the set of real pitches $M_r$ may be divided into a subset $M_{r+}$ and $M_{r-}$. The following applies:

$$M_{r\pm} := \{h_{n_h} | n_h = 7k \pm 2, k \in Z\} \quad (10)$$

With the help of the mathematical fundamentals declared so far it is also possible to represent pitch mixes in the circle of thirds. Here, a vector $\vec{r}$ is associated to each real pitch r. A sum of two real pitches $r_a$ and $r_b$ in the circle of thirds may thus be realized by the sum of the vectors $\vec{r}_a$ and $\vec{r}_b$ belonging to the two real pitches $r_a$ and $r_b$. The result of such a summation is the so-called sum vector $\vec{r}_{sum}$, which points to the geometric center of mass of the two pitches:

$$\vec{r}_{sum} = \vec{r}_a + \vec{r}_b \quad (11)$$

Each pitch class t reappears on the circle of thirds in the form of two real pitches r, i.e. once as a base pitch of a major chord $r_{nr+}$ and as the base pitch of a minor chord $r_{nr-}$. Equation 12 shows a calculating rule, using which the associated real pitches $r_{nr-}$ and $r_{nr+}$ of a circle of thirds associated to a given pitch class t having an extended index $n_t$ may be found.

$$n_{nr\pm} = f(n_t) = 7^2 n_t \pm 12 \quad (12)$$

It was noted above that a set of real pitches in the circle of thirds may be described by a sum vector $\vec{r}_{sum}$. It was further determined that each pitch class t reappears in the form of two real pitches $r_{nr-}$ and $r_{nr+}$ in the circle of thirds. Thus, it is possible to represent a pitch class t with an extended index $n_t$ by a sum vector $$\vec{r}_{sum} = \vec{r}_{nr-} + \vec{r}_{nr+} \quad (12a)$$

in the circle of thirds. The following applies:

$$\vec{r}_{sum} = \vec{r}_{nr-} + \vec{r}_{nr+} \quad (13)$$
$$= e^{j2\pi \frac{nr-}{84}} + e^{j2\pi \frac{nr+}{84}}$$
$$= e^{j2\pi \frac{7^2 n_t - 12}{84}} + e^{j2\pi \frac{7^2 n_t + 12}{84}}$$
$$\approx 1.25 \cdot e^{j2\pi \frac{7^2 n_t}{84}}$$

The factor 1.25 results for all pitch classes and may thus be disregarded. Using the connections of equation 13 it is possible to represent a set of pitch classes $M_t$ by a circle of thirds sum vector $\vec{r}_{sum}$. The following applies:

$$\vec{r}_{sum} = f_4(M_t) \qquad (14)$$
$$= \sum \vec{r}_{sum_t} \text{ mit } \vec{r}_{sum_t}$$
$$= s_{n_t} \cdot e^{j2\pi \frac{72 n_t}{84}},$$
$$n_t \in M_t$$

From the circle of thirds sum vector in turn the key and/or signature number v and the type of signatures may be derived. The circle of thirds sum vector has an angle $\alpha$ which fulfils the relationship $$\alpha = \frac{2\pi n_{h_{sum}}}{84} \qquad (15a)$$

wherein $n_{h_{sum}}$ represents the "extended index" of the circle of thirds auxiliary pitch to which the sum vector $\vec{r}_{sum}$ points. The following applies:

$$n_{h_{sum}} = \frac{84\alpha}{2\pi} \qquad (15b)$$

so that for the number of signatures v the following applies:

$$v = \frac{n_{h_{sum}}}{7} = \frac{84\alpha}{14\pi} = \alpha \frac{6}{\pi} \qquad (15c)$$

It is further interesting that the circle of thirds sum vector $\vec{r}_{sum}$ belonging to a pitch class t is identical to the symmetry vector of the key represented by the pitch class. Thus, for example for the pitch class D, the following applies:

$$\vec{r}_{sum}(t=D) = \vec{h}_0 \qquad (15d)$$

Symmetry Circle

The mathematical description of the symmetry circle is similar to the description of the circle of thirds. The following explanations only hold true for diatonic keys without signatures like C major or a minor. To be able to illustrate the following embodiments also for transposed versions, a so-called transposition factor $\tau$ has to be introduced to consider the fact that the symmetry circle relates to a certain diatonic key. The symmetry circle and/or the cadence circle of the symmetry model contains seven real pitches $r_m$ in a distance of minor and major thirds. The same are placed on a semitone raster consisting of 24 auxiliary pitches h. Each of the auxiliary pitches also has a basic index $m_h$ and an extended index $n_h$, with the help of which an auxiliary pitch h may be uniquely identified on the circle of thirds. The following applies:

$$-12 \leq m_h < +12 \qquad (16)$$

$$-\infty < n_h < +\infty \qquad (17)$$

The indexing of the auxiliary pitches h in the circle of thirds is selected such that auxiliary pitches h having a negative index, in particular a negative basic index $m_h$, belong to the subdominant area and auxiliary pitches h with a positive index and/or a basic index $m_h$ belong to the dominant area. A very small absolute index value $|m_h|$ indicates that the real pitch r is close to the tonic area and/or the tonal center. The absolute value of the index $|m_h|$ is a measure for how far a pitch is apart from the tonic area and/or the tonal center. Thus, the basic index $m_h$ and the extended index $n_h$ may be converted into each other according to the following rule:

$$n_h = f_5(m_h) = m_h + 24 \cdot k, \qquad (18)$$
$$k \in Z, \tau \in Z$$

$$m_h = f_6(n_h) = \left\{24 + \left[\left(n_h + \frac{24}{2}\right) \mod 24\right]\right\} \mod 24 - \frac{24}{2} \qquad (19)$$

The assignment of a pitch class t with an extended index $n_t$ to an auxiliary pitch h with an extended index $n_h$ happens in the same way as with the circle of thirds: by the selected indexing of the pitch classes according to Table 1, a conversion of the indices of the pitch classes $n_t$ into the indices of the auxiliary pitches of the symmetry circle $n_h$ is not essential. The following applies:

$$n_h = n_t \qquad (20)$$

The real pitches of the symmetry circle r are a subset of the auxiliary pitches. The real pitches of the symmetry circle may be divided into three groups: into real pitches forming the base pitch of a
1. major chord ($r_{n+}$)
2. a minor chord ($r_{n-}$) or
3. a diminished chord ($r_{n0}$).

The set of real pitches $M_r$ is set up as follows:

$$M_r := M_{r\pm} \cup M_{r0}$$

$$M_{r\pm} := \pm\{h_n, n=7k\pm 2, |k| \leq 1\} \qquad (21)$$

$$M_{r0} := \{h_{12}\}$$

Each auxiliary pitch h with the extended index $n_h$ may also be represented as a vector $\vec{h}_{nh}$. Also this vector $\vec{h}_{nh}$ comprises an angle $\alpha$ which is here selected such that the symmetry pitch of the key $h_0$ represented by the symmetry circle has the angle $0$. The vector $\vec{h}_0$ is therefore also called the zero vector. Also in this case again the absolute value and/or the length of the vector is referred to as energy s. In other words, the energy of the pitch is indicated using the formula sign s:

$$\vec{h}_{nh} = s \cdot e^{j\alpha} = s \cdot e^{j2\pi \frac{n_h}{24}} \qquad (22)$$

A set of given pitch classes $M_t$ may also be described by a sum vector $\vec{r}_{sum}$ in the symmetry circle. The symmetry circle does not contain all pitches, but only the pitches of the selected diatonic key. If one wants to represent an amount (a set) of given pitch classes $M_t$ on the circle of thirds, first of all the intersection $M_t \cap M_r$ has to be formed from the given pitch classes $M_t$ and the real pitches present on the symmetry circle and/or the amount of real pitches $M_r$ present on the symmetry circle. For this intersection, subsequently the sum vector $\vec{r}_{sum}$ may be formed.

$$\vec{r}_{sum} = f_7(M_t) = \sum \vec{r}_n \text{ mit } \vec{r}_n = s_n \cdot e^{2\pi \frac{n}{24}}, \qquad (23)$$
$$n \in M_t \cap M_r$$

Symmetry Model-based and Circle of Thirds-based Harmony Analysis

Circle of Thirds-based Harmony Analysis

With the help of a circle of thirds-based key analysis, as it is explained in more detail in the following section, valuable information about content features of an audio and/or pitch signal may be obtained. In particular, according to equation 13, any amount of pitch classes may be summarized and described in the form of a sum vector $\vec{r}_{sum}$. The same provides valuable conclusions on content features of the underlying audio and/or pitch signal.

As already explained in connection with equations 15a-15c, the angle $\alpha$ of the sum vector $\vec{r}_{sum}$ indicates in which key a piece of music is at a certain point of time. Thus, for example the sum vector has the angle $\alpha=0$ for the pitch classes of the C major scale. This corresponds exactly to the point on the circle of thirds and/or is exactly at the location where the symmetry pitch and thus the representation of the key C major is located.

The absolute value of the sum vector $|\vec{r}_{sum}|$ is in addition to that an estimate which describes how sure it is that a certain diatonic key is present and/or how defined the tonal context is. If the absolute value is very high, then it is quite sure that the pitch classes belong to a certain key. In other words, with an increasing absolute value of the sum vector $|\vec{r}_{sum}|$ the probability increases that the pitch classes belong to a certain key. If the absolute value is very small, however, either only very few different pitch classes are present, so that the key may not be reliably determined, or the pitch classes belong to completely different keys.

Figure 15:
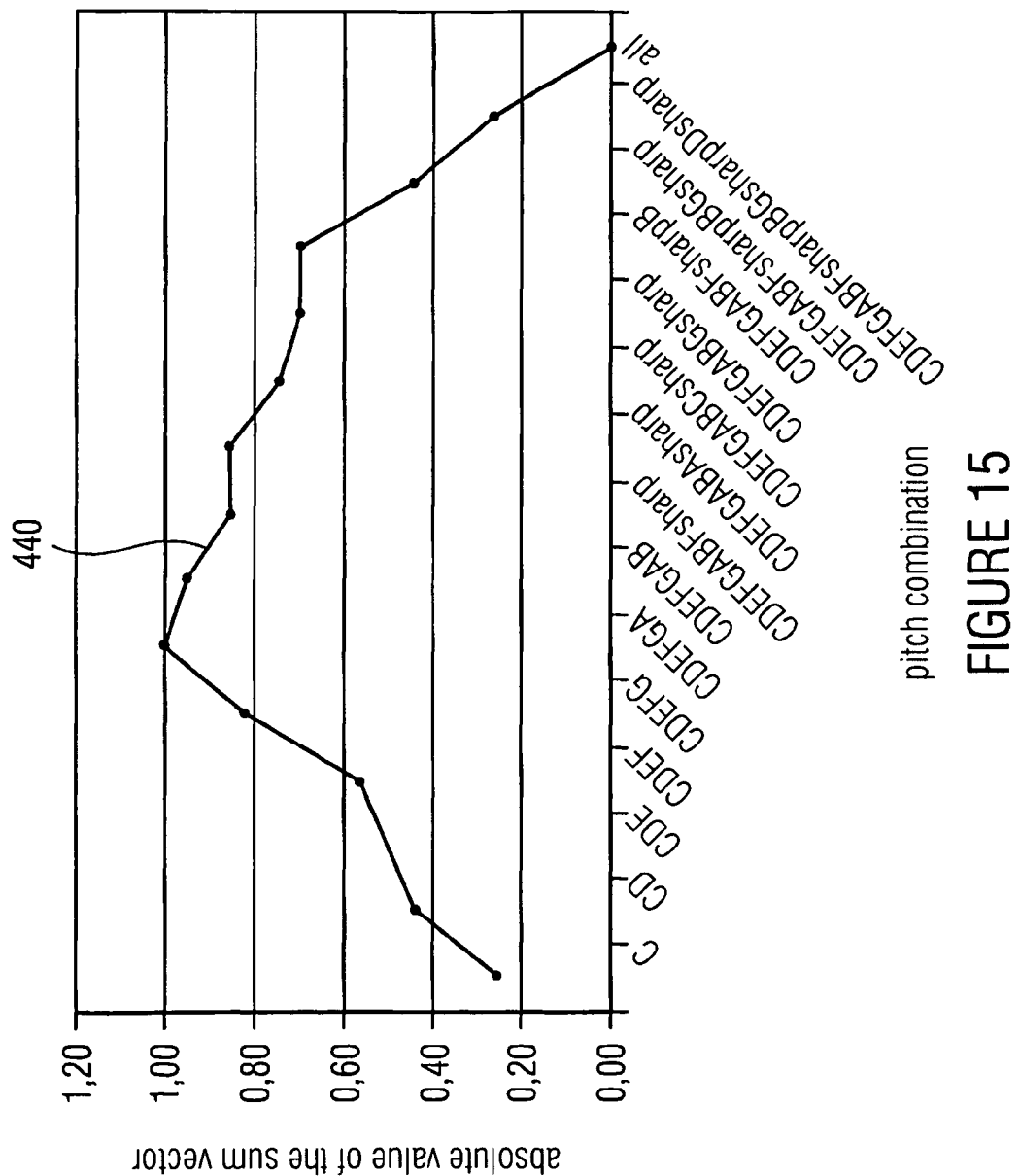
FIG. 15 shows an illustration of the course of a length of the circle of thirds sum vector for different pitch class combinations.

FIG. 15 shows an example for the definedness of the tonal context for different pitch combinations. In particular, FIG. 15 shows a course 440 of the absolute value of the sum vector for different pitch combinations and/or pitch class combinations plotted on the abscissa. The absolute value of the sum vector $|\vec{r}_{sum}|$ increases for so long and/or basically remains at its length as long as pitch classes belonging to the key are added to the amount of pitch classes. Thus, the absolute value of the sum vector increases, based on the individual pitch class C, by adding further C major scale pitch classes, until the same reaches a maximum value in a pitch class combination CDEFGA. Adding the pitch class B and/or H also belonging to C major only results in a slight decrease. Adding further pitch classes of another key, however, causes a clear decrease of the absolute value of the sum vector. The absolute value of the sum vector thus decreases again as soon as pitch classes of other keys are added. This means, the greater the absolute value of the sum vector, the higher the probability that a certain key is present. The absolute value of the sum vector is thus a measure for the definedness of the tonal context.

Apart from that, the sum vector provides information about a change of key and/or modulations: a key occupies an area of 24 semitone steps on the circle of thirds. This corresponds to an angle of $4/7\pi$. If a piece of music remains within the limits of a diatonic key, then the sum vector $\vec{r}_{sum}$ moves within a circle segment which does not exceed this opening angle. If the sum vector $\vec{r}_{sum}$ leaves such a circle segment, however, probably a change of key has occurred.

Figure 16:
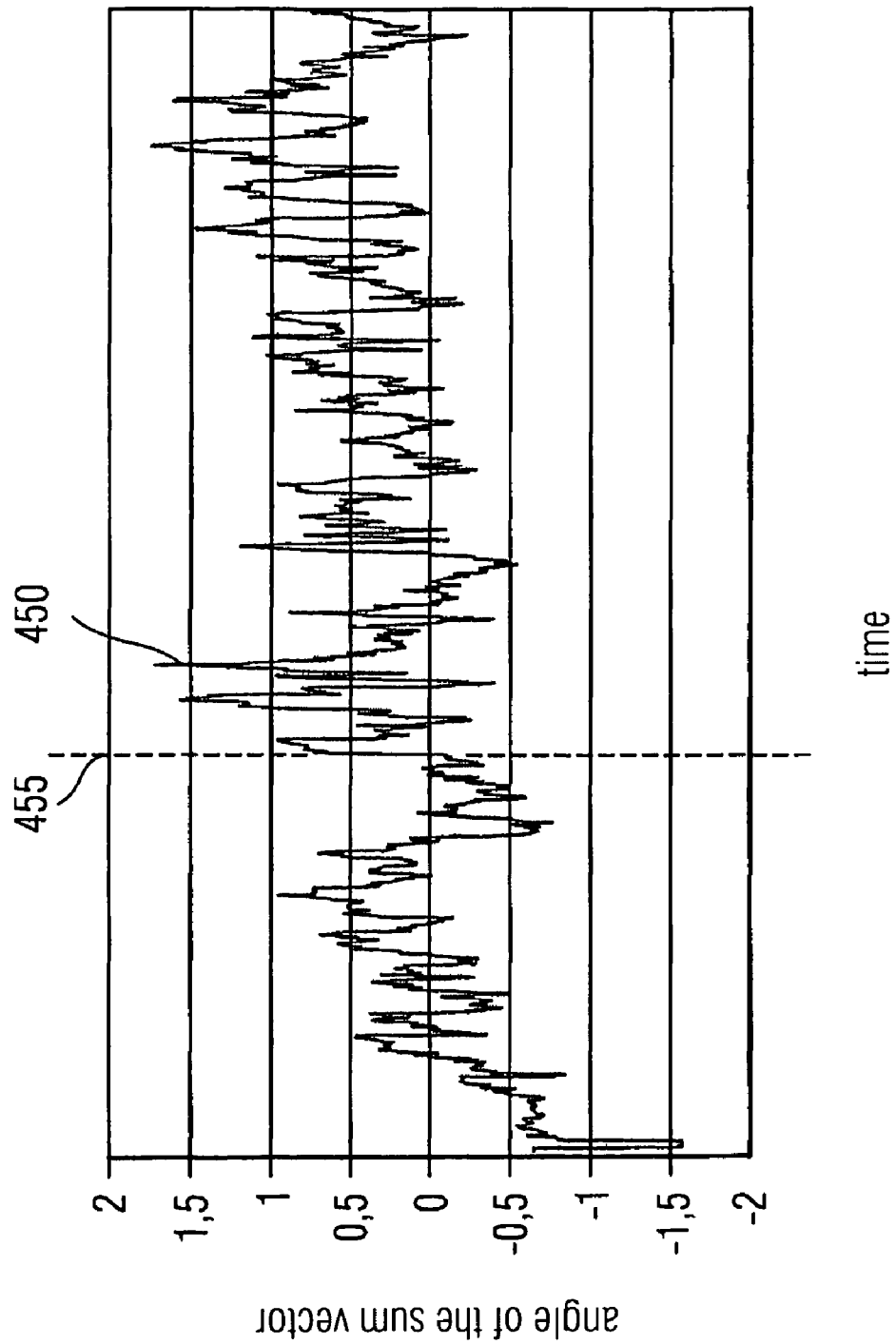
FIG. 16 shows an illustration of the course of an angle of the circle of thirds sum vector over time for the first ten seconds of the Brandenburg Concerto by Bach (No. 1, Allegro)

FIG. 16 shows such a course of the angle of the circle of thirds sum vector $\vec{r}_{sum}$ in a piece by Bach. In more detail, FIG. 16 shows a course 450 of the angle of the sum vector $\vec{r}_{sum}$ for the first ten seconds of Bach's Brandenburg Concerto No. 1, Allegro. Changes of chord and Changes of key may be detected by means of greater angle changes. An example for this is the point of time which is designated by a dashed line 455. The key represented by an angle may be determined with the help of equations 15a-15c.

The sum vector $\vec{r}_{sum}$ additionally enables correcting analysis errors in the harmony analysis and the key analysis. Modulations into adjacent keys are more probable than modulations into non-adjacent keys. Rare temporary outliers of the angle of the circle of thirds sum vector indicate that an analysis error has to be present with high probability.

It is further possible to differentiate between tonal and non-tonal music with the help of the sum vector $\vec{r}_{sum}$. With non-tonal music, the absolute value of the sum vector is very small. With tonal music, however, it becomes ever longer as a function of time, wherein an integration and/or summation across the complete already elapsed time of the piece of music is performed.

Symmetry Model-Based Harmony Analysis

As it was explained in the last section, for the analysis of connections across keys the circle of thirds and/or the circle of thirds-based harmony analysis is used. With the help of the circle of thirds, thus, for example, the key used at a certain time may be determined from a pitch signal and/or audio signal and/or audio data. If the key is determined and/or given, then the symmetry model may be determined and/or used. This, in turn, is very suitable for determining connections within a key. Also within the scope of symmetry model-based harmony analysis, the sum vector $\vec{r}_{sum}$ introduced in the section on mathematical model description of the symmetry model is used.

From the angle of the sum vector $\vec{r}_{sum}$, the current chord may be estimated, as the same points to the geometrical center of mass and/or the tonal center of the pitch classes played at a certain point of time. In addition to that, from the angle of the sum vector $\vec{r}_{sum}$ changes of chord may be determined and/or analyzed. A sudden change of the angle of the sum vector allows to suggest a change of chords.

Figure 17:
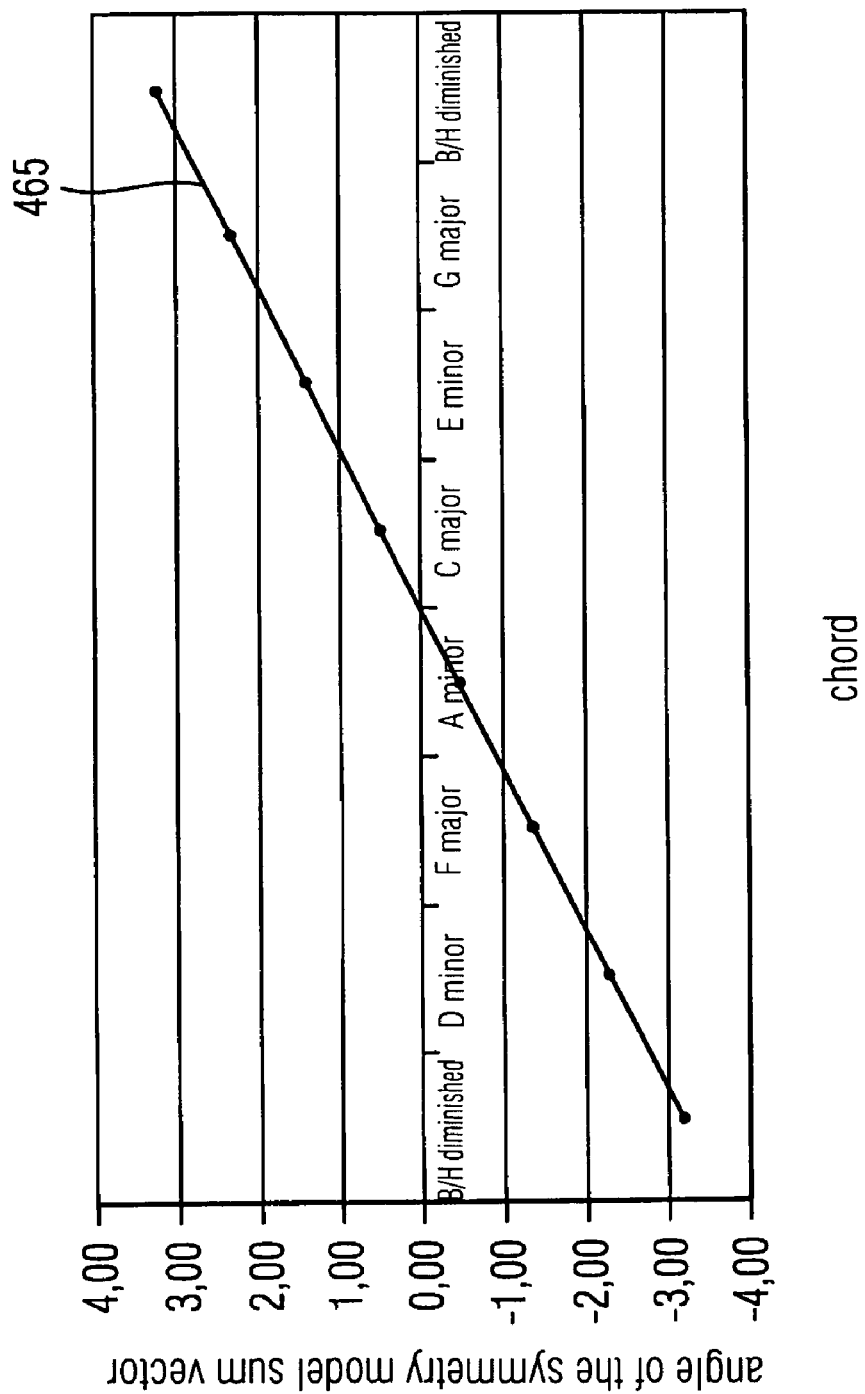
FIG. 17 shows an illustration of the course of an angle of the symmetry circle sum vector for different triads.
Figure 18:
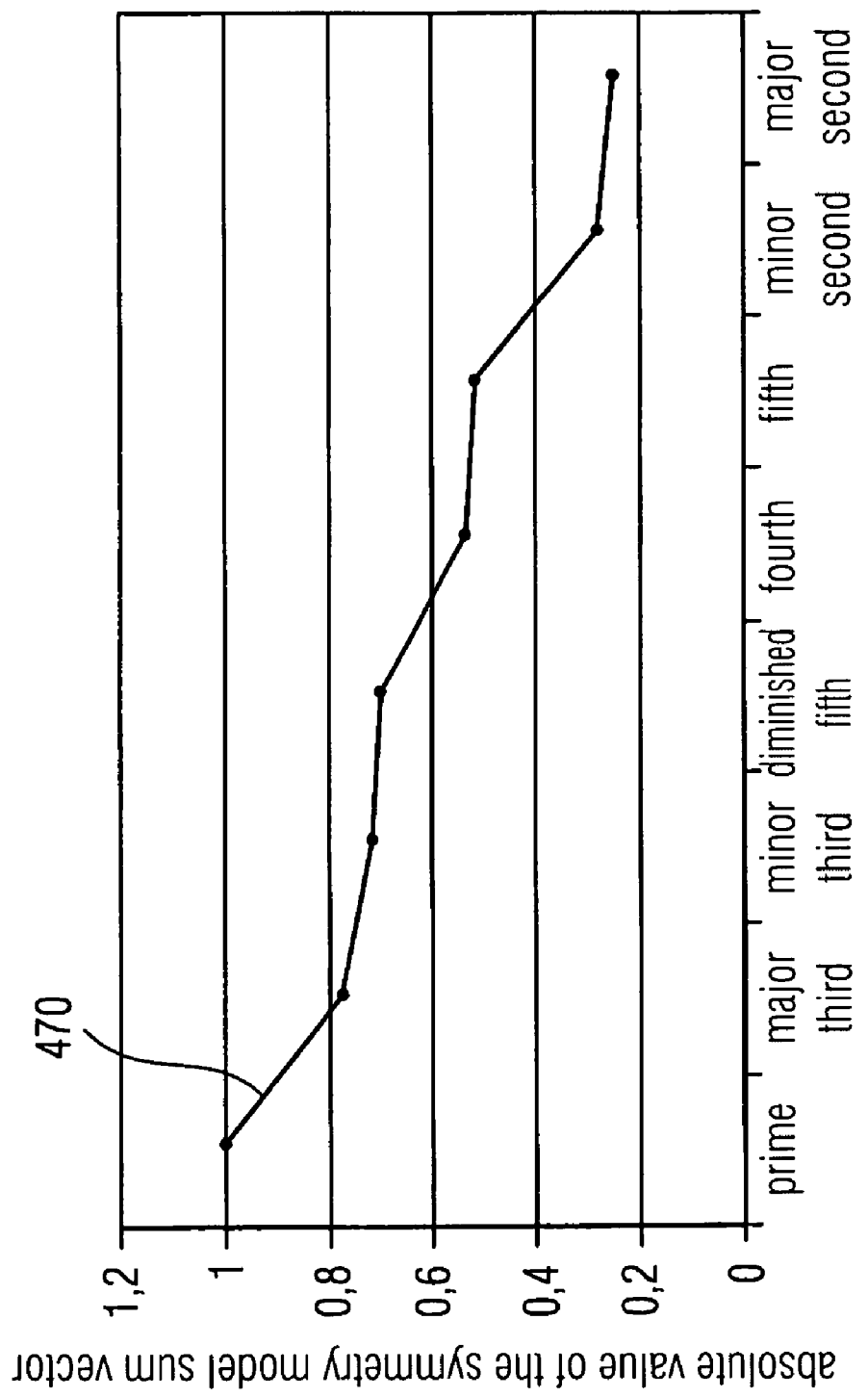
FIG. 18 shows an illustration of the course of the length of a symmetry circle sum vector for different intervals.

The angle of the symmetry circle sum vector again gives an indication whether a pitch combination tends to be associated to the subdominant area, the tonic area or the dominant area. FIG. 17 thus shows a course 465 of the angle of the symmetry circle sum vector (in radian measure) for different chords. FIG. 17 shows that a pitch combination is to be allocated to the subdominant area when the angle has a negative sign. If the angle has a positive sign, however, the pitch combination is to be allocated to the dominant area. The greater the angle of the pitch combination regarding its absolute value, the stronger the pitch combination extends into the corresponding area. An exception to this is the triad B diminished and/or H diminished, to which in FIG. 17 the angles $\pm\pi$ are associated. Here, the special character of the triad B diminished and/or H diminished is reflected which connects the subdominant area and the dominant area with each other, as it is explained in the above-cited dissertations by David Gatzsche. If the absolute value of the angle is very small, however, this allows the conclusion that the pitch combination belongs to the tonic area. In addition to that, the course 465 of FIG. 18 further illustrates the strive for resolution of different chords with regard to the basic key C major and/or a minor. FIG. 18 thus shows the angle of the symmetry circle sum vector for different triads, wherein the symmetry circle is based on the key C major and/or a minor.

From the absolute value of the symmetry circle sum vector $|\vec{r}_{sum}|$, the perceived consonance and/or dissonance, i.e. the pleasantness of a given pitch combination of pitch classes may be estimated. The longer the vector, the more pleasant and/or consonant the analyzed pitch combination is perceived to be. Accordingly, a pitch combination is perceived to be more dissonant and/or unpleasant the shorter the symmetry model sum vector is. In other words, the shorter the vector, the more dissonant and/or unpleasant the perception of the respective pitch combination.

FIG. 18 thus shows a course 470 of the absolute value of the symmetry circle sum vector $|\vec{r}_{sum}|$ for different intervals, i.e. for two pitch classes each which have different intervals and/or pitch intervals regarding each other. Here, the arrangement of the intervals on the abscissa of FIG. 18 was selected with a decreasing consonance and/or pleasantness of the corresponding intervals. FIG. 18 thus shows that the absolute value of the symmetry circle sum vector becomes increasingly smaller with a decreasing consonance and/or pleasantness. The absolute value of the angle of the angle of the symmetry circle sum vector $\vec{r}_{sum}$ may thus be interpreted and/or seen as a measure of estimate for a strive for resolution of a certain pitch combination within the scope of an existing tonal context (key). FIG. 18 illustrates this with regard to the course 470 of the absolute value of the symmetry circle sum vector $|\vec{r}_{sum}|$ for different pitch intervals. In other words, the course 470 thus illustrates that the absolute value of the symmetry circle sum vector $|\vec{r}_{sum}|$ decreases starting from intervals perceived to be consonant and/or pleasant towards intervals perceived to be less consonant and/or pleasant.

Figure 19:
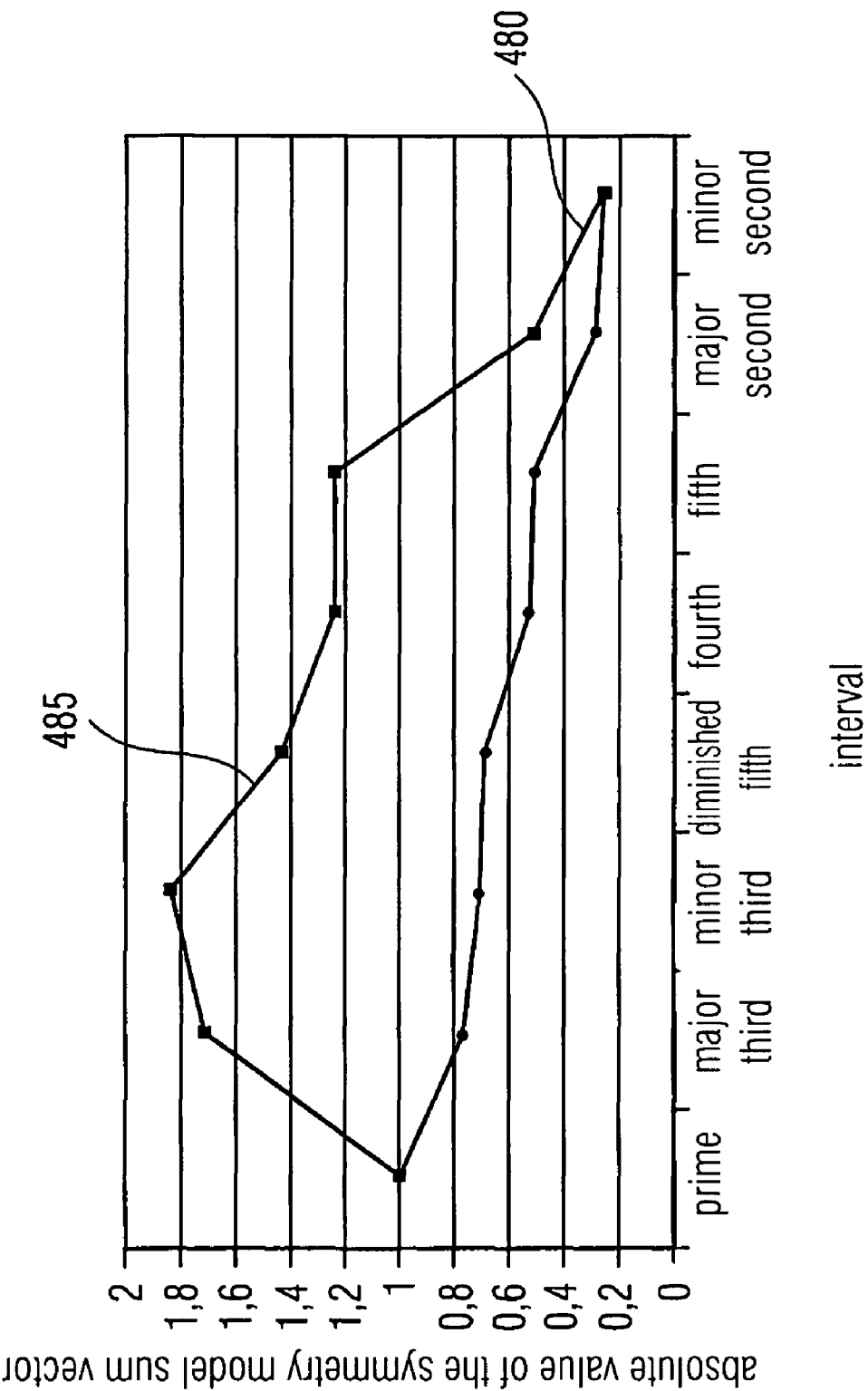
FIG. 19 shows an illustration of two courses of the length of circle of thirds sum vectors for different intervals.
Figure 20:
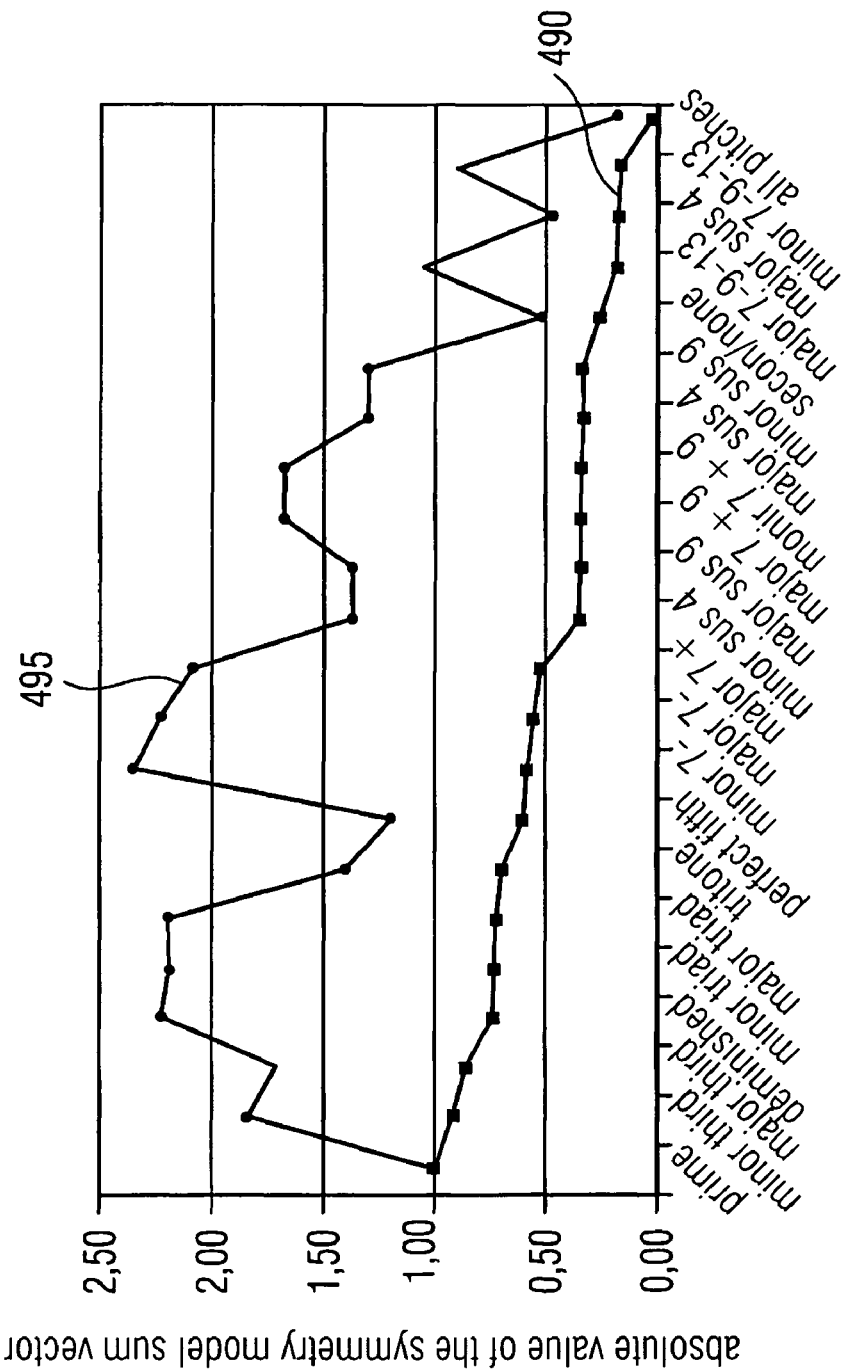
FIG. 20 shows an illustration of two courses of the length of the symmetry circle sum vector for different chord variants and/or pitch combinations.

FIG. 19 shows a course 480 of the absolute value of the symmetry model sum vector $|\vec{r}_{sum}|$ for different intervals, wherein the overall energy is normalized to 1. Here, the calculation of the course 480, but also the courses further below in FIGS. 19 and 20, are respectively based on a vector which contains the energies of the 12 pitch classes and/or the 12 semitones disregarding the octaving. In this context, a normalization to the energy 1 means that each of the semitone energies of the vector is multiplied by a factor such that the sum of the energies of all semitones from the semitone vector, i.e. the sum of the components of the corresponding vector, has the value 1. If, for example, the following semitone vector is given,

| D | D-sharp | E | F | F-sharp | G | G-sharp | A | A-sharp | B | C | C-sharp |
|---|---|---|---|---|---|---|---|---|---|---|---|
| 0 | 0.2 | 0 | 0.3 | 0 | 0 | 0 | 0 | 0 | 0 | 0 | 0 | the sum of all energies, i.e. the components of the semitone vector, has the value 0.5. By multiplying all components of the semitone vector by a factor of 2 (=1/0.5), the following semitone vector results, whose energy is summed up to the value of 1.

| D | D-sharp | E | F | F-sharp | G | G-sharp | A | A-sharp | B | C | C-sharp |
|---|---|---|---|---|---|---|---|---|---|---|---|
| 0 | 0.4 | 0 | 0.6 | 0 | 0 | 0 | 0 | 0 | 0 | 0 | 0 |

The sum of all energies has now the value of 1.

Apart from that, FIG. 19 shows a further course 485 of the absolute value of the symmetry model sum vector and/or the symmetry circle sum vector for the same intervals, wherein the overall energy is in this case not normalized. Also in FIG. 19, the arrangement of the intervals on the abscissa is selected such that the same are arranged in a decreasing order of the perceived consonance and/or pleasantness of the corresponding intervals. In particular the course 480 shows that the absolute value of the symmetry circle sum vector and/or symmetry model sum vector represents an estimate and/or estimation measure for the consonance and/or pleasantness of different intervals, as the same, like the course 480 shows, illustrates a monotonously decreasing course with a decreasing consonance of the corresponding intervals. The course 485 tends to show the same effect, wherein, due to the fact that with a prime interval only one single pitch class is affected, the absolute value of the symmetry circle sum vector is inevitably smaller than an absolute value of the symmetry circle sum vector which is based on two different pitch classes. As a consequence, the course 485 first increases, starting from the prime interval, in intervals before it shows a further course which is similar to the course 480.

Similar to the courses 480, 485 indicated in FIG. 19, FIG. 20 also shows two courses 490, 495 of the absolute value of the symmetry model sum vector for different, virtually random pitch combinations. In contrast to FIG. 19, in which only intervals, i.e. pitch combinations of a maximum of two pitch classes each are shown, in FIG. 20 different chord variants are shown on the abscissa according to a decreasing consonance and/or pleasantness, beginning with a prime up to a sounding of all pitch classes. The course 490, similar to the course 480 of FIG. 19, is based on a normalization of the overall energy to 1, while the course 495, similar to the course 485 of FIG. 19, is not based on a corresponding normalization of the overall energy.

The course 490 shows, with a decreasing consonance and/or pleasantness of the respective chord variants, a monotonously decreasing course of the absolute value of the symmetry circle sum vector. Starting from a value 1 in the case of a prime, the course 490 continuously drops to a value of approximately 0 when all pitch classes are considered. Accordingly, the course 490 clarifies the suitability of the absolute value of the symmetry circle sum vector as an estimate for the assessment of the consonance and/or pleasantness of different pitch combinations. Here, the course 490 clearly shows that a pitch combination and/or pitch class combination is perceived and/or sensed to be more consonant and/or pleasant, the higher the absolute value of the corresponding symmetry circle sum vector is. In contrast to the course 490, the course 495 shows, similar to the course 485 of FIG. 19, a somewhat more complicated behavior, which may be attributed to the fact that with the different chord variants a different number of pitch classes is affected.

FIGS. 19 and 20 additionally show that also the harmonic definedness of the current chord may be derived from the absolute value of the sum vector. The higher the absolute value of the vector, the more reliably it may be assumed that a harmonically sounding chord is present in the mixture of pitches.

Figure 21:
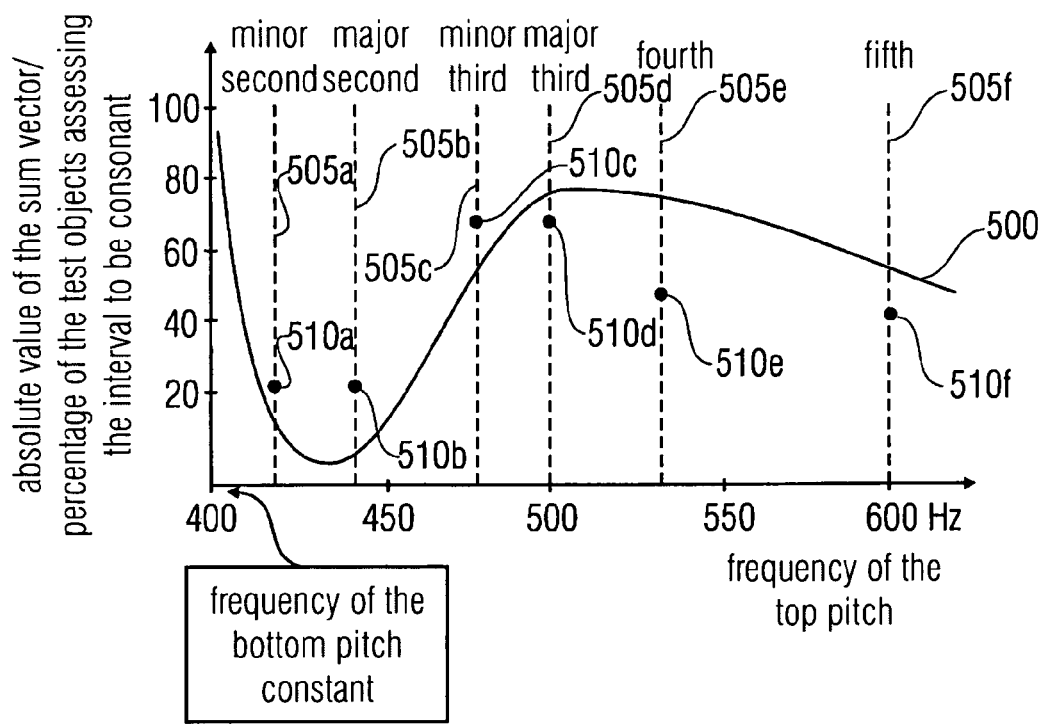
FIG. 21 shows an illustration of the course of a psychometric examination for evaluating the sensation for consonance with regard to the symmetry model.

FIG. 21 shows a result of an evaluation of simultaneous intervals with regard to their consonance according to a psychometric analysis of R. Plomb and W. Levelt, (R. Plomb and W. Levelt, Tonal Consonance and Critical Bandwidth, 3. Accoust. Soc. Am. 38, 548 (1965) and Guerino Mazzola, Die Geometrie der Töne—Elemente der mathematischen Musiktheorie, Birkhäuser-Verlag, 1990). In particular, FIG. 21 shows a course 500 which indicates a percentage of test subjects who assessed an interval to be consonant depending on a frequency of an upper pitch within the scope of the psychometric analysis of Plomb and Levelt. Within the scope of the psychometric analysis of Plomb and Levelt, apart from the upper pitch, the frequency of which was changed, also a second, lower pitch was played to the test subjects, the frequency of which was maintained constant at 400 Hz.

Apart from the course 500, in FIG. 21 further six frequencies of the upper pitch are marked by vertical, dashed lines

505a-505f, which correspond to the intervals of a minor second (505a), a major second (505b), a minor third (505c), a major third (505d), a fourth (505e) and a fifth (505f) with regard to the consonant frequency of the lower pitch of 400 Hz. With increasing frequency of the upper pitch, starting from the frequency of the lower pitch, i.e. a prime, the course 500 shows a significant decrease which lies in the area of the vertical markings 505a and 505b, i.e. in the area of the intervals of a minor and a major second, and takes on a minimum of less than 10%. Subsequently, the course 500 increases again until it reaches a maximum in the area of the marking 505d, i.e. in the area of the major third. With a further increasing frequency, the course 500 shows a slightly decreasing further course.

Apart from that, in FIG. 21 for the frequencies and/or intervals 505a-505f marked by the six vertical lines, of the lengths 501a-510f each of the symmetry circle sum vector and/or the symmetry model sum vector for the corresponding intervals are indicated. It may be seen that the markings 510a-510f corresponding to the lengths of the symmetry model sum vector model the course of the course 500 well. It is thus reflected that the symmetry model and in particular the analysis on the basis of the symmetry model confirm existing examinations regarding the topic of consonance and dissonance and/or are consistent with the same, which verifies the suitability of the symmetry model for the analysis of audio signals, audio data and pitch information. This indicates that an analysis on the basis of the symmetry model with the help of the sum vector provides important information about a sequence of pitches and/or pitch combinations or also pieces of music.

The device for analyzing audio data thus provides an analysis signal based on the sum vector to further components. As the embodiments explained in the following will show, the analysis signal provided by the inventive device for analyzing audio data may be supplied to an inventive display device 200 which graphically, in text form, mechanically or in another way represents the information which the sum vector includes based on the analysis signal.

Symmetry Model-based and Circle of Thirds-based Musical Instruments

In the following sections, further embodiments of the inventive device for generating a note signal upon a manual input, and further embodiments of the inventive devices for outputting an output signal indicating a pitch class are described. The embodiments of the inventive device for generating a note signal described in the following among others include symmetry model-based and circle of thirds-based musical instruments.

The fundamentals set so far and explained in the above sections represent the starting point to describe new musical instruments in the form of embodiments of the present invention. In other words, the laid fundamentals are perfectly suitable for developing the new musical instruments described in the further process.

First of all, in the following sections, in the form of a block diagram, a principle setup for a musical instrument is introduced which works on the basis of the hitherto presented fundamentals. This instrument principle realized by a block diagram implements the concepts summarized in the introductory sections regarding the topics of the synthesis of sensibly sounding pitch combinations and the analysis of present pitch combinations. The basic features and/or characteristics of the inventive musical instruments are summarized in the following.

The inventive concept for musical instruments (instrument concept) is based on a logical basic system which allows the geometrical positioning of base pitches in a pitch space which is realized in the form of the assignment function described in the introductory sections of the present invention and may be implemented in the control means 120. Optionally, the instrument concept additionally allows the definition of a spatial pitch distribution function and/or the definition of a spatial single pitch distribution function. As a further option, a selection weighting function may be introduced within the scope of the inventive instrument concept. Further, the inventive device 100 for generating a note signal, i.e. an inventive instrument, offers an operating means and/or a user interface which enables selecting and/or defining an input angle or an input angle range and/or a spatial section of the logical pitch space (range) in the form of an input signal. The selection of the spatial section is then supplied to the control means as an input signal which generates a note signal based on the input signal and the assignment function which is then optionally sent to a sound generator.

The arrangement of the base pitches and/or the pitch classes in the pitch space follows an arrangement with smallest pitch intervals which correspond to a major or a minor third. Following the default of the circle of thirds and/or the symmetry model and/or the symmetry circle and/or the cadence circle has shown to be especially sensible within this context. Hereby it is possible, with an extremely low number of base pitches and a consequent number of operating elements and/or input means, to generate sensible pitch combinations. For this reason, the inventive instrument concept is especially suitable for the pedagogic field. Apart from that it is also suitable for fast and efficiently generating note signals which may be used via a connected sound generator for generating harmonically and/or consonantly sounding accompaniments or improvisations. This input, which is very fast and very simple, together with the pedagogic suitability of the inventive instrument concept, enables to playfully introduce people to music who have little musical pre-education.

The inventive instrument concept may thus, for example, enable the infinite cross-fading of sound combinations into other sound combinations without the result of unwanted dissonances. This essentially takes place on the basis of geometric adjacent arrangement and/or arrangement of sensible base pitches and the input of a user in the form of an input angle or an input angle range. Optionally, the instrument concept may be further refined here by introducing the spatial distribution function and/or the spatial single pitch distribution function which is assigned to individual basic pitches, as well as the optional possibility of changing/varying the selected section in the pitch space infinitely regarding its position, extension and spatial weighting.

The instrument concept optionally provides an analysis part which is able to analyze audio information, audio data and pitch information of other instruments and map the same into its own pitch space. The active pitches of other instruments may then be marked and/or accentuated on an inventive device 200 for outputting an output signal indicating a pitch class. By the geometric arrangement of the output field radial directions and/or the output areas of coherent base pitches in the pitch space and on the operating surface of the instrument, it is possible with a minimum of musical knowledge to generate a suitable accompaniment music to a given pitch signal.

Figure 22:
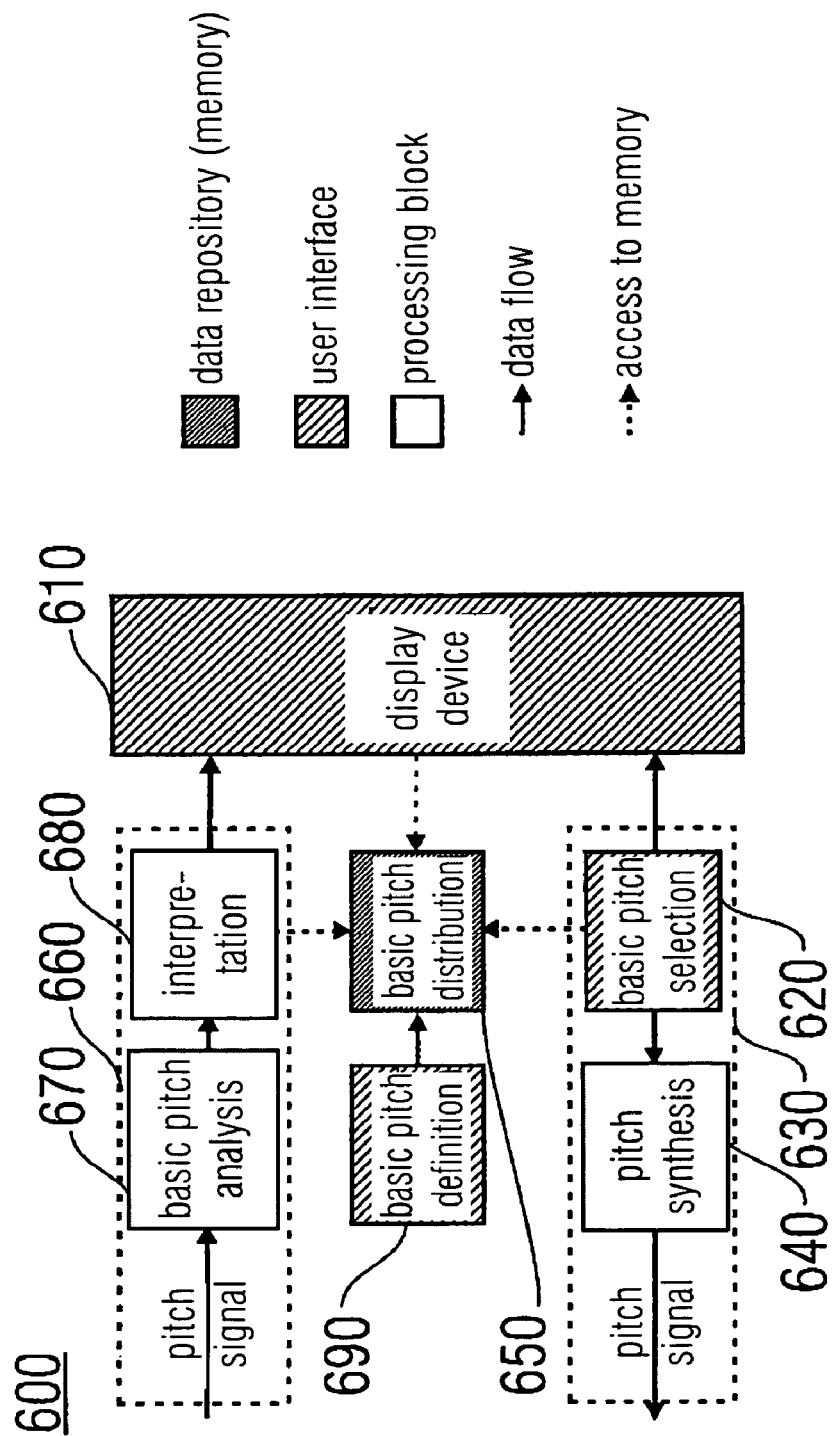
FIG. 22 shows a schematic block diagram of an embodiment of an inventive device for generating a note signal and an inventive device for outputting an output signal indicating a pitch class.

FIG. 22 shows a block diagram of an inventive musical instrument and/or symmetry circle instrument 600 as a system which includes an inventive device for generating a note signal upon a manual input and an inventive device for outputting an output signal indicating a pitch class. In particular, the musical instrument 600 comprises a display device 610, which is an inventive device for outputting an output signal indicating a pitch class. In addition to that, the musical instrument 600 further comprises an inventive operating device 620, also referred to as basic pitch selection in FIG. 22, as a device for generating a note signal upon a manual input. The operating device 620 is part of a synthesis branch 630 which comprises a sound generator 640 for the synthesis of pitches (pitch synthesis) apart from the operating device 620. The operating device 620 is here both coupled to the display device 610 and also to the sound generator 640. The operating device 620 includes an operating means to enable a user to define and input angle or an input angle range and provide the same as an input signal to the control means which also includes the operating device 620. Apart from that, the operating device 620 may optionally transmit a corresponding signal to the display device 610, so that the display device 610 may illustrate the input angle or input angle range defined by the user on the output field. Alternatively or additionally, the operating device 620 may, of course, also provide the generated note signals to the display device 610, so that the display device may illustrate the pitches and/or pitch classes corresponding to the note signals on the output field. Apart from that, the operating device 620 is coupled to an optional memory (data repository) 650 for storing a base pitch distribution. For this reason, the operating device 620 is able to access the base pitch distribution stored in the memory 650. The base pitch distribution may be stored in the memory 650, for example as an assignment function. The sound generator 640 is, apart from that, coupled to an output of the musical instrument 600, for example a loudspeaker or a terminal, via which pitch signals may be transmitted. This may, for example, be a line-in terminal, a midi terminal (midi=musical instrument digital interface), terminals for digital pitch signals, other terminals or a loudspeaker or another sound system.

Apart from the synthesis branch 630, the musical instrument 600 also comprises a device for analyzing audio data as an analysis branch 660. The same includes a base pitch analysis device and/or semitone analysis device 670 and an interpretation device 680 which are coupled to each other. In addition to that, the base pitch analysis device 670 receives a pitch signal via an input. The interpretation device 680 is coupled to the display device 610 and may also access the memory 650 and the basic pitch distribution stored in the memory via a corresponding coupling. This coupling, i.e. the coupling of the interpretation device 680 and the memory 650, is optional. Also the coupling between the operating device 620 and the memory 650 is optional. In addition to that, the memory 650 may optionally also be connected to the display device 610 so that the same may also access the base pitch distribution stored in the memory 650.

Apart from the connections of the memory 650 to the interpretation device 680, the display device 610 and the operating device 620 already described above, the same may optionally also be connected to a base pitch definition input device 690, so that a user may influence, change or reprogram the base pitch distribution in the memory 650 via the base pitch definition device 690. The display device 610, the operating device 620 and the base pitch definition input device 690 thus represent user interfaces. The base pitch analysis device 670, the interpretation device 680 and the sound generator 640 thus represent processing blocks.

In the case of the musical instrument illustrated in FIG. 22, the base pitch analysis device 670 includes two means which are not illustrated in FIG. 22 and are connected to each other within the base pitch analysis device 670. In particular, these are a semitone analysis means to analyze the pitch signals and/or audio data provided to the base pitch analysis device 670 with regard to a volume information distribution via an amount of semitones, and a pitch class analysis means which forms a pitch class volume information distribution based on the volume information distribution over the amount of pitch classes from the volume information distribution of the semitone analysis means.

While synthesizers today are specialized in particular on two things, i.e. modeling the amplitude courses and the frequency courses of single pitches, and thus only offer insufficient methods to generate, merge or otherwise process complex harmonies, the musical instrument 600 indicated in FIG. 22 closes the mentioned gaps. As a central idea, the system and/or musical instrument 600 is based on the base pitch distribution in the pitch space, which is defined and/or given by the assignment function. With the musical instrument 600 illustrated in FIG. 22, the base pitch arrangement and/or the definition of the assignment function may, already or in the future, be stored in the memory 650. The same is firmly specified in the form of the circle of thirds or the symmetry model or may be designed freely via the user interface of the base pitch definition input device 690. Thus it is possible to select a certain assignment function from a plurality of assignment functions, for example via the base pitch definition input device 690 or also have a direct influence on the concrete implementation of the assignment function. Based on the optional coupling of the interpretation device 680, the display device 610 and the operating device 620 illustrated in FIG. 2, the respective base pitch distribution is available for these three components of the musical instrument 600 at the same time, for example in the form of the assignment function.

If a pitch signal is provided to the musical instrument 600 via its input terminal, and thus to the base pitch analysis device 670, the semitone analysis device of the base pitch analysis device 670 first of all analyses with regard to a volume information distribution over an amount of semitones. Subsequently, the pitch class analysis means of the base pitch analysis device 670 determines a pitch class volume information distribution over the amount of pitch classes on the basis of the volume information distribution. This pitch class volume information distribution is then supplied to the interpretation device 680, which is the vector calculation means, which determines a two-dimensional intermediate vector for each semitone or for each pitch class, calculates a sum vector based on the two-dimensional intermediate vectors, wherein the individual intermediate vectors are weighted based on the volume information distribution or the pitch class volume information distribution with regard to their lengths. Finally, the interpretation device 680 outputs an analysis signal to the display device 610 which is based on the sum vector. Alternatively or additionally, the interpretation device 680 may provide a display signal to the display device 610 which comprises information regarding the volume information distribution or the pitch class volume information distribution.

The display device 610 may then, on the basis of the analysis signal and/or the display signal, indicate the pitch classes, corresponding to the incoming pitch signal, to the user on an output field of the display device 610 by accentuating output field radial directions or by accentuating output areas. Here, the display device 610 may perform the illustration on the output field based on the base pitch distribution stored in the memory 650.

The user of the musical instrument 600 may then define an input angle or an input angle range via the operating device 620, so that the operating device 620, with the help of its control means and optionally based on the base pitch distribution stored in the memory 650 in the form of the assignment function, then generates note signals from this and provides the same to the sound generator 640. The sound generator 640 then in turn generates pitch signals based on the note signals of the operating device 620 which are then output at the output of the musical instrument 600.

In other words, the optional memory 650, which includes the basic pitch distribution stored within the same and the possibility of changing the same via the base pitch definition input device 690, represents central components of the inventive musical instrument 600. A further important component is the display device 610. The same represents the pitch space and the base pitches contained therein, marks selected or analyzed pitches or also maps the spatial pitch distribution function and/or the spatial single pitch distribution function and/or the selection weighting function. Further, the concept of the musical instrument 600 provides the analysis branch 660 and the synthesis branch 630. The analysis branch 660 is able to analyze the base pitches transported within pitch signals (for example audio signals or midi signals) and interpret the same according to the base pitch distribution, mark them in the pitch space and display the same via the display device 610. This functionality may, e.g., be used so that a musician B may generate a suitable accompaniment to an audio signal provided by a musician A. Apart from the analysis branch 660, there is also the synthesis branch 630. The same contains an interface for selecting base pitches, i.e. the operating device 620 also referred to as the base pitch selection in FIG. 22. The selected pitches are transmitted to the pitch synthesis, i.e. the sound generator 640, which generates a corresponding pitch signal. The sound generator 640 may be a midi generator, an automatic accompaniment or a sound synthesizer. The sound synthesis and analysis concept introduced here offers many interesting possibilities which are explained and examined in more detail in the following embodiments.

Basically it is possible that the interpretation device 680, the display device 610 and the operating device 620 access different base pitch distributions which are stored in the memory 650. Thus, it is, for example, possible that the display device 610 uses a representation which exactly models the symmetry model and/or the cadence circle, which means that with regard to the angle the distance of two adjacent pitch classes depends on whether the smallest pitch interval is a minor third or a major third. Simultaneously, the operating device 620 may work on the basis of an assignment function, wherein the seven pitch classes of the symmetry circle and/or the cadence circle are equidistantly distributed with regard to the angle.

In the form of a block diagram, FIG. 22 thus shows a very general principle of a technical system for realizing the inventive sound synthesis concept and analysis concept.

In the following sections, the selection of the active spatial section by the user, i.e. the definition of the input angle or the input angle range, is considered in more detail. In this connection, some embodiments of the operating means are given and explained in more detail. Here, the following explanations are made using a base pitch arrangement following the symmetry model. Without limitations, the same may, however, also be applied to the circle of thirds or another arrangement of the base pitches and/or pitch classes which is covered by a corresponding assignment function.

Here, the active spatial section in the symmetry model, in the circle of thirds and other inventive arrangements of the base pitches which are covered by the assignment function is defined via one single input angle or via one circle segment. This may, for example, be done via a starting angle and an opening angle, and also optionally via a radius. The term "active spatial section" here also includes the case that the opening angle of the circle segment disappears and/or has an opening angle of 0°, so that the active spatial section may also consist of only one single input angle. In this case, consequently the starting angle and the input angle are the same.

Figure 23:
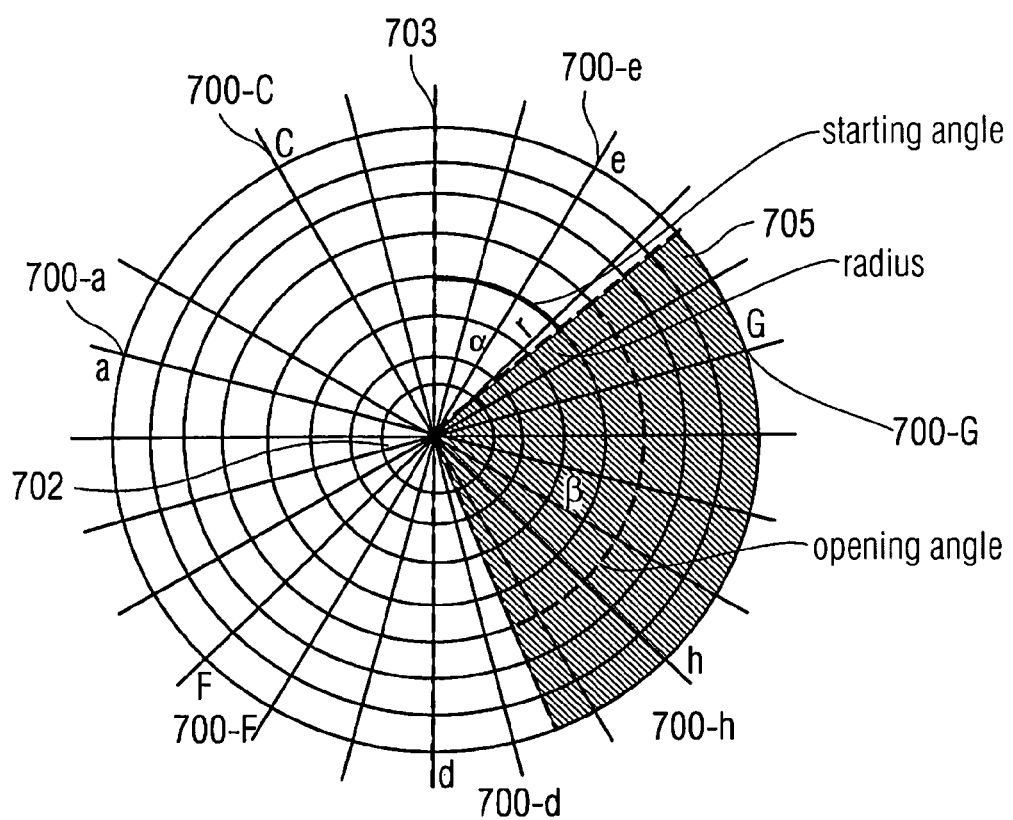
FIG. 23 shows an illustration of an embodiment of an operating means of an inventive device for generating a note signal.

FIG. 23 shows an embodiment of an illustration on an output field of an operating means of an inventive device for generating a note signal upon a manual input. In particular, FIG. 23 shows an illustration on the output field of the operating means, when the operating means is, for example, a touch screen or another touch-sensitive area which simultaneously also enables an illustration by a display and/or on the output field. Technically this may be realized such that between the output field and a user a touch-sensitive field is positioned on which the user may select individual points and/or areas by touching the same. The touch-sensitive field is in this case coupled to a detection means which enables a localization of the area which the user touches. The detection means is coupled to a field evaluation means which provides, from the location of touching with regard to a center point or a central point of the touch-sensitive field, an angle or an angle range as an input signal to the control means of the inventive device for generating a note signal. On the output field arranged behind the touch-sensitive field, an output field control means coupled to the output field may generate an illustration, as it is, for example, illustrated in FIG. 23, and which facilitates and/or enables the user to input an input angle or an input angle range via the touch-sensitive field.

On the output field indicated in FIG. 23, for this purpose, according to the symmetry model, an illustration of seven pitch classes 700-C, 700-e, 700-G, 700-h, 700-d, 700-F and 700-a is shown. In addition to that, on the output field also the center point of the touch-sensitive field 702 is illustrated.

If the user now touches a point on the touch-sensitive field, the detection means provides a signal to the field evaluation means which indicates the location of touching by the user on the touch-sensitive field. From the coordinates of the center point of the touch-sensitive field 702 and the location of touching by the user (illustrated by its coordinates), the field evaluation means, with regard to the preferential direction of the touch-sensitive field 703, which may also be represented on the output field, determines an angle which may at the same time be provided as an input angle to the control means of the inventive device for generating a note signal.

If the user touches a second point on the touch-sensitive field or moves his finger to a second point on the touch-sensitive field, the detection means may provide corresponding signals to the field evaluation means, so that the field evaluation means may determine a second angle analog to that with regard to the second point which the user touched or where the user interrupted his movement on the touch-sensitive field. On the basis of those two angles, the field evaluation means may determine an input angle range β and provide the same as an input signal to the control means of the inventive device for generating a note signal.

The output field of this operating means may at the same time be the output field of an inventive device for outputting an output signal indicating a pitch class. In this case, thus in the embodiment illustrated in FIG. 23, next to the input angle also an output field radial direction of the output field with regard to the center point 702 may be accentuated, i.e. marked, when the display control means of the output field of the inventive device for outputting an output signal indicating a pitch class is provided with a corresponding input signal. A corresponding example for this is the HarmonyPad, which is discussed in connection with FIG. 26. The illustration illustrated in FIG. 23 is based on the symmetry model for the keys C major and/or a minor. FIG. 23 illustrates a selected circle segment 705 which begins between the pitches and/or pitch classes e and G and ends between the pitches h/b and d. The circle segment 705 is here defined via the starting angle α and the opening angle β. Optionally, it is additionally possible to further specify the circle segment via a radius r. In the case of the circle segment 705 illustrated in FIG. 23, the pitches G and h/b are completely marked and will thus, for example in the case of the inventive musical instrument 600, be completely audible due to the sound generator 640. The pitches e and d are not covered by the circle segment 705, but may, depending on the appearance of their spatial single pitch distribution function and/or the spatial pitch distribution function, be audible with an identical volume, more quietly or not at all. FIG. 23 thus illustrates the new instrument concept which provides the selection of the active pitch space section via the definition of a circle segment by a starting angle, opening angle and optionally by a radius. This again enables defining sensible harmonic connections even with very limited input possibilities.

Figure 24:
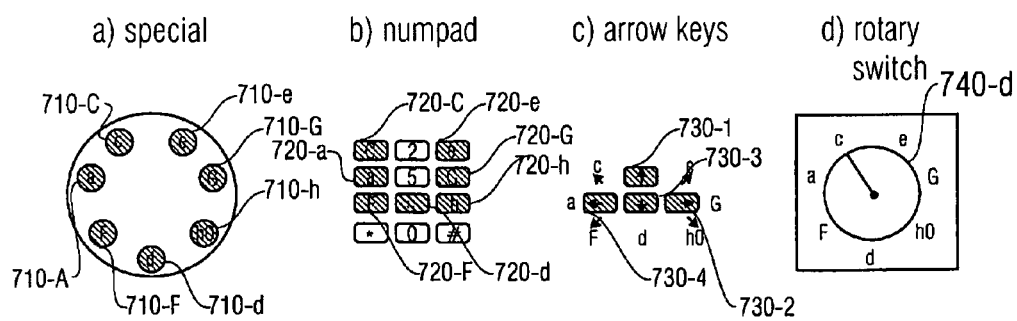
FIG. 24A to 24D show an illustration of four embodiments of input to means for defining a starting angle.

FIG. 24 shows different possibilities of defining the starting angle α of the selected circle segment of the symmetry model using hardware elements. FIG. 24A here shows a special arrangement of seven keys 710-C, 710-e, 710-G, 710-h, 710-d, 710-F and 710-a which are associated with the pitch classes C, e, G, h0, d, F and a to put it simply. In more detail, the seven keys 710-C to 710-a are associated with a plurality of angles to which again via the assignment function the corresponding pitch classes are associated. The geometric arrangement of the keys on the operating surface and/or the operating means is according to the arrangement of the basic pitches in the pitch space. Thus, the seven keys 710-C to 710-a spatially model the assignment function of the key C major and/or a minor of the symmetry circle. A more detailed description of this special geometric arrangement of keys and/or input means is explained in more detail further below in connection with FIG. 27.

If a fixed arrangement of keys has already been predefined, a sensible assignment of the base pitches to individual keys may be performed. One example for this is given in FIG. 24B using a ten-key pad (Numpads). In this case, an input angle may be associated, for example, with the key 720-C, to which usually the number 1 is associated, wherein the angle corresponds to the pitch class C. Accordingly, to the key 720-e, to which usually the number 3 is associated, an input angle may be associated, which corresponds to the pitch class e according to the assignment function. The same applies to keys 720-G (number 6), 720-h (number 9), 720-d (number 8), 720-F (number 7) and 720-a (number 4). Due to the simplicity of the symmetry model it is possible to make do also with an extremely small number of keys, as it is illustrated in FIG. 24B.

FIG. 24C shows an alternative, wherein partially more than one key has to be pressed. Compared to the variant illustrated in FIG. 24B, this variant necessitates an even smaller number of keys, i.e., for example, the four cursor keys 730-1, 730-2, 730-3 and 730-4 of a conventional PC keyboard. In this case, for example by pressing the key 730-3, an input angle or also a starting angle α may be defined which is associated with a pitch class d via the assignment function. If the cursor keys 730-1 and 730-4 are, for example, pressed simultaneously, an input angle or starting angle α may be associated with this key combination, to which a pitch class C is associated. Further key combinations and the pitch classes associated with the same are given in FIG. 24C.

Also using a simple rotary switch 740 the starting angle α and/or the input angle may be defined, as illustrated by FIG. 24D. The examples illustrated in FIG. 24 for the selection of the starting angle of the active area of the symmetry model may, of course, also be applied to other arrangements of the pitch classes and/or base pitches in the pitch space. FIG. 24 thus shows four embodiments wherein, using hardware keys or other hardware elements, the starting angle α or the input angle may be defined.

All hardware elements illustrated in FIG. 24 for the definition of the starting angle α of the selected circle segment may be coupled to a corresponding detection means or evaluation means, so that upon actuating one of the hardware elements the detection means or evaluation means of the control means of the inventive device for generating a note signal upon a manual input may provide a corresponding input signal which includes the input angle.

Here, the keys illustrated in FIGS. 24A, 24B and 24C represent touch-sensitive fields or keys, for example for discrete hardware elements and/or switching elements. Here, within the scope of the present application, a discrete hardware element and/or a discrete switching element is a switching element which does not enable a quasi continuous input of locations and/or angles. These explanations with regard to the detection means and/or evaluation means also apply to the hardware elements illustrated in FIG. 25.

In this connection it is important to note, that the operating means may spatially model the assignment function. This, however, only presents one possibility and is in particular not compulsory. Apart from that, it is also important that the assignment function does not necessarily describe and/or model a certain arrangement of the pitch classes and/or base pitches in the pitch space. Thus it is possible, for example, to let the musical instrument 600 operate in a mode which is based on the symmetry model of a certain scale, i.e. that, for example, the display device 610 optically reproduces the corresponding symmetry model, while the operating device 620 includes a rotary switch like the one illustrated in FIG. 24D, wherein the arrangement of the lettering indicating the pitch class is, for example, performed equidistantly with regard to the angle range of the complete angle.

Figure 25:
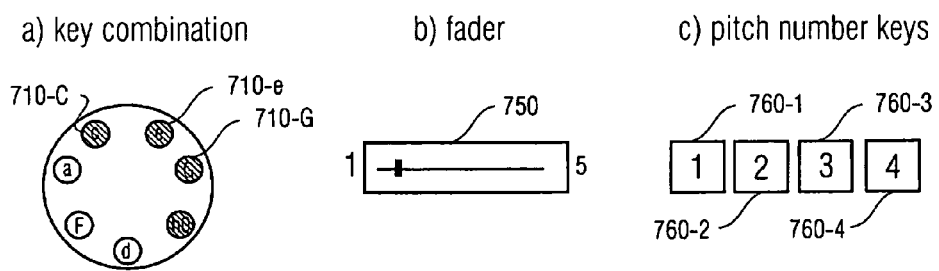
FIG. 25A to 25C show an illustration of three embodiments of an to operating means for defining an opening angle.

FIG. 25 shows three embodiments showing how the input of the opening angle β may take place. In the case of a key arrangement or a button arrangement, wherein an angle is associated with each key or button, with which again a pitch class is associated via the assignment function, the opening angle β may be defined by pressing several adjacent keys or buttons. In this case, the starting angle and the opening angle respectively results from the pressed and adjacent "outer" keys. One example for this is illustrated in FIG. 25A which illustrates the special keyboard from FIG. 24A. In the example illustrated in FIG. 25A, the three keys 710-C, 710-e and 710-G are pressed, so that the starting angle results from the angle associated with the key 710-C and the opening angle results from the difference of the angles associated with the keys 710-G and 710-C. By pressing several adjacent pitch keys, thus the opening angle may here be increased step by step.

FIG. 25B shows a further embodiment for inputting the opening angle β which enables an infinitely variable change of the opening angle via a fader and/or a sliding controller 750. By this, in the example illustrated in FIG. 25B, an infinitely variable change of the opening angle β may take place which corresponds to a change of the opening angle between one and five pitches.

FIG. 25C shows a further embodiment of an input means for the definition of the opening angle β. FIG. 25C shows an arrangement of four pitch number keys 760-1 to 760-4, using which the opening angle and/or the number of pitches and/or pitch classes to be played simultaneously may also be firmly set, depending on the implementation. The number of pitch number keys 760-1 to 760-4 may be varied here. In the case of the symmetry model, the same is typically between 2 and 7, advantageously between 3 and 5. In the case of the circle of thirds, also more than 7 pitch number keys are possible. Thus, FIG. 25 all in all shows several possibilities for the definition of the opening angle of the active circle segment in the symmetry model using hardware elements.

A combined input of starting angle α and opening angle β may also take place using a joystick. Thus, for example, the starting angle α may be derived from the inclination direction of the joystick, and the opening angle β or the radius r of the circle segment may be derived from the inclination degree. Instead of the inclination axis of the joystick, also the inclination angle and the inclination degree of the head may be used. This is, for example, interesting for accompaniment instruments for paraplegics, as will be explained in more detail in the further course of the present application.

Very complex possibilities for the definition of the active circle segment are offered by screen-based input methods. In this case, the symmetry model or the circle of thirds may be mapped to a screen or a touch screen. The active circle segment may be selected using a mouse, by touching the touch screen or another type of a touch-sensitive surface. Here, possibilities like drag and drop, dragging, clicking, tipping or other gestures may be used.

Such an application and embodiment example is illustrated by the so-called HarmonyPad. The HarmonyPad is a special operating means or also instrument for generating, changing and cross-fading chords. The surface of the HarmonyPad may also be used to program the synthesizers and sound generators contained in circle of thirds-based and symmetry circle-based musical instruments and to configure their operating surface. In more detail, the HarmonyPad thus represents a system which includes both an inventive device for generating a note signal upon a manual input and an inventive device for outputting an output signal indicating a pitch class.

Figure 26:
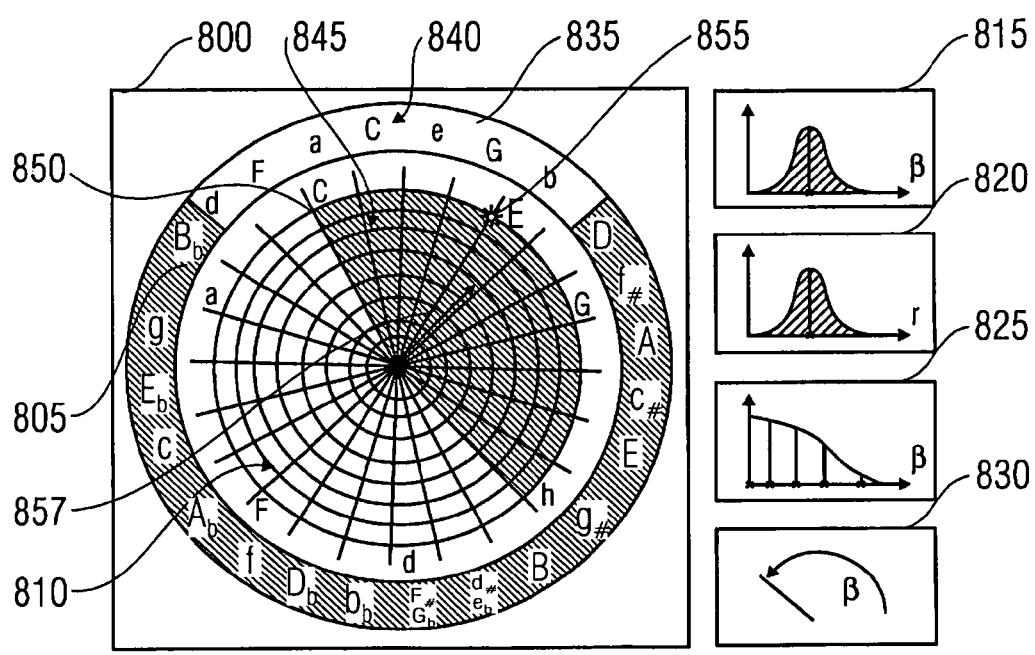
FIG. 26 shows an illustration of an embodiment of an operating means of an inventive device for generating a note signal and a device for outputting an output signal indicating a pitch class (HarmonyPad)

FIG. 26 shows an embodiment of an operating surface and/or interface and/or user surface/interface of the HarmonyPad. The same may be mapped to a touch-sensitive screen (touch screen) and comprises different elements which are explained in the following.

Seen technically, the HarmonyPad, the operating interface of which is illustrated in FIG. 26, is similar to the embodiment illustrated in FIG. 23 of an illustration on an operating means, so that the explanations described there may be used. In more detail, this means that the illustration of FIG. 26 may be on an output field of an inventive device for outputting an output signal indicating a pitch class. The operating means of the inventive device for generating a note signal upon a manual input in this case includes a touch-sensitive field arranged between the user and the output field which is coupled to a detection means. The detection means is, in turn, coupled to an evaluation means which provides the input signal of the operating means of the inventive device for generating a note signal to the control means of the same on the basis of a signal provided by the detection means. The functioning of the touch-sensitive field, the detection means and the evaluation means in this case corresponds to the functioning of the corresponding elements described in connection with FIG. 23.

First of all, the possible operating surface and/or surface comprises a harmony area 800 which includes a circle of thirds 805 and the symmetry model 810. The symmetry model 810 is here arranged and/or mapped concentrically in the center of the circle of thirds. The circle of thirds 805 and the symmetry model 810 thus comprise a common center point 812. The center point 812 simultaneously represents the output field center of the output field of the symmetry model 810 and/or of the symmetry circle 810 of the symmetry model. Starting from this center point 812, one or several output field radial directions may be accentuated, i.e. optically accentuated and/or illuminated. The symmetry model 810 is here illustrated on the operating surface of the HarmonyPad in the area of the harmony area 800, as it was explained in more detail in connection with FIG. 7 and which is referred to here. Apart from that, the circle of thirds 805, as it was already explained in connection with FIG. 8, is illustrated on the harmony area 800 of the HarmonyPad. Also this description is referred to here.

On the right next to the harmony area 800 four input fields and/or input possibilities (e.g. buttons) 815, 820, 825 and 830 are arranged one below the other. Here, the input field 815 enables editing, changing, determining or defining the spatial single pitch distribution function and thus also the spatial pitch distribution function. Using the button 820 a user of the HarmonyPad may define, edit or influence an inversion weighting function, using the button 825 correspondingly the selection distribution function and using the button 830 the opening angle β of the active spatial section and/or the selected area.

The surface of the HarmonyPad illustrated in FIG. 26, as already illustrated by the inventive musical instrument 600, may be connected to a sound generator which may convert the user inputs into audible audio signals. The following operating examples show some of the possibilities offered by the HarmonyPad.

Selection of key: The current key is selected by touching the circle of thirds 805. In FIG. 26, C major and a minor are selected as the current key. This may be seen from the illuminated area 835 of the circle of thirds which includes the amount of pitch classes on the circle of thirds associated with these keys, as was already explained in connection with the description of the circle of thirds within the scope of the description of the positioning variants of base pitches in the pitch space. In order to now set a different key, the user of the HarmonyPad has to touch the circle of thirds 805 at a corresponding location, which may, for example, be the center of mass and/or the tonal center of the associated scale. In the case of the C major and/or a minor scale it would in this case, for example, be an area 840 which is arranged, with regard to the orientation illustrated in FIG. 26 of the HarmonyPad seen from a center of the circle of thirds on the circle of thirds 805, directly perpendicular above the center between the plotted pitch classes C and e. The circle of thirds 805 then "rotates" such that the newly selected key appears on top in the illuminated area 835. Further, the designation of the base pitches in the symmetry model 810 is changed and/or switched so that the pitches of the C major key no longer appear, but the pitches of the newly selected key.

Alternatively, it is, for example, also possible that the illuminated area 835 is shifted corresponding to the newly selected key, so that a new orientation of the circle of thirds may be omitted. The circle of thirds 805 thus represents an embodiment of an additional operating means, using which a selection of an assignment function from a plurality of assignment functions may be carried out by the user to let the inventive device for generating a note signal and/or its control means for example switch back and forth between different keys.

Selection of the chord to be played: To make a certain chord and/or a certain pitch combination sound/play, first of all the opening angle β of the circle segment to be selected and/or the active spatial section has to be determined. This may, for example, take place graphically via the input field 835 and/or the associated window. Alternatively or additionally, this may, of course, also be done via a connected hardware interface or via an input means, as it was described in connection with FIG. 25. If the opening angle β is specified, the selection weighting function may be graphically edited via the input field 825. Now, by touching a location on the symmetry circle and/or the symmetry model 810, the starting angle α and optionally also the radius r of the circle segment to be selected may be determined. The selected circle segment is illustrated in an accentuated manner on the symmetry circle 810 as a marked area 845. Here, both in the area of the input field 825 and also on the symmetry model 810 within the scope of the marked area 845 the set selection weighting function may be illustrated with the help of transparency effects.

Fading between chords: In FIG. 26, currently the C major 7 chord is selected, as the marked area 845 illustrates. For this purpose, the corresponding opening angle β was specified via the input field 830 and the user touched the angle associated with the base pitch C on the HarmonyPad. To cross-fade the C major 7 chord into an a minor 7 chord, only the finger of the user has to be drawn to the left onto the angle which is associated with the pitch and/or the pitch class A minor. By this, the starting angle α of the selected circle segment is shifted from the pitch C to the pitch A minor. According to the shifting of the selected circle segment, the C major chord is softly or also instantaneously cross-faded into an A minor chord.

Fading between conversions: Optionally, the HarmonyPad offers the possibility of using and/or interpreting the radius of the selected circle segment for the selection of different chord conversions. By this it is possible, by a change of the radius r, to obtain a desired octaving of individual base pitches. Here, within the scope of the present application, the octaving of a pitch or a pitch class is a determination and/or definition of an octave position. The indication of an octaving thus, for example, defines to which octave a pitch with a certain pitch class belongs. With the help of octaving, it is thus defined which of the pitches C, C', C'', C''', . . . are played/sound and/or are to be associated with the pitch class C. In other words, the octaving determines a basic frequency of a pitch in the form of a factor $2^o$ with an integer number o, which is also referred to as the octaving parameter.

Thus, for example, the standard pitch A minor has a basic frequency of 440 Hz. If now, for example, instead of the standard pitch A minor a pitch of the pitch class A minor is to play one octave higher, then the octaving parameter has to be set at o=1, so that the new basic frequency of the pitch is 880 Hz. Accordingly, the basic frequency of a pitch of the pitch class A minor is one octave below the standard pitch A minor (o=−1) with 220 Hz.

If, on the HarmonyPad, for example the basic setting of the C major chord is selected, then for example the first conversion of this chord may be achieved by the user drawing and/or moving a finger along a radially directed C line 850 which leads from the center of the symmetry circle radially outward under an angle which is associated with the pitch class C, in the direction of the circle center point and/or the center. By this, the radius r of the selected circle segment is reduced and the basic setting of the C major chord is slowly converted into the first conversion. Via a connected sound generator, the user may then hear the first conversion of the C major chord.

A conversion of a chord is here an arrangement of the pitches of a chord such that the sounding pitch having the lowest basic frequency is not necessarily also the base pitch, for example in the case of a C major chord the pitch C and/or the pitch class C. In the case of a C major chord, an arrangement of the sounding pitches with increasing frequency in the order E-G-C for example represents the first basic setting. Apart from that, of course also other assignments of the radius r are possible with a certain octaving of a pitch and/or a pitch class or also a certain conversion of a chord.

Just like the spatial single pitch distribution function may be edited and/or defined via the input field 815, by introducing an optional conversion distribution function which may be edited and/or defined via the input field 820, an octaving of the sounding pitches may be influenced. Thus it is possible, based on the selected conversion distribution function, to assign volume information values to single pitches regarding a certain pitch class, so that, for example in the selection of the pitch class C via the active spatial section, more than one pitch of the corresponding pitch class sounds. Likewise, it is possible that the conversion distribution function is used, based on the input of the radius r by the user, to make different conversions of the corresponding pitch combination and/or the corresponding chord sound via a connected sound generator. In order to enable this, the surface of the HarmonyPad offers the corresponding window and/or input field 820.

Fading between single pitches and chords: The Harmony-Pad may, for example, be equipped with a midi interface or another control interface. Using this midi interface or the control interface, now optionally a controller, for example a foot controller, a momentary foot switch, a joystick or another input means may be connected. It is now possible to route the data of this input means (foot controller) to the opening angle β and/or interpret the same influenced by the input via the foot controller. This means that the opening angle may be controlled as an angle parameter by the user using the foot controller. Advantageously, the foot controller enables making a quasi continuous input of data possible which are, for example, associated with the foot position of the user. Hereby, the user may influence the opening angle β using the foot controller within predetermined or variable limits. If the user touches the foot controller so that it is at the bottom stop, this foot position may, for example, be associated with an opening angle of 0°. If the user now touches the HarmonyPad in the area of the symmetry model 810 at the location of the pitch and/or the pitch class C, via the connected sound generator, only the pitch C will sound and/or may be heard, as the opening angle is β=0°. If the user now slowly moves the foot controller in the direction of the top stop, it is possible to correspondingly increase the opening angle β so that the additional pitches and/or pitch classes E minor, G major and B/H minor are added and faded in one after the other in the case illustrated in FIG. 26.

Finding pitches which match existing pitches (improvisation): Optionally, the HarmonyPad (just like the inventive musical instrument 600) may be equipped with an analysis functionality which analyzes pitch signals and/or audio data present in the form of audio signals or midi signals and marks the corresponding basic pitches on the surface of the HarmonyPad (pad surface) by a corresponding accentuation. FIG. 26 shows this based on the example of an optical marking 855 of the pitch class E minor on the symmetry model 810. In this case, an audio signal or a midi signal was provided to the HarmonyPad as an input signal which has a pitch with a pitch class E minor. If a musician, as the user, wants to find matching accompaniment pitches to the given signal and/or the input signal, he only has to select a circle segment which includes the marked pitches or is close to the marked pitches.

Apart from that, it is further optionally possible to graphically illustrate the result of an analysis of audio data using the HarmonyPad, which are provided to the HarmonyPad in the form of the analysis signal. Apart from a marking and/or accentuation of the pitch classes included in the audio signal by an accentuation of individual output field radial directions of the symmetry model 810 or larger coherent areas on the symmetry model 810, thus also the sum vector provided in the form of the analysis signal may be illustrated on the output field 810. Here, the angle of the sum vector may be indicated starting from the output field center and/or the center of the symmetry model 810 by an accentuation of an output field radial direction. By this it is possible, while a piece of music is playing, to illustrate the center of mass and/or thus the tonal center in a time-resolved way on the HarmonyPad quasi in real time, so that an accompanying musician may play based on this.

Optionally, it is also possible to accentuate the output field radial direction accentuated on the basis of the angle of the sum vector not as a whole, but based on the length of the sum vector starting from the output field center, to accentuate only a part of the corresponding output field radial direction. By this, additionally the length of the sum vector $|\vec{r}_{sum}|$ may optically be indicated to the user on his control panel. As it was explained in connection with the analysis of audio data, the user may thus better classify the music played on which he is, for example, improvising, as the absolute value of the sum vector is, among other things, an estimate of the tonal context of the sounding/playing music.

Optionally it is also well possible to integrate the incoming audio signals in time with the help of an input value integrator for so long until the absolute value and/or the length of the resulting sum vector reaches a (temporally local) maximum. As, depending on the underlying basic pitch arrangement in the pitch space, maxima again indicate chords in the case of the symmetry model or key changes in the case of the circle of thirds, based on the integrated audio data also the representation on the HarmonyPad may be adapted correspondingly. Thus it is, for example, possible to determine the diatonic scale underlying the symmetry model 810 on the basis of the integrated audio signal and indicate the same on the symmetry model 810.

FIG. 26 thus shows a possible operating surface of the HarmonyPad which includes many optional components, like, for example, the input field 820 for the reverse distribution function. Of course, also geometrical arrangements other than the one illustrated in FIG. 26 are possible. Apart from that, of course also the output field 810 may not operate on the basis of the symmetry model but on the basis of the circle of thirds. The HarmonyPad thus represents an embodiment which combines the inventive device for generating a note signal upon a manual input with the inventive device for outputting an output signal indicating a pitch class, based both on its implementation as a touchscreen and the associated possibility for inputting data by touching the surface of the touchscreen and also for outputting via the display surface of the touchscreen.

The HarmonyPad thus represents an embodiment of the inventive device for generating a note signal with a touch-sensitive screen (touchscreen). Alternatively or additionally to the described possibilities of determining the starting angle α and the opening angle β via the harmony area 800 and the input field 835, this may also happen upon touching the touchscreen in the area of the symmetry model 810. Thus it is, for example, possible that the starting angle α and the opening angle β are derived from two touches of the symmetry model 810 performed in sequence by the user of the HarmonyPad. Thus, by a first touch of the touchscreen in the area of the symmetry model 810, the user may, for example, determine the starting angle α and by a further touch of the touchscreen in the area of the symmetry model 810 he may determine the associated opening angle. Here, the operating means of the HarmonyPad may, for example, determine the opening angle β by a simple calculation of the difference of an angle derived from the second touch of the user on the touchscreen and the starting angle α. The operating means of the inventive device for generating a note signal, i.e. the HarmonyPad, then transmits an input angle range to the control means on the basis of the selected starting angle and the opening angle.

It is also possible for the user to touch two points on the symmetry model 810, from which the operating means determines two angles on the basis of the position of the center point 812 of the symmetry model 810. If the starting angle and the opening angle are not determined as described above on the basis of the sequence of the input of the two angles, it is, for example, an alternative to provide the angle range to the control means as an input angle range which is, with regard to the two angles and a complete circumference of a circle, smaller than 180° and/or π. Apart from that, it is possible, if only one angle was input, i.e. if the user touched the symmetry model 810 only at one point or at one location, to provide an input angle range to the control means on the basis of a predetermined opening angle β or one predefined by the user. This may, for example, be performed by the user via the input area 835. One possible predetermined opening angle β is the opening angle β=0°, so that in this case the input angle range only includes the starting angle and/or that in this case only one input angle is transmitted to the control means.

A further possibility of determining the starting angle α and the opening angle β using a touchscreen, i.e. for example the HarmonyPad, is to enable the user to "draw" on the symmetry model 810. In this case again by "drawing" the finger on the HarmonyPad, two angles are determined with regard to the center point 812 of the symmetry model 810, from which the starting angle α and the opening angle β are determined analog to the above-described cases.

If, however, the opening angle β is not determined by the user via the symmetry model 810 but, for example, via the input field 835, then the user has the possibility to cross-fade between individual pitches or individual chords by moving the finger on the touchscreen. In this case, the operating means determines an angle which, for example, represents the starting angle α of the input angle range, depending on the place of touching on the symmetry model 810 with regard to the center point 812 of the symmetry model 810. If the opening angle β disappears, however (β=0°), then the user may cross-fade between individual tones by moving a finger over the touchscreen.

A further embodiment represents a musical instrument for infants. In particular, in the following sections a new type of toy is described, using which infants may generate sensible harmonic sounds. The instrument is designed such that a correlation between the geometric positions of the operating elements and the basics of music theory results. By playfully handling the instrument, the child becomes familiar with the correlations of music theory. This may again make a later learning of a (different) instrument or musical understanding clearly easier.

The problem resulting here is that input instruments for music and harmonic sounds today, like, e.g., for minor triads or major triads, are either very complicated and only operable after a certain time of practice or are very inflexible. Pedagogic principles regarding music theory are generally very non-transparent. As the description of this embodiment will show, the musical instrument for infants described here presents such an input method which is so simple that even infants or highly handicapped persons can be musically creative.

Figure 27:
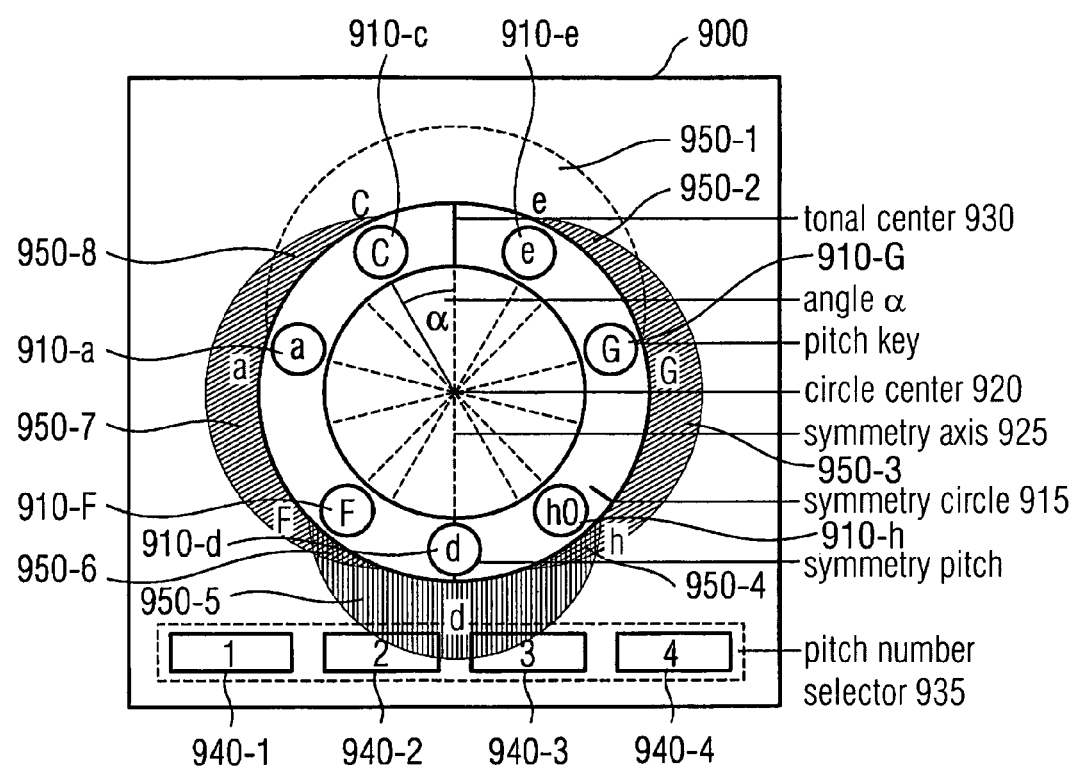
FIG. 27 shows an illustration of an embodiment of an operating means of an inventive device for generating a note signal and a device for outputting an output signal indicating a pitch class.

FIG. 27 shows an illustration of an operating means 900 for a musical instrument for infants. Here, the setup of the instrument and/or the operating means 900 follows, more precisely, the arrangement of pitch classes as described by David Gatzsche within the scope of his above-cited dissertation.

The operating device 900 solves the problem presented above of the possibility for infants and highly handicapped persons to be able to be musically creative. The operating means and/or operating interface 900 illustrated in FIG. 27 comprises several discrete operating elements (e.g. keys or other discrete touch-sensitive areas) which are explained individually in the following. The musical instrument and/or the operating means 900 comprises seven pitch keys 910-C, 910-e, 910-G, 910-h, 910-d, 910-F and 910-a. The seven pitch keys are coupled to an evaluation means not illustrated in FIG. 27 which provides an input signal to the control means of the inventive device for generating a note signal upon a manual input, which includes an input angle associated with the pressed pitch key by the evaluation means. If several pitch keys are pressed, the evaluation means may generate an input signal which, for example, includes more than one input angle. Additionally or alternatively, the evaluation means may also be implemented such that, when two adjacent pitch keys are pressed, i.e. for example the pitch keys 910-e and 910-G, the input signal includes the input angle range which is associated with the two outer directly adjacent pressed pitch keys. In the described case, thus evaluation means would generate an input signal which includes the input angle range which is limited by the angle associated with the pitch key 910-e and by the angle associated with the pitch key 910-G. If the child presses a pitch key, a pitch is played.

The question now is, why there are exactly seven keys. The answer is as follows: the most common scale in western latitudes is the so-called diatonic scale, as was already explained in the introductory sections of the present application. This scale has seven pitches. On the piano, seven adjacent white keys exactly correspond to the diatonic scale for C major and/or a minor. A substantial innovation of this instrument and/or the operating means 900 compared to a piano or other comparable musical instrument is the arrangement of the pitch keys 910-C to 910-a on the operating surface:

On the piano, the pitch keys are arranged in semitone steps and whole steps. From this, the pitch sequence and/or pitch class sequence C-D-E-FG-G-A-(B and/or h)-C results. On the instrument 900 described here, the keys are, however, arranged in intervals of thirds: starting with the pitch D minor and major thirds alternate. Thus, the following pitch sequence and/or pitch class sequence results: D-F-A-C-E-G-(B and/or H)-D.

The pitch keys 910-C to 910-a are not arranged on a line like on a piano, but are ring-shaped on a circle and/or ring 915, i.e. the symmetry circle of the symmetry model. Basically, also other oval/circular arrangements, as defined in the introductory sections of the present application, are possible here. The circle comprises a circle center 920. A vertical imaginary axis 925 runs through the circle center 920 of the circle and is referred to in the following as the symmetry axis. With the help of the axis 925, every pitch key 910-C to 910-a may be represented by an angle α between the symmetry axis 925 and a connecting line between the corresponding pitch key and the circle center 920.

The white keys on the piano are of equal width, no matter whether two neighboring keys represent a whole step or a semitone step. In the inventive musical instrument and/or the operating means 900 the keys are not arranged at equal distances and/or angles, based on the circular arrangement, but at an (angle) distance which corresponds to the pitch interval and/or pitch step between the two pitch keys. This means that two adjacent keys which correspond to a (smallest) pitch interval of a major third are arranged further apart on the circle and/or the symmetry circle 915 than two pitch keys which have an associated (smallest) pitch interval which corresponds to a minor third. Thus, the distances of the individual pitch keys with regard to each other represent the (smallest) pitch interval of the associated pitches and/or pitch classes.

The exact arrangement and/or positioning of the pitch keys is calculated as follows: first of all, the symmetry circle 915 is divided into 24 segments, which thus all in all corresponds to two octaves. Each of these segments represents a semitone step. The opening angle of such a semitone segment is thus 360°:24=15°. A major third corresponds to four semitones, a minor third accordingly to three semitones. Thus, the following key intervals on the circle result: if the tonal interval, i.e. the (smallest) pitch interval between two adjacent pitch keys is a major third, then the angle spanned by the two pitch keys is 4×15°=60°. If the tonal interval between two adjacent pitch keys is a minor third, then the interval/distance is 3×15°=45°.

The keys and/or the discrete operating means are subsequently positioned and/or arranged on the circle and/or the oval/circular arrangement as follows: the key 910-d which corresponds to the pitch class d is arranged at the bottom center of the circle, i.e. under an angle α=180° with regard to the circle center point 920 and a zero direction which runs vertically upwards in FIG. 27. From here, the other pitches are spaced apart to the left, i.e. in a clockwise direction, and also to the right, i.e. in a counterclockwise direction, symmetrically. The following Table 3 thus shows an example for the exact angles of the pitch keys 910-C to 910-a. It is important to note here, however, that also a deviating distribution is possible regarding the angles.

| Pitch key | Angle α | Reference numeral |
| --- | --- | --- |
| e | +030° | 910-e |
| G | +075° | 910-G |
| b0 and/or h0 | +135° | 910-h |
| d | ±180° | 910-d |
| F | −135° | 910-F |
| a | −075° | 910-a |
| C | −030° | 910-C |

To illustrate the arrangement of the pitch keys 910-C to 910-a in a better way, a plurality of dotted orientation lines are plotted starting from the circle center 920 in FIG. 27.

The pitch D is referred to as the symmetry pitch as it is the only pitch which lies exactly on the symmetry axis and because all other pitches of the scales are arranged mirror-symmetrically around this pitch. Opposite the symmetry pitch, the tonal center 930 is located (d=0°). It is referred to as the tonal center because common melodies in western latitudes usually start with pitches and end with pitches which are close to the tonal center.

From the above-described arrangement of the operating elements and/or pitch keys 910-C to 910-*a*, implicitly a number of connections regarding music theory opens up, which currently still have to be learned with much effort. By a playful contact of the infant with the instrument, it has fun and automatically learns to link tonal connections with geometric positions and/or motor movements. By this, it is a lot easier for the infant to learn connections regarding music theory later on. It is expected that the instrument will thus prove to be an excellent aid in early musical education in kindergartens, music schools and also in the private area.

In the following sections, an illustration of tonal connections and/or connections regarding music theory are summarized and/or repeated which are conveyed by the operating concept of the inventive operating device 900.

1. The child learns to assign consonantly and dissonantly sounding pitch combinations. Dissonantly sounding pitch combinations may be triggered by remotely positioned pitch key combinations, and if the child presses adjacent pitch keys, consonantly sounding pitch combinations result. The further two pitch keys are apart, the more dissonant the generated (triggered) pitch combination will sound.

2. The child learns the setup of the most common major and minor chords. A selection of pitches, chords and harmonies which the child may generate by pressing adjacent pitch keys are indicated in the following: pressing a single key leads to a single pitch of the scale being played. Pressing two adjacent pitch keys leads to a third being played. Pressing three adjacent pitches leads to a major, minor or diminished triad being played. Pressing four adjacent pitches leads to a seventh chord being played. Pressing five adjacent pitch keys leads to a 7th-9th chord being played.

3. In the brain of the child a linking of a geometric position to a harmonic sound event results, and on the other hand motor movements, such as moving an arm to a key, are brought into connection with correlations of functional theory and/or music theory. This is very favorable regarding perception psychology. The tonal sensitivity of the child and/or his or her thinking in harmonies is substantially enhanced by the instrument. This may be a valuable basis for learning an instrument later on and for improvising.

4. The child learns the setup of triads and 4-note chords very easily, as it may, on the one hand, listen to the individual pitches, and also simultaneously listen to chords by pressing adjacent pitch keys. It is, of course, a precondition that the pitch keys are realized in such a way that the child can press several adjacent pitch keys.

5. The child playfully learns to assign major chords and parallel minor chords to each other. This is possible because the pitch keys of the major chord and its parallel minor chord are arranged adjacently on the symmetry circle (example: C major chord: C-E-G and parallel a minor chord: A-C-E).

6. The child automatically gets to know the common pitches of different chords. For example, the a minor chord and the C major chord have the two common pitch keys C and E. On the symmetry circle 950, those common pitches are represented by the same pitch classes. The child further automatically learns from which chords mixed chords are put together. For example, the a minor 7th chord is put together from the chords a minor and C major.

7. The child also learns connections regarding functional theory and/or music theory: the pitch keys of tonic chords (a minor and C major) are arranged centrally, those of subdominant chords (F major and d minor) are arranged to the left and those of dominant chords (G major and e minor) to the right of the tonal center 930.

8. The child learns to feel which pitches of a given major and/or minor key have a greater strive for resolution and which pitches have a smaller strive for resolution. The pitches which have a small strive for resolution are arranged close to the tonal center 930, pitches which have a high strive for resolution are placed far away from the tonal center 930 on the symmetry circle 915. Example: if you play a melody on the C major scale and end at the pitch h/b minor, we generally have the feeling that the piece has to continue, i.e. to C and/or the third C-E. This feeling is referred to as a strive for resolution.

9. The child can very easily deduce using which chords it can accompany a given pitch of a given key. For this purpose, he/she only has to press adjacent pitch keys which comprise the given pitch. If, for example, the pitch C is given, the child may then accompany this pitch with the pitches C-E-G (adjacent), A-C-E (adjacent), F-A-C (adjacent or D-F-A-C (adjacent. The child used to have to remember these variants. Now it can deduce the allowed chords by simple geometric connections, which presents a significant advantage of the inventive operating device 900.

In summary it may be said that there is currently no instrument which reflects such a great number of tonal and functional connections regarding music theory in such a compact way.

Especially in the first years of life, an infant is usually not able to simultaneously press more than one pitch key. In order to give the child the possibility not only of generating single pitches with the help of the inventive musical instrument and/or the operating device 900, but also of being able to play chords and harmonies, the operating device comprises an (optional) pitch number selector 935 with a plurality of pitch number selection keys 940-1 to 940-4. In the embodiment of an inventive device for generating a note signal illustrated in FIG. 27, the pitch number selector 935 comprises four pitch number selection keys 940-1 to 940-4 which are arranged below the symmetry circle 915. Deviating from this, an inventive operating device 900 may also comprise another number of pitch number selection keys 940-1 to 940-4. Typically, the number of pitch number selection keys is between 2 and 7, advantageously between 2 and 5.

The pitch number selector 935 thus represents an aid for the infant, by which the child is able to make several pitches sound simultaneously although the child can maybe not press more than one or two pitch keys on the instrument simultaneously. Via the pitch number selector 935, the child may change the opening angle of the active spatial section and thus set how many adjacent pitches simultaneously sound when one pitch key is pressed. As already explained, in the embodiment illustrated in FIG. 27 the pitch number selector 935 is realized via a series of pitch number keys 940-1 to 940-4. If the child for example presses the pitch number key 940-3, to which an opening angle of the active spatial section is assigned, so that three pitches sound through a connected sound generator, then, when the pitch key 910-C is pressed, not only the pitch C sounds but also two adjacent pitches, i.e. the pitches e and G. In this way, by pressing one of the keys 910-C to 910-*a*, the child may determine the starting angle of the active spatial section and/or the input angle section, and, by pressing one of the pitch number keys 940-1 to 940-4, it may determine the opening angle of the input angle range. By this, the child may listen to major triads and minor triads. If it presses the pitch key 910-*a*, it hears the a minor triad. If the child selects the pitch number key 2, it will hear the minor and major thirds, and if it selects the pitch number key 4 it can hear the seventh chords. If the child for example selected the pitch number key 940-3 for three pitches and presses the two adjacent keys 910-*a* and 910-C for the two pitch classes a and C, an a minor chord and a C major chord will be played/sound simultaneously. Together, an a minor 7th chord will be played which results from this combination of pitch classes.

If the child pressed a pitch number key greater than 1, i.e. for example the pitch number keys 940-2 to 940-4, then, when a pitch key is pressed, several pitches sound. To be able to tell the child which pitches these are, the inventive operating means 900 may be combined with an inventive device for outputting an output signal indicating a pitch class. In this case, the toy and/or the musical instrument may optionally be realized in such a way that the keys 910-C to 910-*a* may simultaneously serve as a display device and/or output area which are controlled by a display control means so that the same are accentuated. This may, for example, be performed by a controllable illumination of active pitch keys or a realization of the pitch keys on a touchscreen or by the integration of a display, for example and LCD display, into the pitch keys. If such a possibility is integrated and/or implemented, the following will happen: the child selected the pitch number key 940-3 for three pitches and subsequently presses the pitch key 910-C for the pitch C. The pitches C-E-G sound and simultaneously the pitch keys 910-C, 910-E and 910-G are illuminated, i.e. the pitch keys C-E-G, as the same also function as output areas in this case. By this, the child may optically see which pitches/tones are playing.

As the child generally does not yet know the names of notes and cannot read a lettering of the keys 910-C to 910-*a*, an obvious possibility would be to optionally provide the pitch keys with colors and/or symbols. Possible colors are indicated in FIG. 27 and correspond to a scheme proposed in the above-mentioned dissertation by David Gatzsche. This coloring is indicated in the background of FIG. 27. This coloring may, for example, be applied to the housing surface of the inventive operating device 900. Apart from that, it is possible, in the case of an illustration on a touchscreen, a screen or another display device, which enables an illustration of changeable colors, to color the display areas and/or the pitch keys 910-C to 910-*a* according to the currently sounding pitch combination. In order to illustrate this, in FIG. 27 eight areas are indicated, 950-1 to 950-8, which have the following associated colors: 950-1 yellow, 950-2 orange, 950-3 light red, 950-4 dark red, 950-5 violet, 950-6 dark green, 950-7 blue and 950-8 light green.

This coloring was chosen with regard to a "thermal feeling", wherein bluish colors are assigned to the subdominant area, as the same implicates "cold". The dominant area has associated reddish pitches here, as "warmth" is associated with the same. The tonic area has the associated color yellow being the "neutral area", while violet is associated with the area in which the subdominant area and the dominant area abut. The resulting mixed colors are here associated with the areas 950-2, 950-4, 950-6 and 950-8. The pitch keys 910-C to 910-*a* may additionally be provided with symbols which symbolize the major triads and minor triads and the diminished triad b0 and/or h0.

The inventive operating device 900 may be coupled to a sound generator to realize a musical instrument and/or another instrument. A simple variant is coupling a mechanical sound generator to the same, as it is, for example, also used in music boxes. A further possibility is to implement a further control logic which converts input options and offers control signals therefrom for an electronic sound generator, for example a synthesizer. In the case of a children's toy and/or musical instrument for infants, it may be advantageous to directly integrate the sound generation and sound reproduction into the toy and/or the instrument. It is further possible for the operation inputs to be optionally additionally directly converted into midi signals and that a midi sound generator is controlled using the same. In addition, it is possible for the coupled sound generator in turn to comprise an automatic accompaniment which is controlled via the toy.

If the pitch sequence D-F-A-C-E-G-B-D is played on a piano, then the second D occurring in this sequence is two octaves above the first D. In the case of the inventive operating means 900, however, the first D and the last D of the sequence is represented by the same pitch key 910-*d*. Thus, at one location of the circle 915 an interfering pitch level interval results. This may, for example, be prevented by a list optionally existing for each pitch key which includes different octavings of the pitch and/or pitch class belonging to the respective pitch key. These lists may, for example, be stored in the control means of the inventive device for generating the note signal. If the child now presses a pitch key, for example a random generator selects a random variant of possible octavings from the corresponding list associated to the pitch key. From this, additionally the learning effect results that the child at the same time learns that chords may exist in different inversion variants, as in the described case the octaving of each selected pitch is determined as the basis of a random number. The selection of the respective octaving may also take place under different aspects. It is thus possible that a predetermined octaving of a pitch class is selected, or that, depending on the other selected pitch classes, the octavings of the individual pitches are adapted.

In the following paragraphs, further application scenarios and approaches for the operating means 900 illustrated in FIG. 27 will be discussed. In some application fields and application areas an implementation of the optional pitch number selector 935 may be omitted.

The inventive operating means 900 may, for example, be provided with a midi input and a midi output. By this it is possible to use the operating means 900 together with learning programs which run on a computer in order to be used in the pedagogic field. By this it is possible to implement pedagogic concepts. Thus, it is, for example, conceivable that the learning program asks questions about music theory. The child or another user may then use the inventive operating means 900 as an input instrument for answering the questions. For example, the computer may ask the child, for example, about the parallel minor chord and/or minor key of a corresponding major key and/or major chord. For this purpose, the computer may illuminate the basic pitch of the major key at the operating device 900 illustrated in FIG. 27 if it is also implemented as an inventive device for outputting an output signal indicating a pitch class. The child now has to know that the basic pitch of the parallel minor chord in the circle of thirds or the symmetry circle and/or the symmetry model is placed directly to the left, i.e. counterclockwise next to the basic pitch of the major key, and in this way find out the corresponding minor key.

A musical instrument which comprises both an inventive device for generating a note signal upon a manual input and also an inventive device for outputting an output signal indicating a pitch class may, for example, also serve for learning improvised song accompaniment. Thus, the instrument may, for example, be coupled to a keyboard via one or two midi interfaces. If a first child plays a simple melody on the keyboard, the pitches of the melody may be transmitted to the inventive instrument of the second child, which is also referred to as the symmetry circle instrument. There, the corresponding pitch keys light up. The second child may now generate a suitable accompaniment by pressing the pitch keys in the proximity of the already illuminated pitch key. If the symmetry circle instrument comprises the optional pitch number selector 935 or another possibility to define an input angle range so that a connected sound generator plays more than one pitch, then the second child may easily accompany the first one in harmony (polyphonically).

Another possibility is to couple a symmetry circle instrument to a melody analysis device which may be implemented as an external component or as part of the symmetry circle instrument. In the case of an external melody analysis device, the same may, for example, be coupled to the symmetry circle instrument via midi signals. In this case the possibility results that a child, for example, plays a simple melody on a flute. The melody of the flute is detected via a microphone or another sound reception means with the help of the melody analysis device and converted into midi signals and provided to the symmetry circle instrument if the melody analysis device represents an external component. This signal is mapped and/or transmitted to the symmetry circle instrument of the first child and represented there. By this, the first child may now generate a suitable accompaniment for the melody of the flute by pressing the pitch keys which are again in the proximity of the illuminated pitch keys.

The symmetry circle instrument may additionally optionally be implemented, for example, to provide control signals at a midi output to control an automatic accompaniment. The instrument may in this case be the controller for conventional automatic accompaniments. The angle and the opening angle from the circle of thirds or the symmetry model have in this case to be converted into a fundamental pitch and a further pitch which specifies whether it is a minor chord or a major chord.

Depending on the target group, such a symmetry circle instrument may here be produced in different versions. Thus, the instrument may, for example, be implemented with very big, colorful keys for babies. For older children it is possible to realize such a symmetry circle instrument as a software and/or a computer program product on a computer, a PDA (personal data assistant), a notebook, a Gameboy®, a mobile telephone or another computer system. Also here, a touchscreen variant is possible. When, for example, the Gameboys® of several children are networked, children may together form a "Gameboy band". The chords to be played at a certain point of time are transmitted to the devices of all participating children and indicated there. The children may then generate corresponding accompaniment melodies. A rhythmic synchronization may also take place via the existing network.

In the following paragraphs, a measurement device and an analysis device for tonal harmonic connections is explained and described in more detail. The possibilities described within the scope of the symmetry model-based and circle of thirds-based harmony analysis may be implemented in the form of a measurement device which records an audio signal, transforms it into the symmetry model or the circle of thirds, calculates the corresponding absolute value parameters and angle parameters and optionally reproduces the same on a display device. The display device may be similar to the HarmonyPad of FIG. 26 with regard to its user interface.

Figure 28:
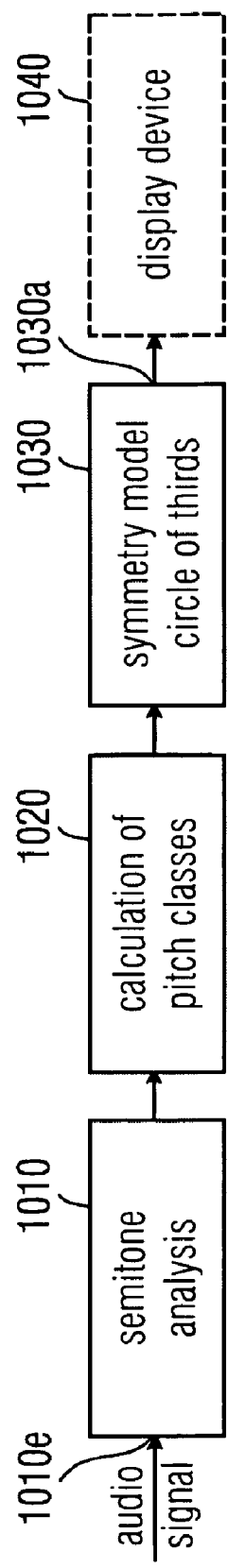
FIG. 28 shows a schematic block diagram of an embodiment of a device for analyzing audio data.

FIG. 28 shows a block diagram of a device for analyzing audio data and/or a measurement device 1000. The device 1000 comprises a semitone analysis means 1010 which is provided with an audio datum at an input 1010$e$. Downstream to the semitone analysis device a pitch class analysis means 1020 is connected for calculating the pitch classes. Downstream to the pitch class analysis means 1020 a vector calculation means 1030 is connected which outputs an analysis signal at an output 1030$a$. The analysis signal may then be provided to an optional display device 1040 as an input signal.

The semitone analysis means 1010 analyzes the audio datum provided at its input 1010$e$ with regard to a volume intensity distribution across an amount of semitones. The semitone analysis means 1010 thus (among other things) implements equation 4. The pitch class analysis means 1020 determines a pitch class volume information distribution on the basis of the volume information distribution across an amount of pitch classes being the underlying amount. The vector calculation means 1030 is then provided with the pitch class volume information distribution, on the basis of which the vector calculation means 1030 forms a two-dimensional and/or complex intermediate vector for each pitch class, calculates a sum vector based on the two-dimensional intermediate vectors and outputs the analysis signal to the analysis signal output 1030$a$ on the basis of the sum vector. The optional display device 1040 connected downstream may then, based on the analysis signal, for example output the sum vector, the angle of the sum vector and/or also the absolute value and/or the length of the sum vector.

In other words, the measurement device 1000 is fed with an audio datum from which the semitone analysis means 1010 analyzes the semitones. If the audio signal is a note sequence signal, i.e. for example an analog or digital control signal for a sound generator, like, for example, a midi signal which directly displays the pitches played or to be played, the semitone analysis means 1010 may basically include an evaluation means which splits up the audio datum with regard to the played pitches and/or semitones into its components and if applicable temporarily stores the same in a memory. If the note sequence signals comprise volume information, the same may be considered within the scope of the semitone analysis.

If the audio datum is an analog or digital audio signal, i.e. for example a signal of a microphone, an (analog) line signal, as it is used within the scope of stereos for transmitting music, or a PCM-encoded digital music signal (PCM=pulse code modulation), this may, for example, be done by a constant Q transformation. In the case of analog audio signals, a scan, for example, by means of an analog/digital converter (ADC) may be appropriate.

Within the scope of a constant Q transformation, an audio signal is analyzed by a plurality of bandpass filters, which are respectively characterized by a central filter frequency and a bandwidth. The central filter frequencies here advantageously correspond to the frequencies of the pitches to be analyzed and/or their basic frequencies. With regard to the frequency, the bandwidth of the bandpass filters corresponds to the interval of two pitches to be analyzed. From this, a constant ratio (Q=quotient) of central filter frequency and bandwidth results, which explains the name of the constant Q transformation.

The semitones are then combined into a one-octave area by the pitch class analysis means 1020. In other words, the pitch class analysis means 1020 calculates the pitch classes and the associated volume information on the basis of the result of the semitone analysis means 1010. The vector calculation means 1030 generates, on the basis of the obtained pitch classes and the associated pitch class volume information distribution, with the help of equation 14 in the case of an analysis according to the circle of thirds, or equation 23 in the case of an analysis according to the symmetry model, the respectively assigned sum vector. Again in other words, the vector calculation means converts the obtained pitch classes into the circle of thirds sum vector or the symmetry model sum vector according to equation 14 or equation 23.

The angle and/or the absolute value of the corresponding sum vector may then be represented by the display device 1040.

The input terminal 1010e of the measurement device 1000 and/or the semitone analysis means 1010 may be a microphone input, an analog audio input or directly a digital input so that the measurement and display device, if the display device 1040 is implemented, may basically analyze both analog and also digital audio data. In the case of a digital input, the audio data and/or audio signals may further include control signals, i.e. for example midi control signals. In the case of an analog input, depending on the implementation of the system, an analog/digital converter (ADC) may also be implemented.

FIG. 28 thus shows a block diagram of the measurement and display device, wherein in particular the basic structure of the same is illustrated.

The optional display device 1040 may, for example, comprise an output field similar to the HarmonyPad illustrated in FIG. 26. In this case it is possible in the case of an analysis according to the symmetry model to illustrate the angle information of the symmetry model sum vector in the form of an output field radial direction which is accentuated starting from the center of the symmetry circle (810 in FIG. 26) across the complete radius of the symmetry circle. It is optionally possible here to realize the absolute value and/or the length of the symmetry model sum vector by a length of the accentuation of the output field radial direction depending on the absolute value of the symmetry circle sum vector. Alternatively or additionally, apart from that the angle of the symmetry circle sum vector may also be represented by a spatially limited accentuated area, which may, for example, be similar to the marking 855 in FIG. 26.

Basically, it is possible, within the scope of calculating the pitch classes by the pitch class analysis means 1020 to perform a weighting of the analyzed semitones depending on their pitch level and/or their frequency f by introducing a weighting function g(f). The weighting function and/or the weighting describes how differently two pitches of the same pitch class, which, however, belong to different octaves, influence the perception with regard to harmony. From this the possibility results not only to perform the analysis of the semitones with regard to a volume information distribution which is based on a hearing-adapted variable, but it rather also allows considering the human perception of harmonies of different frequencies, which is more than a mere hearing-dependent variable. The weighting function g(f) thus enables the analysis to be refined further with regard to human perception.

Apart from that, it is possible to additionally or alternatively integrate and/or include an input value integrator into the measurement device 1000 which integrates the audio signal or a signal derived herefrom in time for as long until the absolute value of the resulting sum vector is at a maximum. By this, apart from the display on a display device 1040, also a further use of the analysis signal, for example within the scope of an accompaniment, is possible, as maxima of the absolute value of the sum vector indicate a change of chord in the case of the symmetry circle sum vector or a change of key in the case of the circle of thirds sum vector.

Figure 29:
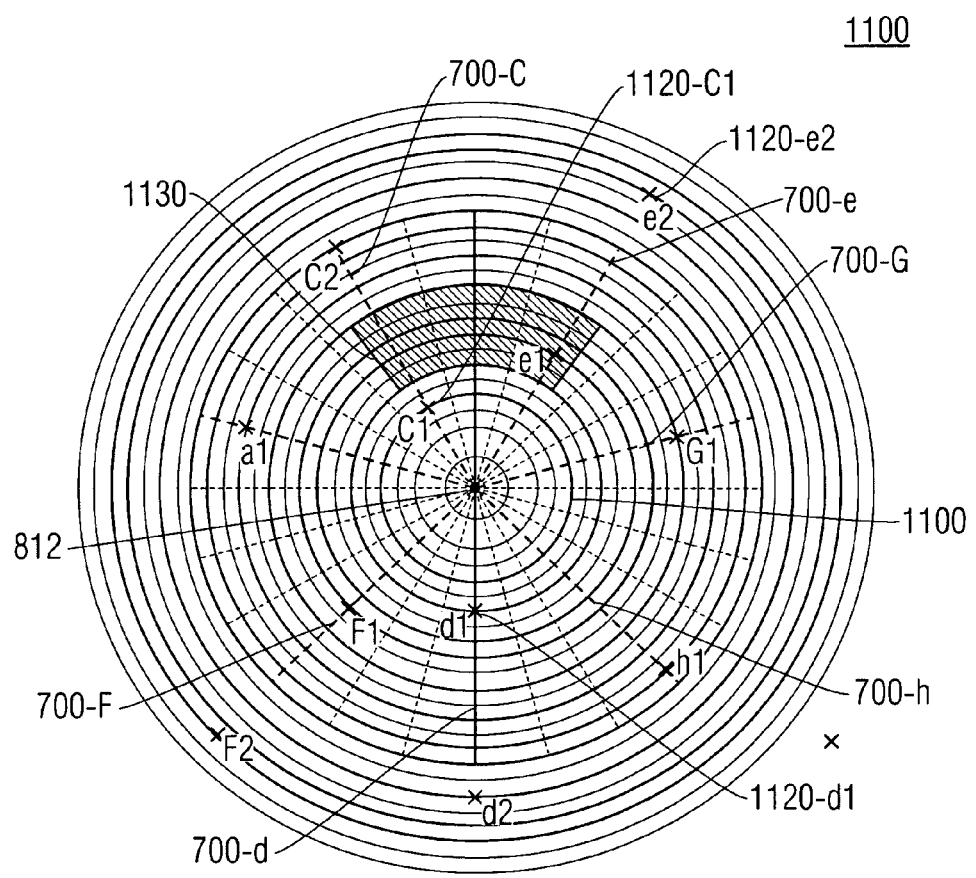
FIG. 29 shows an illustration of an embodiment of an operating means of an inventive device for generating a note signal.

FIG. 29 shows an embodiment of an illustration on an operating means and/or on a control panel 1100 of an inventive device for generating a pitch signal which may, depending on the concrete implementation, also be used as an embodiment of an output field 1100 of an inventive device for outputting an output signal indicating a pitch class. The output field 1100 and/or the control panel 1100 illustrated in FIG. 29 is again based on the symmetry model. As it was already described within the scope of the description of the HarmonyPad in connection with FIG. 26, also the control panel 1100 may be displayed on a touch-sensitive field (touchscreen), so that by touching the touch-sensitive field, the user of a control means not illustrated in FIG. 29 of the inventive device for generating a note signal may transmit corresponding information regarding the coordinates of the point of touching. The control means may then, on the basis of these coordinates, generate an input angle and/or input angle range as well as optionally radial information (e.g. a starting radius and a stopping radius or a starting radius and a radius range and/or radius difference).

As mentioned above, the user interface 1100 illustrated in FIG. 29 is based on the symmetry model, in which, as explained for example in connection with FIG. 7, the pitch classes are arranged starting from a center point 810 in directions running radially outward 700-C, 700-e, 700-G, 700-h, 700-d, 700-F and 700-a. Here, again the designations on the control panel 1100 of the individual pitch classes and/or pitches are given on the basis whether a respective chord which is played is a major chord (capital letters) or a minor chord (small letters). In more detail, regarding the control panel 1100 illustrated in FIG. 29, the amount of pitch classes and/or pitches is illustrated which correspond to the diatonic scale C major and/or a minor.

The illustration of the control panel 1100 in FIG. 29 is, however, regarding two aspects, completely different from the control panels illustrated in FIGS. 23 and 26, which are also based on the symmetry model. While in the control panels illustrated in FIGS. 23 and 26 only one pitch class each is illustrated on the corresponding radial directions (beams), regarding the control panel 1100, apart from the selection of the pitch class via the angle, also a specific selection of the octaving is possible via the radius. As one pitch consists at least of the information regarding pitch class and of the information regarding octaving, it is thus possible to arrange individual pitches on the control panel 1100, as it is illustrated in FIG. 29. For this purpose, the control panel 1100 comprises, starting from the center point 812, a plurality of concentric circles 1110, which have one "octaving information" associated each, which are, however, different by one semitone (minor second). The octaving information associated with the circles and/or rings 1110 thus represent pitch level information. Thus, for example pitch level information is associated with the circle designated by reference numeral 1110 which corresponds to the pitch C1 (middle C and/or C'). Considering the angle under which according to the symmetry model the pitch class C is arranged, thus on the control panel 1100 a position for the pitch C1 results, as it is illustrated by the marking 1120-C1 illustrated as "X" in FIG. 29.

Accordingly, for example, the pitch level of the pitch d1 (middle d and/or d') is assigned to a circle which is arranged two rings further outwards with regard to the circle 1110, so that, considering the radial direction 700-d, the marking 1120-d1 results for the pitch d1 ("X"). Accordingly, corresponding markings 1120 ("X") are also assigned to the further pitches illustrated in FIG. 9, i.e. for example the marking 1120-e2 to the pitch e2.

FIG. 29 thus in particular shows an example of an operating surface/user interface 1100 of an embodiment of a device for generating a note signal, wherein, apart from an assignment of the pitch classes via the angles, the note signal further includes information regarding the octaving of the individual pitches. For this purpose, regarding the operating surface 1100 illustrated in FIG. 29 the above-mentioned plurality of rings 1110 is illustrated, wherein a pitch is associated with each individual ring 1110.

Each ring 1110 which has an associated pitch here comprises a radius $R_0$ with regard to the center point 812 of the resulting concentric arrangement of the rings 1110. As additionally an angle and/or a main angle is associated with each pitch class, thus the distribution of pitches illustrated in the figure results, marked by the markings 1120 ("X").

Here, a two-dimensional distribution function may be added and/or assigned to each pitch 1120, which assigns an intensity (e.g. a volume information) as a function of an angle and a radius of a point with regard to the location where a pitch (e.g. the pitch C1 (marking 1120-C1)) is arranged on the control panel. Here, the two-dimensional distribution function is generally divided into a tangential and a radial component regarding the intensity, wherein the tangential component is given by the single pitch distribution functions, as they are, for example, illustrated in connection with FIG. 5C. The radial component may be given by a radial intensity distribution and/or by a radial intensity distribution function which is added to each pitch on the control panel and/or the complete input field, wherein the radial component of the intensity distribution may optionally also depend on the above-mentioned angle with regard to the direction 700 of the pitch class.

As it was already described in connection with FIGS. 23 and 26, by inputting a starting angle and a stopping angle and/or by inputting an input angle and an opening angle, a user may in principle select a circle segment. In contrast to the operating elements illustrated in FIGS. 23 and 26, via the control panel 1100 illustrated in FIG. 29 a user may additionally define a radial area, for example by a starting radius and a stopping radius, which results in a selected ring-shaped area together with the input angle range, as is illustrated, for example, in FIG. 29 as the area 1130 highlighted in gray. As it is illustrated in the following, thus on the basis of the selected area 1130 a corresponding note signal may be generated as the input area 1130 which comprises information regarding the octaving apart from the information regarding the pitch class and optionally an intensity distribution.

The control panel 1100 of FIG. 29 is thus different from the control panel, as they are, for example, illustrated in FIGS. 23 and 26, by the fact that each pitch and/or ring has its own assigned radius with a radius value R0. Thus it is in principle possible to arrange a random number of octaves, for example from the center outward or alternatively from the outside to the center on the corresponding operating field/control panel. In the field 1100 illustrated in FIG. 29 it is thus possible for a user, by the definition of a starting radius, to input the lowest pitch of the chord to be played and, by a stopping radius which is greater than the starting radius in the embodiment illustrated in FIG. 29, to input the highest pitch of the chord to be played.

By this arrangement of pitches and pitch classes it is, for example, also possible to enable a cross-fading of one chord into another octave level/position by shifting the area and/or the field 1130 in the radial direction. If only one single angle is selected and no angle range or only one single angle in an angle range is regarded, changing the starting radius and stopping radius leads to a removal and/or elimination or to an addition of octavings of the corresponding pitch classes. Basically, here in the radial direction the same aspects and/or things apply as they apply in the tangential direction, only that here the pitches are not stored and/or arranged at intervals of thirds, but, as explained above, at intervals of octaves and/or, when regarding the individual concentric circles 1110, at semitone intervals (minor seconds).

To each point on the complete input field, at an interval r from the center 812 of the concentric arrangement, thus by the radial intensity distribution an intensity value is assigned, which depends on a difference $\Delta r$ of the radius value of the point r and the radius value $R_0$ of the associated ring. In other words, the radial intensity distribution represents a function of the variable $\Delta r$, wherein $\Delta r$ is given by $$\Delta r = r - R_0.$$

The radial intensity distribution may here basically be any function which associates an intensity value to each difference of the radiuses $\Delta r$. Here it is basically possible that an individual, different radial intensity distribution is assigned to each ring 1110 to which a pitch is assigned. Likewise it is possible that matching radial intensity functions are assigned to all or only some rings 1110 to which pitches are assigned. Thus it is, for example, possible that, depending on the octave to which a ring 1110 belongs, an octave-related radial intensity function is used for the corresponding rings 1110.

Figure 30B:
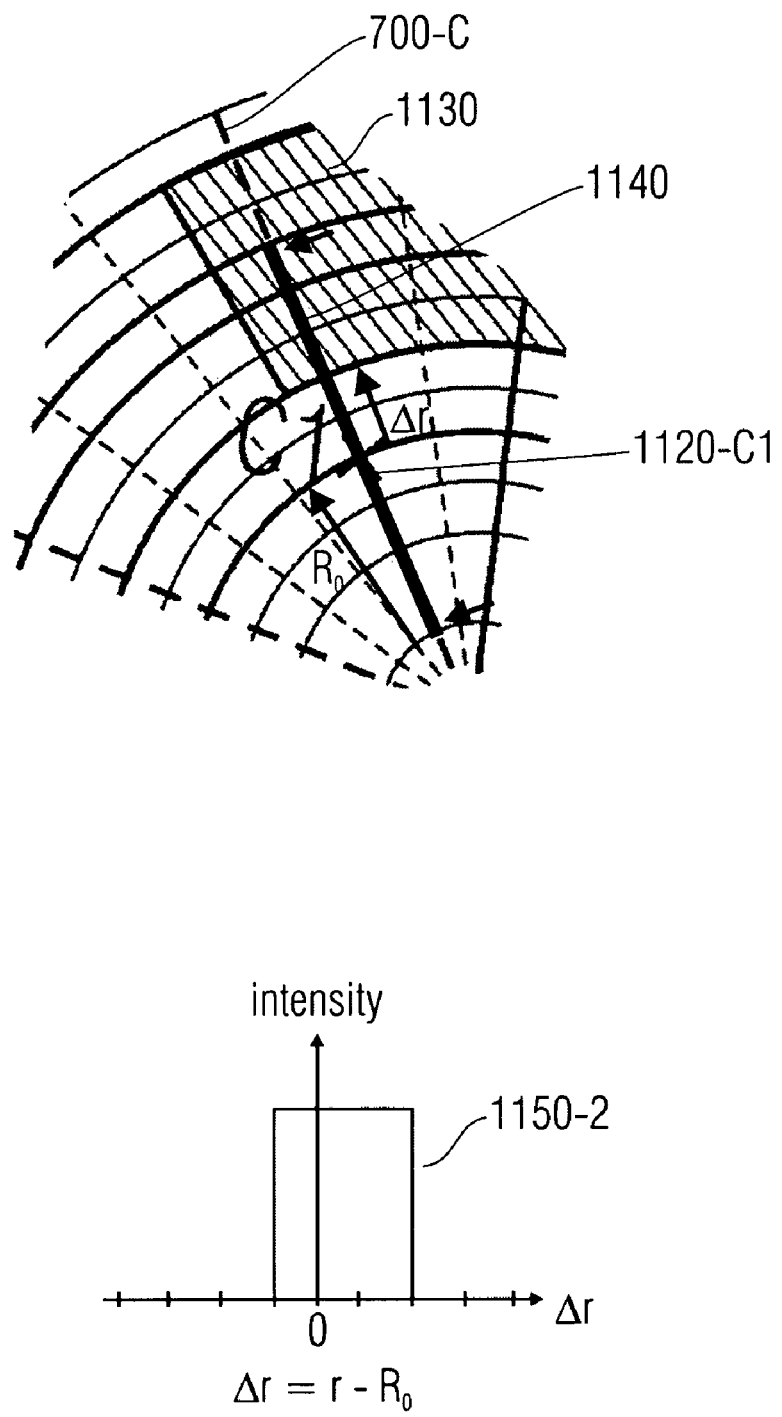

Likewise, the radial intensity functions may show a symmetrical or asymmetrical course with regard to their central value $\Delta r=0$, i.e. with regard to the actual ring 1110 itself. Thus, for example the bottom partial illustration of FIG. 30A shows a radial intensity distribution 1150-1, which shows a symmetrical, bell-shaped course with regard to the corresponding ring ($\Delta r=0$). In contrast to that, the radial distribution function 1150-1 illustrated in the bottom partial illustration of FIG. 30B shows an asymmetrical course which illustrates a rectangular function, wherein in this example the intensity falls abruptly from a maximum value to the value of 0.

In other words, in the embodiment of a control panel 1100 illustrated in FIGS. 29 and 30 not only the assignment of pitch classes to angles and/or vice versa is performed via an assignment function, but in such an implementation it may further be the case that individual octavings of a pitch class are assigned to the second dimension, i.e. the radius, with regard to the center point 812. In the embodiment illustrated in FIGS. 29 and 30 it is thus the case that the lower octaves are arranged very far inside, while they become higher and higher towards the outside.

It is further the case that the octaves of the individual pitch classes are arranged on the radial axis and/or with regard to the radial direction such that an "overlaying of all axes" and/or "all radial directions" leads to a chromatic scale which represents an increasing pitch level from inside to outside. In other words, neglecting the angle information, i.e. by "putting together all angles", a chromatic scale is exceeded with an increasing radius.

Thus, each pitch class has a unique angle and each pitch level a unique radius, so that on the control panel 1100 exactly one point may be associated with each pitch. It is an advantage here that, using this embodiment, apart from a starting angle and a stopping angle also a starting radius and a stopping radius may be defined, whereby the spectral width of the chord may be defined. By shifting the area 1130 defined by the starting angle and the stopping angle and/or the starting radius and the stopping radius in a radial direction, thus, for example, the reversal, or in more general terms, the lightness of a chord may be determined. In addition to that, it is basically possible to assign different sound colors to different angles and/or radiuses or, in the case of an electronic sound generator (e.g. sampler or synthesizer), different instruments.

If now a corresponding input area 1130, as illustrated with a shaded background in FIG. 29, is set and/or selected, an intensity information may be assigned to each point on the basis of its angle and its distance (radius r) with regard to the pitches arranged on the complete control panel 1100. Thus, on the basis of the angle and the associated spatial single pitch distribution function, for each pitch class and/or each pitch a corresponding intensity information may be assigned to each point of the input area 1130. The single pitch distribution functions here assign an intensity information to each angle with regard to a main angle of the pitch class which corresponds to the respective direction 700 of the control panel 1100, for example via a difference formation. Typically, the greatest intensity is assigned to the main angle.

In addition, based on the radial intensity functions of each ring 1110 to which a pitch is assigned, for each pitch including a pitch class and an octaving an intensity information derived for the corresponding pitch may be gained. Subsequently, for example on the basis of all pitches 1120 arranged in the complete control panel 1100 a (partial) note signal corresponding to the intensity information of the individual pitches may be generated by a combination of the individual pieces of information with regard to the resulting intensities of the pitches 1120.

Depending on the concrete implementation, here the individual points of the selected input area 1130 may be summed up and/or integrated or an overall intensity may be formed by an addition normalization or another method (for example determining the maximum). Further, with regard to the individual pitches 1120 which are put together from the individual spatial pitch distribution functions and the radial intensity distributions, intensity information may be calculated and/or determined on the basis of a multiplication of the corresponding functions or another, more complex functional connection. These include, for example, polynomial terms, exponential terms, mathematical convolutional terms or other mathematical connections. The radial intensity distribution thus enables a (later) weighting via the intensity of individual pitches which basically also enable a diminishing intensity (no volume and/or intensity value 0).

Thus, across the complete input field 1100, for each pitch 1120 in the complete input field 1100 and intensity distribution results with regard to all points located in the complete input field 1100, which is based, on the one hand, on the respectively associated spatial single pitch distribution function and, on the other hand, on the radial intensity distribution associated with the respective pitch and/or the respective octaving. Via the resulting (partial) note signals for the corresponding point, from all points of a selected input area 1130 which is, for example, determined by a starting angle, opening angle, starting radius and end radius, the resulting (overall) note signal and/or note signal may be formed in the above-described way.

In summary, thus, with regard to the embodiment in FIGS. 29 and 30, the following general basic ideas may be summarized. Thus, basically each pitch may be active at each location on the control panel 1100. The intensity of a pitch at a certain location is a random function $f(\alpha,r)$ defined by a point which is given by an angle $\alpha$ and a radius value r. The overall intensity of a pitch here results from an integration and/or summation of the intensities of the pitches on the complete surface 1100. The pitch distribution function, the selection function, the selection weighting function and other implementation-specific functions in the end only represent intermediate steps which help to generate and/or describe the actual pitch distribution function, which leads to the actual spatial distribution function or to the actual spatial (two-dimensional) distribution function. Here, there are different ways of generating the exact pitch distribution function, as the above discussion has shown.

Embodiments and/or implementations may here, for example, work as follows. First of all, a selection function $s(r,\alpha)$ is defined which assigns an intensity for a pitch having a pitch class and an octaving to each location of the two-dimensional surface of the operating element 1100. Subsequently, for each pitch 1120 arranged on the surface 1100 the angle $\alpha$ and the radius r with regard to the selected and/or chosen point is determined. The same are supplied to the selection function $s(r,\alpha)$, which then provides the intensity for this location and thus for the respective pitch. The selection function $s(r,\alpha)$ may here be formed in different ways. One possibility is to implement the definition of a starting angle and a stopping angle and of a starting radius and a stopping radius. In this case, the selection weighting function may, for example, be performed by a radial and tangential intensity distribution function. Further, within this area again an additional gradation of the weighting, for example via further implementation-specific functions, may take place.

FIGS. 30A and 30B thus respectively show a section from the control panel 1100 in the top section, in which a section in the area of the pitch C1 having the marking 1120-C1 is illustrated. Here, a radius value $R_0$ is assigned to each pitch, i.e. for example to the pitch C1 and/or its marking 1120-C1, as it is also illustrated in the top partial illustration of FIGS. 30A and 30B. If now, as explained in connection with FIG. 29, an input area 1130 is selected, each point of the selected area 1130 with regard to the position of the pitch C1 and/or due to its geometric position on the control panel 1130, as is illustrated by the marking 1120-C1, comprises a radius value $\Delta r$. Further, each point of the input area 1130, with regard to the associated direction and/or the associated angle, as it is, for example, respectively plotted by the radial direction 700-C for the pitch C1 in FIG. 30, comprises an angle. From this information, i.e. from the angle value with regard to the corresponding directions 700 and the radius value $\Delta r$, then an intensity value for the corresponding pitch is formed. The provided note signal thus includes, in the control panels 1100 illustrated in the embodiments in FIGS. 29 and 30, an intensity information (e.g. volume information) for each pitch on the control panel 1100, which results from a corresponding evaluation of the respective position of the points in the input area 1130 with regard to the respective points of the pitches 1120. With regard to the angle, this has already been explained in connection with FIGS. 5A to C.

With regard to the radial information, in one embodiment of the present invention, the associated intensity may be given as a function of the radius value $\Delta r$, as it is illustrated in the respective bottom partial illustrations in FIGS. 30A and 30B. Here, the application of the $\Delta r$ axis in the respective bottom partial illustrations corresponds to the broad line 1140 of the respective top partial illustrations illustrated in FIGS. 30A and 30B.

The little partitions on the $\Delta r$ axis in the bottom partial illustrations of FIGS. 30A and 30B respectively correspond to a distance of two concentric circles 1110, as they are illustrated in FIG. 29. The two intensity courses 1150-1 and 1150-2 illustrated in the bottom partial illustrations 30A and 30B here only represent two possible examples in which, in the case of the radial intensity distribution function 1150-1, a bell-shaped symmetrical function related to the value $\Delta r=1$ is illustrated, while the radial intensity distribution function 1150-2 in the bottom partial illustration 50 of FIG. 30B illustrates a rectangular, non-symmetrical intensity distribution function.

Of course, the control panels illustrated in FIGS. 29 and 30 are not limited to a control panel having an arrangement according to the symmetry model. The corresponding control panels 1100 may, of course, in other embodiments, be accordingly applied and converted to an arrangement of pitch classes across the complete angle range of a circle according to the circle of thirds.

In the following sections, some further embodiments of the present inventive device will be explained and outlined.

Paraplegics can in many cases only move their head. For this reason they are often not able to play conventional instruments as the same are almost exclusively played with the hands and/or (in exceptional cases) as with the feet. The inventive device for generating a note signal thus enables using a system as an operating means which can measure the inclination angle and/or the inclination direction of the head. On the basis of these measurement variables it is then possible to define the starting angle and/or the opening angle of the selected spatial section of the pitch space and, for example, provide same as an input variable to the HarmonyPad or another inventive device for generating a note signal upon a manual input. By this, the inventive device for generating a note signal may control a sound generator so that a paraplegic becomes able to play an accompaniment instrument.

Apart from that, there is the possibility of providing the note signals and/or the measurement variables as an input signal to an inventive device for outputting an output signal indicating a pitch class, so that on a display device, like the HarmonyPad illustrated in FIG. 26, the selected spatial area may be illustrated. Apart from that, with exact tracking methods provided, also gestures like eye winking and other reactions of a paraplegic may be detected, for example, to change the opening angle, the spatial single pitch distribution function, the reversal weighting function, the selection distribution function or another variable during playing and/or during the performance. Using this instrument paraplegics become able, for example, to accompany their own singing. Such an instrument thus represents an accompanying instrument for paraplegics.

With the help of the inventive devices for generating a note signal and for outputting an output signal indicating a pitch class it is also possible to use a mobile phone as a musical instrument, although the same has very limited operating possibilities. Newer devices frequently have a touch-sensitive screen and/or also a polyphonic sound synthesizer. It is thus possible to convert mobile phones into musical instruments by displaying an illustration similar to the HarmonyPad of FIG. 26 on the touch-sensitive screen and/or using the keyboard of the mobile phone or the mobile phone joystick for determining the starting angle and the opening angle of the symmetry circle, as it was already discussed in connection with FIGS. 24 and 25. Apart from that, it is possible to network several mobile phones, for example via Bluetooth® or other network connections, so that the same may, on the one hand, be rhythmically synchronized and on the other hand may also indicate the active pitch space section of other mobile phones. By this it is possible to form a "mobile phone orchestra". If also an automatic accompaniment is integrated in the mobile phones, the same may also be controlled using the inventive device for generating a note signal described here.

A further embodiment of the present invention is the so-called DJ tool. Here, an inventive input/output device, like, for example, the HarmonyPad of FIG. 26, is positioned next to a record player or a CD/DVD player on the device table of the DJ. A pitch and harmony analysis device detects the basic pitches contained in the currently played pieces and/or tracks and provides and/or routes the same to the inventive input and output device (e.g. HarmonyPad) of the DJ. The same may now generate "cool" harmony accompaniment effects by using the sound creation possibilities provided by the HarmonyPad.

A further embodiment of the present invention represents a foot-controlled accompaniment instrument. Here, the starting angle and/or the opening angle of the selected circle segment is not controlled via a joystick, but the operating means rather includes a foot plate which may be inclined in all directions. The inclination angle and the inclination degree of the foot plate is, for example, associated and routed to a starting angle and/or an opening angle via optical, electrical or mechanical sensors. By this, a guitar player is, for example, able to control a violin orchestra via a synthesizer or another sound generator which matches his guitar playing.

A further embodiment of the present invention consists in a drum(s)-based variant. Here, the seven pitches and/or pitch classes of the symmetry circle are associated with individual areas of the drums. Here, such an assignment may take place, for example in the case of digital drums, directly by corresponding digital control signals (for example midi signals) or by corresponding sound receivers and corresponding evaluation electronics. By an additional device offered to the drums player, which comprises a further operating means, using which the keys and/or the assignment functions may be changed, the drums player may thus set the current key. By this, drummers may create interesting harmonic accompaniments.

A further embodiment of the present invention consists in an additional accompaniment keyboard for keyboards (having a conventional piano fingerboard). Here, an inventive device for generating a note signal and/or an inventive device for outputting an output signal indicating a pitch class, for example the HarmonyPad illustrated in FIG. 26, may be integrated into (existing) keyboards or be offered as an additional accompaniment keyboard or accompaniment input device. While the normal keyboard is well suited for creating melody courses, the HarmonyPad may be used to generate a matching harmonic accompaniment or to analyze the harmonies generated using the conventional keyboard.

A further embodiment of the present invention consists in using the HarmonyPad illustrated in FIG. 26 as an additional component (AddOn) to an iPod®. The current iPod® comprises a circular touch-sensitive area for operating the device. This circular area may be used as the input medium for the HarmonyPad. Additionally, it is possible to expand the iPod® by a harmony analysis function and/or a harmony analysis device which operates on the basis of the sum vectors. This function analyzes the key and the starting angle and opening angle present at a certain point of time and illuminates the corresponding circle segment on the iPod®. In addition to that, optionally the iPod® may further be equipped with a sound generator, so that bright kids may enhance their music with fancy accompaniment harmonies. It is to be noted that this function may need matching music.

A further embodiment of the present invention represents a so-called HarmonyBuzzer. Sony® offers input devices which are specific for quiz games which are called buzzers. An embodiment of the present invention is now a so-called HarmonyBuzzer which comprises operating elements which are arranged in the form of the symmetry model similar to the operating device 900 illustrated in FIG. 27 and/or the corresponding toy and musical instrument for children, wherein the optional pitch selection counter 935 does not have to be implemented in FIG. 27. The HarmonyBuzzer is manufactured together with a learning software to be sold together with the same and makes it possible for several children to learn music theory together and perform auditory exercises, if applicable play pieces of music, and perform other activities. The HarmonyBuzzer serves as an input instrument and/or an instrument for answering the questions. It is the advantage of the HarmonyBuzzer that the arrangement of the operating elements has significance with regard to music theory. By this, an additional "channel" is created which helps the children to take in and remember what they have learned better.

Further embodiments of the present invention illustrate systems in which a device for analyzing audio data or an inventive device for generating a note signal are coupled to a spatial sound/surround sound generator to enable a linking to a surround sound or surround sound experiences and other sound parameters. By the symmetry model and the circle of thirds, tonal information, like, for example, in the form of the selected spatial section and/or the input angle and/or the input angle range and the analysis signal based on the sum vector, is geometrically represented very effectively. Today's reproduction systems and/or surround sound systems make it possible to reproduce sounds at certain spatial positions. There is further the possibility, in the case of a coupling of a device for generating a note signal to a spatial sound system, for example of routing the (starting) angle, the opening angle and/or the radius of the currently selected circle segment to spatial parameters like direction, diffusity, expansion of sound in the spatial area etc. and/or to perform a corresponding assignment. Likewise, it is possible, in the case of coupling of an inventive device for analyzing audio data to a spatial sound system, on the basis of the analysis signal, i.e. in particular on the basis of the information contained within the same regarding the angle and the length of the sum vector, to perform a corresponding assignment to the parameters of the spatial sound system. In addition to that, it is possible to route these parameters to a frequency-dependent transmission function or to the time course, for example by means of ADSR envelopes (ADSR=attack decay sustain release) and thus link harmony, sound color and/or sound position to each other.

Further embodiments for the inventive device for outputting an output signal indicating a pitch class represent, for example, screens, displays (LCD displays) and output fields having output areas which may be optically accentuated by illumination, and other display devices. The surfaces of these displays may be implemented in different shapes, as the examples shown in FIGS. 26 and 27 in the case of the symmetry model illustrate. Accordingly, also illustrations within the scope of the circle of thirds (like, e.g., the circle of thirds 835 in FIG. 26) may be used. Further details regarding the implementations strongly depend on the fields of use. Thus, apart from the already described DJ tool, the HarmonyPad, the musical instrument for infants and other already described embodiments, an application as a room decoration, for example in the form of a wall-mountable LCD display or TFT display (TFT=thin film transistor) is also possible. Also smaller implementations which may be held in the hand are possible which, for example, make a fast detection of the played pitches of a piece of music possible for people who have no absolute pitch.

Depending on the circumstances, the inventive methods for generating a note signal upon a manual input or the methods for outputting an output signal indicating a pitch class may be implemented in hardware or in software. The implementation may be on a digital storage medium, in particular a floppy disc, CD or DVD having electronically readable control signals which may cooperate with a programmable computer system so that the inventive methods for generating a note signal upon a manual input or the methods for outputting an output signal indicating a pitch class may be performed. Generally, the invention thus also consists in a computer program product having a program code stored on a machine-readable carrier for performing the inventive method when the computer program product runs on a computer. In other words, the invention may thus be realized as a computer program having a program code for performing the methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for generating a note signal upon a manual input, comprising:
    an operator which is implemented to enable a user of the same, as an input, to define an input angle or an input angle range as the input signal; and
    a controller which is implemented to receive the input signal and to generate a note signal associated with a pitch class based on an assignment function and the input signal,
    wherein the assignment function maps the complete angle range of a circle to a set of pitch classes such that one pitch class or no pitch class is assigned to each angle of the complete angle range and that for all predetermined angles it applies that
    when no pitch class is associated with the predetermined angle, to a first next neighbor angle, nearest to the predetermined angle in a first direction, of the complete angle range, to which a pitch class is assigned, a first next neighbor pitch class is assigned, which comprises a smallest pitch interval, which corresponds to a minor third interval or a major third interval, with respect to a second next neighbor pitch class which is associated with a second next neighbor angle, which is nearest to the predetermined angle in a second direction which is opposite to the first direction, of the complete angle range, which comprises an associated pitch class, and
    when one predetermined pitch class is associated with the predetermined angle, the predetermined pitch class and the first next-neighbor pitch class comprise a smallest pitch interval which corresponds to a prime interval, a minor third interval or a major third interval, and the predetermined pitch class and the second next-neighbor pitch class comprise a smallest pitch interval which corresponds to a prime interval, a minor third interval or a major third interval.

2. The device according to claim 1, wherein the controller is implemented such that the assignment function assigns pitch classes to a plurality of predetermined angles, wherein pitch classes are associated with directly adjacent angles of the plurality of predetermined angles, which comprise a major third interval or a minor third interval as the smallest pitch interval.

3. The device according to claim 2, wherein the controller is implemented such that the plurality of predetermined angles includes 24 individual angles which are distributed equidistantly with regard to a circle, and that the assignment function assigns the 12 pitch classes of the chromatic scale to the 24 individual angles of the plurality of predetermined angles, so that a pitch class is associated with each individual angle of the plurality of predetermined angles, which either
    with regard to a pitch class associated with an angle of the plurality of predetermined angles which is directly adjacent in a clockwise direction, comprises a minor third interval as the smallest pitch interval, and with regard to a pitch class associated with an angle of the plurality of predetermined angles directly adjacent in a counterclockwise direction, comprises a major third interval as the smallest pitch interval, or with regard to a pitch class associated with an angle of the plurality of predetermined angles which is directly adjacent in a clockwise direction, comprises a major third interval as the smallest pitch interval, and with regard to a pitch class associated with an angle of the plurality of predetermined angles directly adjacent in a counter-clockwise direction, comprises a minor third interval as the smallest pitch interval.

4. The device according to claim 2, wherein the controller is implemented such that the plurality of predetermined angles includes seven individual angles which are distributed symmetrically with regard to a symmetry axis, and that the assignment function assigns the seven pitch classes of a diatonic major scale to the seven individual angles of the plurality of predetermined angles so that each individual angle of the plurality of predetermined angles either with regard to a pitch class associated with an angle of the plurality of predetermined angles which is directly adjacent in a clockwise direction, comprises a minor third interval as the smallest pitch interval, and with regard to a pitch class associated with an angle of the plurality of predetermined angles directly adjacent in a counter-clockwise direction, comprises a major third as the smallest pitch interval, or with regard to a pitch class associated with an angle of the plurality of predetermined angles which is directly adjacent in a clockwise direction, comprises a major third interval as the smallest pitch interval, and with regard to a pitch class associated with an angle of the plurality of predetermined angles directly adjacent in a counter-clockwise direction, comprises a minor third as the smallest pitch interval, wherein two directly adjacent individual angles each, which comprise associated pitch classes which comprise a minor third interval as the smallest pitch interval, are different with regard to a circle regarding their absolute value by an angle of 45°;

wherein two directly adjacent individual angles each, which comprise associated pitch classes which comprise a major third interval as the smallest pitch interval, are different with regard to a circle regarding their absolute value by an angle of 60°; and wherein the pitch class associated with an angle of the symmetry axis, with regard to a basic pitch of the diatonic major scale, comprises a smallest pitch interval of a major second.

5. The device according to claim 1, wherein the controller is implemented such that the assignment function assigns a volume information to each angle to which a pitch class is assigned, wherein a spatial pitch distribution function is defined via the angles.

6. The device according to claim 1, wherein the controller is further implemented to generate a note signal which comprises volume information which is derived from the angle range of the input signal and a selection weighting function, wherein the selection weighting function comprises an angle-dependent volume information function.

7. The device according to claim 1, wherein the controller is further implemented to generate the note signal with an octaving which is randomly determined, predetermined or dependent on the input.

8. The device according to claim 7, wherein the operator is implemented to provide an octaving signal upon an octaving input of the user to the controller, and wherein the controller is implemented to generate the note signal with an octaving depending on the octaving signal.

9. The device according to claim 8, wherein the controller is implemented to generate the note signal with an octaving depending on the octaving input of the user and a reversal weighting function.

10. The device according to claim 8, wherein the operator is implemented such that the octaving input takes place in the form of a radius input by the user.

11. The device according to claim 1, wherein the operator is implemented to define the input angle range by a starting angle and an opening angle.

12. The device according to claim 1, wherein the operator comprises an input device which is selected from a group including a joystick, a mobile phone joystick, a tiltable foot plate, a foot key, a foot rocker, a rotary switch, a sliding controller, a touchscreen, a touch-sensitive area, a computer mouse, a key, a button, a push-button and a slide switch.

13. The device according to claim 1, wherein the operator is implemented to detect an inclination direction and/or an inclination degree of a user's head and output the same as the input.

14. The device according to claim 1, wherein the device comprises an additional operator to provide a selection signal to the controller upon a selection input of the user, and wherein the controller is implemented to determine the assignment function from a plurality of the assignment functions based on the selection signal in order to determine a diatonic major scale.

15. The device according to claim 1, wherein the operator comprises a touch-sensitive field, a field detector and a field evaluator, wherein the detector is implemented to detect a touch on the touch-sensitive field by the user and to provide a signal indicating the touch and the location of the touch to the field evaluator, and wherein the field evaluator is implemented to determine the input angle or the input angle range from the location of the touch, based on the signal indicating the touch with regard to a center point of the touch-sensitive field and a preferential direction of the touch-sensitive field, and to output the input signal.

16. The device according to claim 1, wherein the operator comprises a plurality of note operators and an oval/circular note operating area, wherein exactly seven note operators of the plurality of note operators are successively arranged along a periphery of the note operating area;

wherein a pitch class is associated with each of the seven note operators;

wherein the seven note operators are arranged symmetrically on the periphery of the note operating area with regard to a note operating area symmetry axis, so that the first note operator lies on the note operating area symmetry axis in a clockwise direction; and a detector which is implemented to provide an input angle associated with the note operator as an input signal upon operating a note operator of the seven note operators of the controller, wherein each of the seven note operators, with regard to a preferential direction of the note operating area and a center point of the note operating area is arranged under an angle which corresponds to the input angle associated with the note operator; and wherein each of the seven note input devices includes a key, a button, a touch-sensitive area, a switch or a push-button.

17. The device according to claim 1, wherein the operator comprises a plurality of note operators and an oval/circular note operating area,
- wherein exactly 24 note operators of the plurality of note operators are arranged successively along a periphery of the note operating area;
- wherein a pitch class is associated with each of the 24 note operators; and
- a detector which is implemented to provide an input angle associated with the note operator as an input signal to the controller upon operating one note operator of the 24 note operators,
- wherein each of the 24 note operators, with regard to a preferential direction of the note operating area and a center point of the note operating area, is arranged under an angle which corresponds to the input angle associated with the note operator; and
- wherein each of the 24 note operators includes a key, a button, a touch-sensitive area, a switch or a push-button.

18. The device according to claim 1, wherein the operator is further implemented to enable a user of the same to define an input radius or an input radius range further included in the input signal, and wherein the controller is further implemented to generate the note signal associated with the pitch class, with an intensity information determined at least on the basis of the input radius or the input radius range included in the input signal, for at least one octaving of the pitch class.

19. The device according to claim 18, wherein the controller is further implemented to determine the intensity information on the basis of the input radius or the input radius range via a radial intensity distribution function for the at least one octaving of the pitch class so that the intensity information associated with the at least one octaving of the pitch class depends on the input radius and/or the input radius range and a radius value associated with the at least one octaving.

20. The device according to claim 19, wherein the intensity information associated with the at least one octaving depends on a difference of the input radius and/or the input radius range and the radius value associated with the at least one octaving.

21. The device according to claim 18, wherein the controller is further implemented to associate the intensity information on the basis of the input angle included in the input signal or the input angle range included in the input signal.

22. The device according to claim 18, wherein the operator is implemented to enable the definition of the input radius range by an input of a starting radius and a stopping radius or by an input of a starting radius and a radius range.

23. A method for generating a note signal upon a manual input, comprising:
- receiving an input signal defining an input angle or an input angle range; and
- generating a note signal associated with a pitch class on the basis of an assignment function and the input signal,
- wherein the assignment function maps the complete angle range of a circle to a set of pitch classes such that one pitch class or no pitch class is assigned to each angle of the complete angle range and that for all predetermined angles it applies that
  - when no pitch class is associated with the predetermined angle, to a first next neighbor angle, nearest to the predetermined angle in a first direction, of the complete angle range, to which a pitch class is assigned, a first next neighbor pitch class is assigned, which comprises a smallest pitch interval, which corresponds to a minor third interval or a major third interval, with respect to a second next neighbor pitch class which is which is associated with a second next neighbor angle, nearest to the predetermined angle in a second direction which is opposite to the first direction, of the complete angle range, which comprises an associated pitch class, and
  - when one predetermined pitch class is associated with the predetermined angle, the predetermined pitch class and the first next-neighbor pitch class comprise a smallest pitch interval which corresponds to a prime interval, a minor third interval or a major third interval, and the predetermined pitch class and the second next-neighbor pitch class comprises a smallest pitch interval which corresponds to a prime interval, a minor third interval or a major third interval.

24. A computer-readable medium storing a computer program, when run on a computer, the computer program performs a method for generating a note signal upon a manual input, comprising:
- receiving an input signal defining an input angle or an input angle range; and
- generating a note signal associated with a pitch class on the basis of an assignment function and the input signal,
- wherein the assignment function maps the complete angle range of a circle to a set of pitch classes such that one pitch class or no pitch class is assigned to each angle of the complete angle range and that for all predetermined angles it applies that;
  - when no pitch class is associated with the predetermined angle, to a first next neighbor angle, nearest to the predetermined angle in a first direction, of the complete angle range, to which a pitch class is assigned, a first next neighbor pitch class is assigned, which comprises a smallest pitch interval, which corresponds to a minor third interval or a major third interval, with respect to a second next neighbor pitch class which is which is associated with a second next neighbor angle, nearest to the predetermined angle in a second direction which is opposite to the first direction, of the complete angle range, which comprises an associated pitch class, and
  - when one predetermined pitch class is associated with the predetermined angle, the predetermined pitch class and the first next-neighbor pitch class comprise a smallest pitch interval which corresponds to a prime interval, a minor third interval or a major third interval, and the predetermined pitch class and the second next-neighbor pitch class comprises a smallest pitch interval which corresponds to a prime interval, a minor third interval or a major third interval.

* * * * *